US010435514B2

(12) United States Patent
Calabro et al.

(10) Patent No.: US 10,435,514 B2
(45) Date of Patent: *Oct. 8, 2019

(54) ORGANOSILICA MATERIALS, METHODS OF MAKING, AND USES THEREOF

(71) Applicant: ExxonMobil Research and Engineering Company, Annandale, NJ (US)

(72) Inventors: David C. Calabro, Bridgewater, NJ (US); Ivy D. Johnson, Lawrenceville, NJ (US); Quanchang Li, Dayton, NJ (US); Paul Podsiadlo, Easton, PA (US); Simon C. Weston, Annandale, NJ (US); Mobae Afeworki, Phillipsburg, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,961

(22) Filed: Jun. 10, 2016

(65) Prior Publication Data
US 2017/0355822 A1 Dec. 14, 2017

(51) Int. Cl.
C08G 77/06 (2006.01)
C08G 77/04 (2006.01)
C01B 33/113 (2006.01)
C01B 37/00 (2006.01)
C08G 77/26 (2006.01)

(52) U.S. Cl.
CPC ............ C08G 77/06 (2013.01); C01B 33/113 (2013.01); C01B 37/00 (2013.01); C08G 77/04 (2013.01); C08G 77/26 (2013.01)

(58) Field of Classification Search
CPC ......... C08G 77/04; C08G 77/06; C08G 77/26
See application file for complete search history.

(56) References Cited

U.S. PATENT DOCUMENTS

| | | | |
|---|---|---|---|
| 3,178,392 A | 4/1965 | Kriner | |
| 4,218,308 A | 8/1980 | Itoh et al. | |
| 5,128,114 A | 7/1992 | Schwartz | |
| 5,365,003 A | 11/1994 | Chang et al. | |
| 5,630,937 A | 5/1997 | Betz et al. | |
| 5,719,322 A | 2/1998 | Lansbarkis et al. | |
| 7,300,905 B2 | 11/2007 | Keefer et al. | |
| 7,497,965 B2 | 3/2009 | Wariishi et al. | |
| 7,538,065 B2 | 5/2009 | McCarthy et al. | |
| 7,682,502 B2 | 3/2010 | McCarthy et al. | |
| 7,705,062 B2 | 4/2010 | Markowitz et al. | |
| 7,754,330 B2 | 7/2010 | Hamada et al. | |
| 7,767,620 B2 | 8/2010 | Whitnall et al. | |
| 7,947,799 B2 | 5/2011 | Manfred et al. | |
| 8,110,692 B2 | 2/2012 | Bellussi et al. | |
| 8,211,498 B2 | 7/2012 | Ku et al. | |
| 8,277,600 B2 | 10/2012 | Hamada et al. | |
| 8,277,661 B2 | 10/2012 | Sah et al. | |
| 8,425,762 B2 | 4/2013 | McCarthy et al. | |
| 8,441,006 B2 | 5/2013 | Michalak et al. | |
| 8,470,074 B2 | 6/2013 | Baugh et al. | |
| 8,545,694 B2 | 10/2013 | McCarthy et al. | |
| 8,562,356 B2 | 10/2013 | Giannantonio et al. | |
| 8,568,520 B2 | 10/2013 | Ohashi et al. | |
| 8,598,070 B1 | 12/2013 | Baugh et al. | |
| 8,598,071 B1 | 12/2013 | Baugh et al. | |
| 8,658,561 B2 | 2/2014 | Li | |
| 8,784,533 B2 | 7/2014 | Leta et al. | |
| 8,784,534 B2 | 7/2014 | Kamakoti et al. | |
| 8,784,535 B2 | 7/2014 | Ravikovitch et al. | |
| 8,809,561 B2 | 8/2014 | Bellussi et al. | |
| 8,858,683 B2 | 10/2014 | Deckman | |
| 9,181,282 B2 | 11/2015 | Ide et al. | |
| 2003/0188991 A1 | 10/2003 | Shan et al. | |
| 2005/0093189 A1 | 5/2005 | Vo | |
| 2006/0058565 A1 | 3/2006 | De Wild | |
| 2006/0070917 A1 | 4/2006 | McCarthy et al. | |
| 2007/0003492 A1 | 1/2007 | Kitahata et al. | |
| 2007/0034992 A1 | 2/2007 | Wariishi et al. | |
| 2007/0054136 A1 | 3/2007 | Takahashi et al. | |
| 2007/0112242 A1 | 5/2007 | Edmiston | |
| 2007/0173401 A1* | 7/2007 | Landskron | B01J 29/0308 502/232 |
| 2009/0130412 A1 | 5/2009 | Hatton et al. | |
| 2009/0215612 A1 | 8/2009 | McCarthy et al. | |

(Continued)

FOREIGN PATENT DOCUMENTS

| | | |
|---|---|---|
| CN | 101804335 A | 8/2010 |
| CN | 101980013 B | 2/2011 |

(Continued)

OTHER PUBLICATIONS

Landskron et al., "Periodic Mesoporous Organosilicas Containing Interconnected [Si(CH2)]3 Rings", Science, 2003, pp. 266-269, 302(5643), Washington, DC, US.
Perry et al., "Progress Using Aminosilicones for CO2 Capture", GE Global Research, pp. 307-307.
PCT/US2016/036887 International Search Report and Written Opinion dated Mar. 6, 2017.
Brondani et al., "Polyfunctional Carbosilanes and organosilicon Compounds. Syntheses via Grignard Reactions", Tetrahedron Letters, 1993, pp. 2111-2114, vol. 34, No. 13, Pergamon Press Ltd.
Goethals et al., "Ultra-low-k cyclic carbon-bridged PMO films with a high chemical resistance", Journal of Materials Chemistry, Jan. 16, 2012, pp. 8281-8286, vol. 22, No. 17, Royal Society of Chemistry.

(Continued)

Primary Examiner — Margaret G Moore
(74) Attorney, Agent, or Firm — Priya G. Prasad; Amanda K. Norwood

(57) ABSTRACT

Organosilica materials made from monomers including at least a source of silica that is reactive to polymerize, optionally in combination with at least one additional cyclic monomer. Methods for making such organosilica materials are also described herein.

12 Claims, 3 Drawing Sheets

(56) References Cited

U.S. PATENT DOCUMENTS

| | | |
|---|---|---|
| 2009/0294922 A1 | 12/2009 | Hamada et al. |
| 2010/0155302 A1 | 6/2010 | Kaminsky et al. |
| 2010/0233482 A1 | 9/2010 | Hamada et al. |
| 2011/0077364 A1* | 3/2011 | Tazaki ............... C08G 77/50 525/477 |
| 2011/0139685 A1 | 6/2011 | McCarthy et al. |
| 2011/0190115 A1 | 8/2011 | Ciriminna et al. |
| 2012/0059181 A1 | 3/2012 | Bellussi et al. |
| 2012/0160742 A1 | 6/2012 | Sohn et al. |
| 2013/0075876 A1 | 3/2013 | Goethals et al. |
| 2013/0078172 A1 | 3/2013 | Bingbing et al. |
| 2013/0249049 A1 | 9/2013 | Michalak et al. |
| 2014/0004358 A1 | 1/2014 | Blackwell et al. |
| 2014/0186246 A1 | 7/2014 | Calabro et al. |
| 2014/0208753 A1 | 7/2014 | Liu et al. |
| 2015/0005525 A1* | 1/2015 | Ide ..................... B01J 20/283 556/406 |
| 2015/0011787 A1 | 1/2015 | Bellussi et al. |
| 2016/0167015 A1 | 6/2016 | Podsiadlo et al. |
| 2016/0167016 A1 | 6/2016 | Li et al. |
| 2016/0167032 A1 | 6/2016 | Podsiadlo et al. |
| 2016/0168171 A1 | 6/2016 | Li et al. |
| 2016/0168172 A1 | 6/2016 | Li et al. |
| 2016/0168173 A1 | 6/2016 | Li et al. |
| 2016/0168174 A1 | 6/2016 | Li et al. |
| 2016/0168333 A1 | 6/2016 | Podsiadlo et al. |
| 2016/0168484 A1 | 6/2016 | Weigel et al. |
| 2016/0168485 A1 | 6/2016 | Li et al. |
| 2016/0229959 A1 | 8/2016 | Li et al. |
| 2016/0243491 A1 | 8/2016 | Wei et al. |
| 2017/0306068 A1 | 10/2017 | Holtcamp et al. |
| 2017/0313791 A1 | 11/2017 | Mertens et al. |
| 2017/0320971 A1 | 11/2017 | Holtcamp et al. |
| 2017/0320977 A1 | 11/2017 | Holtcamp et al. |
| 2017/0327604 A1 | 11/2017 | Holtcamp et al. |
| 2017/0355822 A1 | 12/2017 | Calabro et al. |
| 2017/0355823 A1 | 12/2017 | Peterson et al. |
| 2018/0142066 A1 | 5/2018 | Falkowski et al. |

FOREIGN PATENT DOCUMENTS

| | | |
|---|---|---|
| CN | 102052713 A | 5/2011 |
| CN | 102643429 A | 8/2012 |
| CN | 103157362 A | 6/2013 |
| CN | 103613975 A | 3/2014 |
| CN | 104117343 A | 10/2014 |
| EP | 1995214 A2 | 11/2008 |
| JP | 10151343 A | 6/1998 |
| JP | 11295284 A | 10/1999 |
| JP | 2003167233 A | 6/2003 |
| JP | 2006083311 A | 3/2006 |
| JP | 2006095512 A | 4/2006 |
| JP | 2007070520 A | 3/2007 |
| JP | 2007238761 A | 9/2007 |
| JP | 4022555 B2 | 12/2007 |
| JP | 2008045060 A | 2/2008 |
| JP | 2008062138 A | 3/2008 |
| JP | 2009067233 A | 7/2009 |
| JP | 2010100492 A | 5/2010 |
| JP | 2011025201 A | 2/2011 |
| JP | 4956089 B2 | 6/2012 |
| JP | 2012149138 A | 8/2012 |
| JP | 2012149138 B2 | 8/2012 |
| JP | 5020575 B2 | 9/2012 |
| JP | 2014057941 A | 4/2014 |
| JP | 5544672 B1 | 7/2014 |
| JP | 5627870 B2 | 11/2014 |
| RU | 2291878 C1 | 1/2007 |
| WO | 9610537 A1 | 4/1996 |
| WO | 2006032140 A1 | 3/2006 |
| WO | 2007081212 A1 | 7/2007 |
| WO | 2011145933 A1 | 11/2011 |
| WO | 2013093022 A1 | 6/2013 |
| WO | 2014010512 A1 | 1/2014 |
| WO | 2014090757 A1 | 6/2014 |
| WO | 2015100198 A1 | 7/2015 |
| WO | 2016094784 A1 | 6/2016 |
| WO | 2016094803 A1 | 6/2016 |

OTHER PUBLICATIONS

Goethals, et al., "A new procedure to seal the pores of mesoporous low-k films with precondensed organosilica oligomers", Chemical Communications, 2012, pp. 2797-2799, vol. 48, No. 22, Royal Society of Chemistry.

Goethals et al., "Sealed ultra low-k organosilica films with improved electrical, mechanical and chemical properties", Journal of Materials Chemistry C, 2013, vol. 1, No. 25, Royal Society of Chemistry.

Goethals et al., "Hydrophobic high quality ring PMOs with an extremely high stability", Journal of Materials Chemistry, 2010, pp. 1709-1716, vol. 20, No. 9, Royal Society of Chemistry.

Landskron et al., "Periodic Mesoporous Organosilicas: Self-Assembly from Bridged Cyclic Silsesquioxane Precursors", Angewandte Chemie, International Edition, 2005, pp. 2107-2109, vol. 44, No. 14, Wiley-VCH Verlag GmbH & Co. KgaA.

Topchiev et al., "Direct synthesis of alkyl and aryl halosilanes. IV. Alkoxy (aryloxy) derivatives based on the products of reaction of methylene chloride and 1,2-dichloroethane with silicon", Issled. v Obl. Kremniiorgan. Soedin., Sintez i Fiz.-Khim. Svoistva, Akad. Nauk SSSR, Inst. Neftekhim. Sinteza, Sb. Statei, 1962, pp. 146-155.

Topchiev et al., "Preparation of HexAlkoxy Derivatives of Cyclotrimethylenesilane", Petroleum Inst., Adad. Sci, U.S.S.R. Moscow, 1955, pp. 95-96, vol. 103, Doklady Akademi Nauk SSSR.

Arnason et al., "Conformations of silicon-containing rings. Part 4. Gas-phase structure of 1,3,5-trisilacyclohexane and comparison with cyclohexane and cyclohexasilane", Journal of Molecular Structure, Dec. 5, 2001, pp. 245-250, vol. 598, No. 2-3, ScienceDirect.

Kriner, "The Preparation of Cyclic Siliconmethylene Compounds", The Journal of Organic Chemistry, Jun. 1964, pp. 1601-1601, vol. 29, No. 6, ACS Publications.

Gilman et al., "Reactions of triphenylsilyllithium with some dichloropropenes", Journal of Organometallic Chemistry, Oct. 1964, pp. 293-303, vol. 2, No. 4, ScienceDirect.

Kuivila et al., "Trimethylsilyl-Substituted Norbornenes, Norbornanes, and Nortricyclene", The Journal of Organic Chemistry, Oct. 1964, pp. 2845-2851, vol. 29, No. 10, ACS Publications.

Rahbari-Sisakht et al., "A novel surface modified polyvinylidene fluoride hollow fiber membrane contactor for CO2 absorption", Journal of Membrane Science, 2012, pp. 221-228, vol. 415-416, Elsevier.

Rahbari-Sisakht et al., "Effect of SMM concentration on morphology and performance of surface modified PVDF hollow fiber membrane contactor for CO2 absorption", Separation and Purification Technology, 2012, pp. 67-72, vol. 116, Elsevier.

Harlick et al., "Applications of Pore-Expanded Mesoporous Silica. 5. Triamine Grafted Material with Exceptional CO2 Dynamic and Equilibrium Adsorption Performance", Industrial & Engineering Chemistry Research, 2007, pp. 446-458, vol. 46, ACS Publications.

Chen et al., "Synthesis of CO2-Philic Polysiloxane with N-Halamine Side Groups for Biocidal Coating on Cotton", Industrial & Engineering Chemistry Research, 2012, pp. 9260-9265, vol. 51, No. 27, ACS Publications.

Flichy et al., "An ATR-IR Study of Poly(Dimethylsiloxane) under High-Pressure Carbon Dioxide: Simultaneous Measurement of Sorption and Swelling", Journal of Physical Chemistry B, 2002, pp. 754-759, vol. 106, No. 4, ACS Publications.

Nguyen et al., "Amine volatility in CO2 capture", International Journal of Greenhouse Gas Control, 2010, pp. 707-715, vol. 4, Elsevier.

Chen et al., "Foaming of aqueous piperazine and monoethanolamine for CO2 capture", International Journal of Greenhouse Gas Control, 2011, pp. 381-386, vol. 5, Elsevier.

Niemeyer et al., "Effects of CO2 Sorption on the Rotational Reorientation Dynamics of a Model Solute Dissolved in Molten Poly(dimethylsiloxane)", Macromolecules, 1998, pp. 77-85, vol. 31, ACS Publications.

(56) References Cited

OTHER PUBLICATIONS

Kohrt et al., "Texture influence on liquid-side mass transfer", Chemical Engineering Research and Design, 2011, pp. 1405-1413, vol. 89, Elsevier.

Jha et al., Concentration and temperature dependence on diffusivities of CO2 and N2 for poly(dimethyl, methylphenyl siloxane), AIChe Journal, 2008, pp. 143-149, vol. 54, No. 1, John Wiley & Sons, Inc.

Eilseeva et al., "Antifoaming additive for alkaline absorption solutions for removal of carbon dioxide from synthesis gas", Khimicheskaya Promyshelonnost, 1999, pp. 632-633, vol. 10, Izdatel'stvo "TEZA", abstract only.

Hiyoshi et al., "Reversible Adsorption of Carbon Dioxide on Amine-Modified SBA-15 from Flue Gas Containing Water Vapor", Studies in Surface Science and Catalysis, 2004. pp. 417-422, vol. 153, Elsevier B.V.

Duan et al., "Fabrication and CO2 capture performance of silicon carbide derived carbons from polysiloxane", Microporous and Mesoporous Materials, 2015, pp. 24-31, vol. 203, Elsevier.

Roualdes et al., "Gas diffusion and sorption properties of polysiloxane membranes prepared by PECVD", Journal of Membrane Science, 2002, pp. 299-310, vol. 198, No. 2, Elsevier.

Prenzel et al., "Tailoring amine functionalized hybrid ceramics to control CO2 adsorption", Chemical Engineering Journal, 2014, pp. 196-206, vol. 235, Elsevier.

Tomioka, "Refining technology of biogas: methane refining and carbon dioxide by membrane absorption hybrid method", Kankyo Joka Gijutsu, 2012, pp. 39-44, vol. 11, No. 4, Nippon Kogyo Shuppan, abstract only.

Chao et al., "CO2 Adsorption Ability and Thermal Stability of Amines Supported on Mesoporous Silica SBA-15 and Fumed Silica", Journal of the Chinese Chemical Society, 2013, pp. 735-744, vol. 60, No. 7, Wiley-VCH Verlag GmbH & Co. KgaA.

Enick et al., "Post-combustion CO2 capture using phase-changing solvents in a spray dryer: changing aminosilicone liquids into carbamate salt powders", Preprints of Symposia, 2012, pp. 305-307, vol. 57, No. 1, ACS Publications.

Topchiev et al., "Preparation of hexa alkoxy derivatives of cyclotrimethylenesilane", Doklady Akademii Nauk SSSR, 1955, pp. 95-96. vol. 103.

Kriner, "The preparation of cyclic siliconmethylene compounds", Journal of Organic Chemistry, Jun. 1964, pp. 1601-1606, vol. 29.

Kuivila et al., "Trimethylsilyl-substituted norbornenes, norbornanes, and nortricyclene", Journal of Organic Chemistry, Oct. 1964, pp. 2845-2851, vol. 29.

Vidal-Madjar et al., "Fast Analysis of Geometrical Isomers of Complex Compounds by Gas-Solid Chromatography", Gas Chromatography, Sep. 28, 1970-Oct. 2, 1970, pp. 381-386.

Shinji et al., "Novel Mesoporous Materials with a Uniform Distribution of Organic Groups and Inorganic Oxide in Their Frameworks", Journal of the American Chemical Society, Oct. 4, 1999, pp. 9611-9614, vol. 121.

Melde et al., "Mesoporous Sieves with Unified Hybrid Inorganic/Organic Frameworks", Chemistry of Materials, Oct. 9, 1999, pp. 3302-3308, vol. 11.

Grudzien et al., "Cage-like ordered mesoporous organosilicas with isocyanurate bridging groups: Synthesis, template removal and structural properties", Microporous and Mesoporous Materials, pp. 68-77, vol. 118, No. 1-3.

Walcarius et al., "Mesoporous organosilica adsorbents: nanoengineered materials for removal of organic and inorganic pollutants", Journal of Materials Chemistry, Jan. 1, 2010, pp. 4478-4511, vol. 20, No. 22.

"Vidal et al., ""Adsorption of polycyclic aromatic hydrocarbons from aqueous solutions by modified periodic mesoporous organosilica"", Journal of Colloid and Interface Science, Feb. 3, 2011, pp. 466-473, vol. 357, No. 2."

Grudzien et al., "Cage-like mesoporous organosilicas with isocyanurate bridging groups synthesized by soft templating with poly(ethylene oxide)-poly(butylene oxide)-poly(ethylene oxide) block copolymer", Journal of Colloid and Interface Science, May 1, 2009, pp. 354-362, vol. 333, No. 1, Elsevier.

Grudzien et al., "Periodic Mesoporous Organosilicas with Im3m Symmetry and Large Isocyanurate Bridging Groups", The Journal of Physical Chemistry B, Feb. 1, 2006, pp. 2972-2975, vol. 110, No. 7, ACS Publications.

Olkhovyk et al., "Periodic Mesoporous Organosilica with Large Heterocyclic Bridging Groups", Journal of American Chemical Society, Jan. 1, 2005, pp. 60-61, vol. 127, No. 1, ACS Publications.

"Poli et al., ""Different Routes for Preparing Mesoporous Organosilicas Containing the Troger's Base and Their Textural and Catalytic Implications"", The Journal of Physical Chemistry C,Apr. 21, 2011, pp. 7573-7585, vol. 115, No. 15, ACS Publications."

PCT/US2015/065208 International Search Report and Written Opinion dated May 17, 2016.

PCT/US2015/065200 Partial International Search Report and Written Opinion dated May 23, 2016.

"Diaz et al., ""Hybrid organic-inorganic catalytic porous materials synthesized at neutral pH in absence of structural directing agents"", Journal of Materials Chemistry, Jan. 1, 2009, pp. 5970-5979, vol. 19, No. 33, Royal Society of Chemistry."

Reale et al., "A fluoride-catalyzed sol-gel route to catalytically active non-ordered mesoporous silica materials in the absence of surfactants", Journal of Materials Chemistry, Jan. 1, 2005, pp. 1742-1754, vol. 15, No. 17, Royal Society of Chemistry.

PCT/US2015/065200 Partial International Search Report and Written Opinion dated Jul. 18, 2016.

Goethals et al., "Ultra-low-k cyclic carbon-bridged PMO films with a high chemical resistance", Journal of Materials Chemistry, Feb. 21, 2012, pp. 8281-8286, vol. 22.

PCT/US2015/065258 Partial International Search Report and Written Opinion dated dated Mar. 16, 2016.

PCT/US2015/065194 International Search Report and Written Opinion dated Mar. 29, 2016.

PCT/US2015/065191 International Search Report and Written Opinion dated Mar. 29, 2016.

PCT/US2015/065306 International Search Report and Written Opinion dated Mar. 29, 2016.

PCT/US2015/065219 International Search Report and Written Opinion dated Apr. 5, 2016.

PCT/US2015/065283 International Search Report and Written Opinion dated Apr. 6, 2016.

PCT/US2015/065199 International Search Report and Written Opinion dated Apr. 8, 2016.

PCT/US2015/065204 International Search Report and Written Opinion dated Apr. 8, 2016.

PCT/US2015/065225 International Search Report and Written Opinion dated Apr. 8, 2016.

Bahuleyan et al., "One-pot synthesis of spherical periodic mesoporous organosilica supported catalyst bearing Ni(II) α-diimine compleles for ethylene polymerization", Catalysis Communications, 2009, pp. 252-256, vol. 11.

\* cited by examiner

ORGANOSILICA MATERIALS, METHODS OF MAKING, AND USES THEREOF

FIELD OF THE INVENTION

The present invention relates to organosilica materials, methods of making, and uses thereof.

BACKGROUND OF THE INVENTION

Porous inorganic solids have found great utility as catalysts and separation media for industrial application. In particular, mesoporous materials, such as silicas and aluminas, having a periodic arrangement of mesopores are attractive materials for use in catalysis processes due to their uniform and tunable pores, high surface areas and large pore volumes. Such mesoporous materials are known to have large specific surface areas (e.g., 1000 m²/g) and large pore volumes (e.g., 1 cm³/g). For these reasons, such mesoporous materials enable reactive catalysts.

Mesoporous organosilica materials are conventionally formed by the self-assembly of the silsesquioxane precursor in the presence of a structure directing agent, a porogen and/or a framework element. The precursor is hydrolysable and condenses around the structure directing agent. These materials have been referred to as Periodic Mesoporous Organosilicates (PMOs), due to the presence of periodic arrays of parallel aligned mesoscale channels. For example, Landskron, K., et al. [*Science*, 302:266-269 (2003)] report the self-assembly of 1,1,3,3,5,5-hexaethoxy-1,3,5-trisilacyclohexane [(EtO)$_2$SiCH$_2$]$_3$ in the presence of a base and the structure directing agent, cetyltrimethylammonium bromide, to form PMOs that are bridged organosilicas with a periodic mesoporous framework, which consist of SiO$_3$R or SiO$_2$R$_2$ building blocks, where R is a bridging organic group. In PMOs, the organic groups can be homogenously distributed in the pore walls. U.S. Patent Application Publication No. 2012/0059181 reports the preparation of a crystalline hybrid organic-inorganic silicate formed from 1,1,3,3,5,5-hexaethoxy-1,3,5-trisilacyclohexane in the presence of NaAlO$_2$ and base. U.S. Patent Application Publication No. 2007/003492 reports preparation of a composition formed from 1,1,3,3,5,5-hexaethoxy-1,3,5-trisilacyclohexane in the presence of propylene glycol monomethyl ether.

However, the use of a structure directing agent, such as a surfactant, in the preparation of an organosilica material, requires a complicated, energy intensive process to eliminate the structure directing agent at the end of the preparation process. For example, calcining may be required as well as wastewater disposal steps and associated costs to dispose of the structure directing agent. This limits the ability to scale-up the process for industrial applications. Additionally, because of the relative expense of complex organic-inorganic hybrid siliceous (monomer) materials, it would be beneficial to maintain as many of the structure and properties as possible of a material made from relatively expensive siliceous reactants, while lowering the cost by co-incorporating less expensive reactants, such as silica.

Therefore, there is a need for improved catalysts/adsorbents and/or processes for making catalysts using organosilica materials that can be prepared at as low a cost as possible by methods that can be practiced in the absence of a structure directing agent, porogen, or surfactant.

SUMMARY OF THE INVENTION

In one aspect, embodiments of the invention provide a method of making an organosilica material. The method can advantageously include a step of providing an aqueous mixture that contains essentially no structure directing agent and/or porogen. To the aqueous mixture can be added at least one compound of: (i) Formula (I), [Z$^{15}$Z$^{16}$SiCH$_2$]$_3$, wherein each Z$^{15}$ can be a C$_1$-C$_4$ alkoxy group and each Z$^{16}$ can be a C$_1$-C$_4$ alkoxy group or a C$_1$-C$_4$ alkyl group; and/or (ii) a cyclic polyurea monomer of formula (IV),

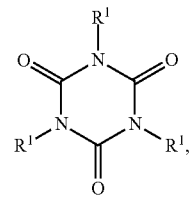

wherein each R$^1$ independently is a X$^5$OX$^6$X$^7$SiX$^8$ group, wherein each X$^5$ represents a C$_1$-C$_4$ alkyl group; X$^6$ and X$^7$ each independently represent a C$_1$-C$_4$ alkyl group or a C$_1$-C$_4$ alkoxy group; and each X$^8$ represents a C$_1$-C$_8$ alkylene group bonded to a nitrogen atom of the cyclic polyurea; and (iii) an additional comonomer comprising a source of silica that is reactive to polymerize with the at least one compound of Formula (I) and/or Formula (IV). The thus-formed solution can then be aged to produce a pre-product, which can be dried to obtain the organosilica material, which is a polymer comprising at least one independent monomer of Formula (I) and/or Formula (IV) as described herein that are linked to the silica through at least one silyl ether bond.

In another aspect, organosilica materials made according to the methods of the invention are provided. Additionally or alternatively, an organosilica material can include a polymer of at least one independent monomer comprising: (i) a monomer of formula (I), [Z$^{15}$Z$^{16}$SiCH$_2$]$_3$, wherein each Z$^{15}$ can individually be a C$_1$-C$_4$ alkyl group, a C$_1$-C$_4$ alkoxy group, a hydroxyl group, or an oxygen atom bonded to a silicon atom of another monomer, and each Z$^{16}$ can individually be a C$_1$-C$_4$ alkyl group, a C$_1$-C$_4$ alkoxy group, a hydroxyl group, or an oxygen atom bonded to a silicon atom of another monomer; and/or (ii) a cyclic polyurea monomer of formula (IV),

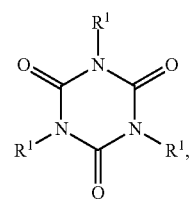

wherein each R$^1$ independently is a X$^5$OX$^6$X$^7$SiX$^8$ group, wherein each X$^5$ represents a hydrogen atom, a C$_1$-C$_4$ alkyl group, or a bond to a silicon atom of another monomer unit; X$^6$ and X$^7$ each independently represent a hydroxyl group, a C$_1$-C$_4$ alkyl group, a C$_1$-C$_4$ alkoxy group, or an oxygen atom bonded to a silicon atom of another monomer unit; and each X$^8$ represents a C$_1$-C$_8$ alkylene group bonded to a nitrogen atom of the cyclic polyurea; and (iii) an additional monomer comprising a source of silica that is reactive to polymerize with the at least one independent monomer.

Other embodiments, including particular aspects of the embodiments summarized above, will be evident from the detailed description that follows.

DETAILED DESCRIPTION OF THE INVENTION

Figure 1:
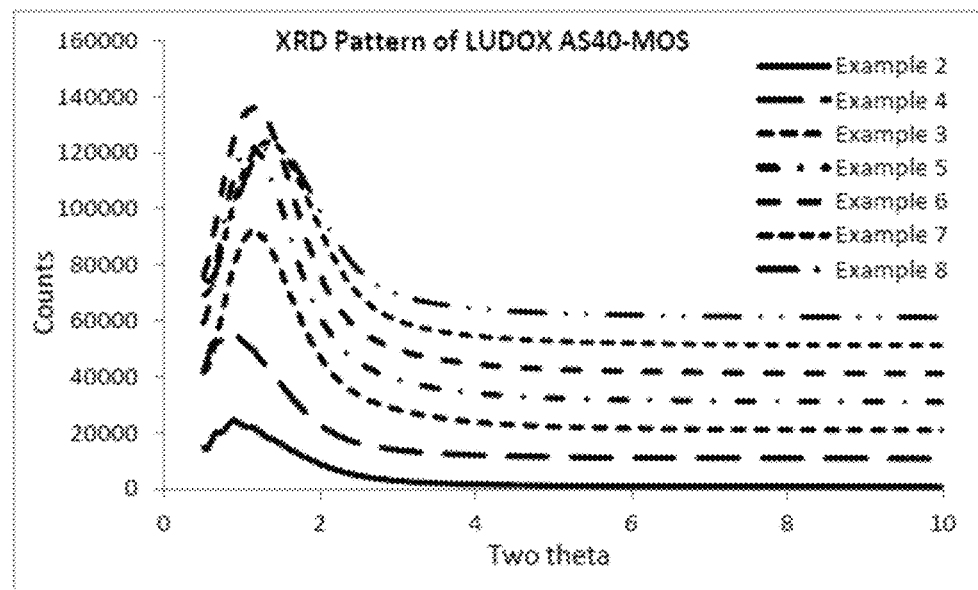
FIG. 1 illustrates x-ray diffraction (XRD) spectra for organosilica materials made according to Examples 2-8, using LUDOX® AS-40 colloidal silica.

In various aspects of the invention, organosilica materials and methods for making organosilica materials are provided herein.

I. Definitions

For purposes of this invention and the claims hereto, the numbering scheme for the Periodic Table Groups is according to the IUPAC Periodic Table of Elements.

The term "and/or" as used in a phrase such as "A and/or B" herein is intended to include "A and B", "A or B", "A", and "B".

The terms "substituent", "radical", "group", and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

As used herein, and unless otherwise specified, the term "alkyl" refers to a saturated hydrocarbon radical having from 1 to 12 carbon atoms (i.e. $C_1$-$C_{12}$ alkyl), particularly from 1 to 8 carbon atoms (i.e. $C_1$-$C_8$ alkyl), particularly from 1 to 6 carbon atoms (i.e. $C_1$-$C_6$ alkyl), and particularly from 1 to 4 carbon atoms (i.e. $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g. —$CH_2CH_2CH_2CH_3$, —$(CH_3)CHCH_2CH_3$, —$CH_2CH(CH_3)_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "alkylene" refers to a divalent alkyl moiety containing 1 to 12 carbon atoms (i.e. $C_1$-$C_{12}$ alkylene) in length and meaning the alkylene moiety is attached to the rest of the molecule at both ends of the alkyl unit. For example, alkylenes include, but are not limited to, —$CH_2$—, —$CH_2CH_2$—, —$CH(CH_3)CH_2$—, —$CH_2CH_2CH_2$—, etc. The alkylene group may be linear or branched.

As used herein, and unless otherwise specified, the term "nitrogen-containing alkyl" refers to an alkyl group as defined herein wherein one or more carbon atoms in the alkyl group is substituted with a nitrogen atom or a nitrogen-containing cyclic hydrocarbon having from 2 to 10 carbon atoms (i.e., a nitrogen-containing cyclic $C_2$-$C_{10}$ hydrocarbon), particularly having from 2 to 5 carbon atoms (i.e., a nitrogen-containing cyclic $C_2$-$C_5$ hydrocarbon), and particularly having from 2 to 5 carbon atoms (i.e., a nitrogen-containing cyclic $C_2$-$C_5$ hydrocarbon). The nitrogen-containing cyclic hydrocarbon may have one or more nitrogen atoms. The nitrogen atom(s) may optionally be substituted with one or two $C_1$-$C_6$ alkyl groups. The nitrogen-containing alkyl can have from 1 to 12 carbon atoms (i.e. $C_1$-$C_{12}$ nitrogen-containing alkyl), particularly from 1 to 10 carbon atoms (i.e. $C_1$-$C_{10}$ nitrogen-containing alkyl), particularly from 2 to 10 carbon atoms (i.e. $C_2$-$C_{10}$ nitrogen-containing alkyl), particularly from 3 to 10 carbon atoms (i.e. $C_3$-$C_{10}$ nitrogen-containing alkyl), and particularly from 3 to 8 carbon atoms (i.e. $C_1$-$C_{10}$ nitrogen-containing alkyl). Examples of nitrogen-containing alkyls include, but are not limited to,

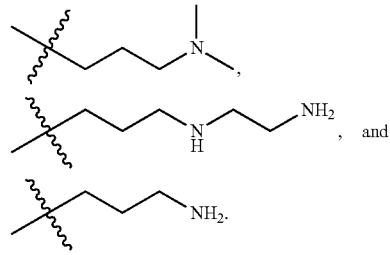

, and

As used herein, and unless otherwise specified, the term "nitrogen-containing alkylene" refers to an alkylene group as defined herein wherein one or more carbon atoms in the alkyl group is substituted with a nitrogen atom. The nitrogen atom(s) may optionally be substituted with one or two $C_1$-$C_6$ alkyl groups. The nitrogen-containing alkylene can have from 1 to 12 carbon atoms (i.e. $C_1$-$C_{12}$ nitrogen-containing alkylene), particularly from 2 to 10 carbon atoms (i.e. $C_2$-$C_{10}$ nitrogen-containing alkylene), particularly from 3 to 10 carbon atoms (i.e. $C_3$-$C_{10}$ nitrogen-containing alkylene), particularly from 4 to 10 carbon atoms (i.e. $C_4$-$C_{10}$ nitrogen-containing alkylene), and particularly from 3 to 8 carbon atoms (i.e. $C_3$-$C_8$ nitrogen-containing alkyl). Examples of nitrogen-containing alkylenes include, but are not limited to,

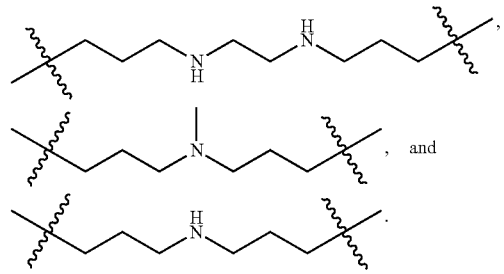

As used herein, and unless otherwise specified, the term "alkenyl" refers to an unsaturated hydrocarbon radical having from 2 to 12 carbon atoms (i.e., $C_2$-$C_{12}$ alkenyl), particularly from 2 to 8 carbon atoms (i.e., $C_2$-$C_8$ alkenyl), particularly from 2 to 6 carbon atoms (i.e., $C_2$-$C_6$ alkenyl), and having one or more (e.g., 2, 3, etc.) carbon-carbon double bonds. The alkenyl group may be linear, branched or cyclic. Examples of alkenyls include, but are not limited to ethenyl (vinyl), 2-propenyl, 3-propenyl, 1,4-pentadienyl, 1,4-butadienyl, 1-butenyl, 2-butenyl and 3-butenyl. "Alkenyl" is intended to embrace all structural isomeric forms of an alkenyl. For example, butenyl encompasses 1,4-butadienyl, 1-butenyl, 2-butenyl and 3-butenyl, etc.

As used herein, and unless otherwise specified, the term "alkenylene" refers to a divalent alkenyl moiety containing 2 to about 12 carbon atoms (i.e. $C_2$-$C_{12}$ alkenylene) in length and meaning that the alkylene moiety is attached to the rest of the molecule at both ends of the alkyl unit. For example, alkenylenes include, but are not limited to, —CH═CH—, —CH═CHCH$_2$—, —CH═CH═CH—, —CH$_2$CH$_2$CH═CHCH$_2$—, etc. —CH$_2$CH$_2$—, —CH(CH$_3$)CH$_2$—, —CH$_2$CH$_2$CH$_2$—, etc. The alkenylene group may be linear or branched.

As used herein, and unless otherwise specified, the term "alkynyl" refers to an unsaturated hydrocarbon radical having from 2 to 12 carbon atoms (i.e., $C_2$-$C_{12}$ alkynyl), particularly from 2 to 8 carbon atoms (i.e., $C_2$-$C_8$ alkynyl), particularly from 2 to 6 carbon atoms (i.e., $C_2$-$C_6$ alkynyl), and having one or more (e.g., 2, 3, etc.) carbon-carbon triple bonds. The alkynyl group may be linear, branched or cyclic. Examples of alkynyls include, but are not limited to ethynyl, 1-propynyl, 2-butynyl, and 1,3-butadiynyl. "Alkynyl" is intended to embrace all structural isomeric forms of an alkynyl. For example, butynyl encompasses 2-butynyl, and 1,3-butadiynyl and propynyl encompasses 1-propynyl and 2-propynyl (propargyl).

As used herein, and unless otherwise specified, the term "alkynylene" refers to a divalent alkynyl moiety containing 2 to about 12 carbon atoms (i.e. $C_2$-$C_{12}$ alkenylene) in length and meaning that the alkylene moiety is attached to the rest of the molecule at both ends of the alkyl unit. For example, alkenylenes include, but are not limited to, —C≡C—, —C≡CCH$_2$—, —C≡CCH$_2$C≡C—, —CH$_2$CH$_2$C≡CCH$_2$—, etc. —CH$_2$CH$_2$—, —CH(CH$_3$)CH$_2$—, —CH$_2$CH$_2$CH$_2$—, etc. The alkynylene group may be linear or branched.

As used herein, and unless otherwise specified, the term "alkoxy" refers to —O-alkyl containing from 1 to about 10 carbon atoms. The alkoxy may be straight-chain or branched-chain. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy. Further, as used herein, "OMe" refers to methoxy and "OEt" refers to ethoxy.

As used herein, and unless otherwise specified, the term "aromatic" refers to unsaturated cyclic hydrocarbons having a delocalized conjugated π system and having from 5 to 20 carbon atoms (aromatic $C_5$-$C_{20}$ hydrocarbon), particularly from 5 to 12 carbon atoms (aromatic $C_5$-$C_{12}$ hydrocarbon), and particularly from 5 to 10 carbon atoms (aromatic $C_5$-$C_{12}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof. Additionally, the aromatic may comprise one or more heteroatoms. Examples of heteroatoms include, but are not limited to, nitrogen, oxygen, and/or sulfur. Aromatics with one or more heteroatom include, but are not limited to furan, benzofuran, thiophene, benzothiophene, oxazole, thiazole and the like, and combinations thereof. The aromatic may comprise monocyclic, bicyclic, tricyclic, and/or polycyclic rings (in some embodiments, at least monocyclic rings, only monocyclic and bicyclic rings, or only monocyclic rings) and may be fused rings.

As used herein, and unless otherwise specified, the term "aryl" refers to any monocyclic or polycyclic cyclized carbon radical containing 6 to 14 carbon ring atoms, wherein at least one ring is an aromatic hydrocarbon. Examples of aryls include, but are not limited to phenyl, naphthyl, pyridinyl, and indolyl.

As used herein, and unless otherwise specified, the term "aralkyl" refers to an alkyl group substituted with an aryl group. The alkyl group may be a $C_1$-$C_{10}$ alkyl group, particularly a $C_1$-$C_6$, particularly a $C_1$-$C_4$ alkyl group, and particularly a $C_1$-$C_3$ alkyl group. Examples of aralkyl groups include, but are not limited to phenymethyl, phenylethyl, and naphthylmethyl. The aralkyl may comprise one or more heteroatoms and be referred to as a "heteroaralkyl." Examples of heteroatoms include, but are not limited to, nitrogen (i.e., nitrogen-containing heteroaralkyl), oxygen (i.e., oxygen-containing heteroaralkyl), and/or sulfur (i.e., sulfur-containing heteroaralkyl). Examples of heteroaralkyl groups include, but are not limited to, pyridinylethyl, indolylmethyl, furylethyl, and quinolinylpropyl.

As used herein, and unless otherwise specified, the term "heterocyclo" refers to fully saturated, partially saturated or unsaturated or polycyclic cyclized carbon radical containing from 4 to 20 carbon ring atoms and containing one or more heteroatoms atoms. Examples of heteroatoms include, but are not limited to, nitrogen (i.e., nitrogen-containing heterocyclo), oxygen (i.e., oxygen-containing heterocyclo), and/or sulfur (i.e., sulfur-containing heterocyclo). Examples of heterocyclo groups include, but are not limited to, thienyl, furyl, pyrrolyl, piperazinyl, pyridyl, benzoxazolyl, quinolinyl, imidazolyl, pyrrolidinyl, and piperidinyl.

As used herein, and unless otherwise specified, the term "heterocycloalkyl" refers to an alkyl group substituted with heterocyclo group. The alkyl group may be a $C_1$-$C_{10}$ alkyl group, particularly a $C_1$-$C_6$, particularly a $C_1$-$C_4$ alkyl group, and particularly a $C_1$-$C_3$ alkyl group. Examples of heterocycloalkyl groups include, but are not limited to thienylmethyl, furylethyl, pyrrolylmethyl, piperazinylethyl, pyridylmethyl, benzoxazolylethyl, quinolinylpropyl, and imidazolylpropyl.

As used herein, the term "hydroxyl" refers to an —OH group.

As used herein, the term "mesoporous" refers to solid materials having pores that have a diameter within the range of from about 2 nm to about 50 nm.

As used herein, the term "organosilica" refers to an organosiloxane compound that comprises one or more organic groups bound to two or more Si atoms.

As used herein, the term "silanol" refers to a Si—OH group.

As used herein, the term "silanol content" refers to the percent of the Si—OH groups in a compound and can be calculated by standard methods, such as NMR.

As used herein, the terms "structure directing agent," "SDA," and/or "porogen" refer to one or more compounds added to the synthesis media to aid in and/or guide the polymerization and/or polycondensing and/or organization of the building blocks that form the organosilica material framework. Further, a "porogen" is understood to be a compound capable of forming voids or pores in the resultant organosilica material framework. As used herein, the term "structure directing agent" encompasses and is synonymous and interchangeable with the terms "templating agent" and "template."

As used herein, and unless otherwise specified, the term "adsorption" includes physisorption, chemisorption, and condensation onto a solid material and combinations thereof.

II. Organosilica Material

The invention relates to organosilica materials. In a first embodiment, the organosilica material may be a polymer of at least one independent monomer comprising: (i) a monomer of formula (I), $[Z^{15}Z^{16}SiCH_2]_3$, wherein each $Z^{15}$ can individually be a $C_1$-$C_4$ alkyl group, a $C_1$-$C_4$ alkoxy group, a hydroxyl group, or an oxygen atom bonded to a silicon atom of another monomer, and each $Z^{16}$ can individually be a $C_1$-$C_4$ alkyl group, a $C_1$-$C_4$ alkoxy group, a hydroxyl group, or an oxygen atom bonded to a silicon atom of another monomer; and/or (ii) a cyclic polyurea monomer of formula (IV),

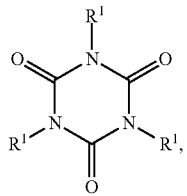

wherein each $R^1$ independently is a $X^5OX^6X^7SiX^8$ group, wherein each $X^5$ represents a hydrogen atom, a $C_1$-$C_4$ alkyl group, or a bond to a silicon atom of another monomer unit; $X^6$ and $X^7$ each independently represent a hydroxyl group, a $C_1$-$C_4$ alkyl group, a $C_1$-$C_4$ alkoxy group, or an oxygen atom bonded to a silicon atom of another monomer unit; and each $X^8$ represents a $C_1$-$C_8$ alkylene group bonded to a nitrogen atom of the cyclic polyurea; (iii) an additional comonomer comprising a source of silica that is reactive to polymerize with the at least one independent monomer; and optionally one or more additional comonomers comprising: (iv) a monomer of Formula (II), $Z^5OZ^6Z^7Z^8Si$, wherein each $Z^5$ can be a hydrogen atom, a $C_1$-$C_4$ alkyl group, or a bond to a silicon atom of another monomer; and $Z^6$, $Z^7$ and $Z^8$ each independently can be selected from the group consisting of a hydroxyl group, a $C_1$-$C_4$ alkyl group, a $C_1$-$C_4$ alkoxy group, a nitrogen-containing $C_1$-$C_{10}$ alkyl group, a nitrogen-containing heteroaralkyl group, a nitrogen-containing optionally substituted heterocycloalkyl group, and an oxygen atom bonded to a silicon atom of another monomer; and/or (v) an independent unit of formula (III), $Z^9Z^{10}Z^{11}Si$—R—$SiZ^9Z^{10}Z^{11}$, wherein each $Z^9$ independently can be a hydroxyl group, a $C_1$-$C_4$ alkoxy group, or an oxygen atom bonded to a silicon atom of another comonomer; each $Z^{10}$ and $Z^{11}$ independently can be a hydroxyl group, a $C_1$-$C_4$ alkoxy group, a $C_1$-$C_4$ alkyl group, or an oxygen atom bonded to a silicon atom of another monomer, and R can be selected from the group consisting of a $C_1$-$C_8$ alkylene group, a $C_2$-$C_8$ alkenylene group, a $C_2$-$C_8$ alkynylene group, optionally substituted $C_6$-$C_{20}$ aralkyl, and an optionally substituted $C_4$-$C_{20}$ heterocycloalkyl group.

As used herein, and unless otherwise specified, "a bond to a silicon atom of another monomer" means the bond can advantageously displace a moiety (particularly an oxygen-containing moiety such as a hydroxyl, an alkoxy or the like), if present, on a silicon atom of the another monomer so there may be a bond directly to the silicon atom of the another monomer thereby connecting the two monomers, e.g., via a Si—O—Si linkage. As used herein, and unless otherwise specified, "an oxygen atom bonded to a silicon atom of another monomer" means that the oxygen atom can advantageously displace a moiety (particularly an oxygen-containing moiety such as a hydroxyl, an alkoxy or the like), if present, on a silicon atom of the another monomer so the oxygen atom may be bonded directly to the silicon atom of the another monomer thereby connecting the two monomers, e.g., via a Si—O—Si linkage. For clarity, in the aforementioned bonding scenarios, the "another monomer" can be a monomer of the same type or a monomer of a different type.

A. Monomers of Formula (I)

In various embodiments, the organosilica material can be a polymer comprising independent units of a monomer of Formula (I), $[Z^{15}Z^{16}SiCH_2]_3$, wherein each $Z^{15}$ represents a hydroxyl group, a $C_1$-$C_4$ alkoxy group or an oxygen atom bonded to a silicon atom of another monomer and each $Z^{16}$ represents a hydroxyl group, a $C_1$-$C_4$ alkoxy group, a $C_1$-$C_4$ alkyl group, or an oxygen atom bonded to a silicon atom of another monomer In one embodiment, each $Z^{15}$ can be a hydroxyl group.

Additionally or alternatively, each $Z^{15}$ can be a $C_1$-$C_4$ alkoxy group, a $C_1$-$C_3$ alkoxy group, a $C_1$-$C_2$ alkoxy group, or methoxy.

Additionally or alternatively, each $Z^{15}$ can be an oxygen atom bonded to a silicon atom of another monomer.

Additionally or alternatively, each $Z^{15}$ can be a hydroxyl group, a $C_1$-$C_2$ alkoxy group, or an oxygen atom bonded to a silicon atom of another monomer.

Additionally or alternatively, each $Z^{16}$ can be a hydroxyl group.

Additionally or alternatively, each $Z^{16}$ can be a $C_1$-$C_4$ alkoxy group, a $C_1$-$C_3$ alkoxy group, a $C_1$-$C_2$ alkoxy group, or methoxy.

Additionally or alternatively, each $Z^{16}$ can be a $C_1$-$C_4$ alkyl group, a $C_1$-$C_3$ alkyl group, a $C_1$-$C_2$ alkyl group, or methyl.

Additionally or alternatively, each $Z^{16}$ can be an oxygen atom bonded to a silicon atom of another monomer.

Additionally or alternatively, each $Z^{16}$ can be a hydroxyl group, a $C_1$-$C_2$ alkoxy group, a $C_1$-$C_2$ alkyl group, or an oxygen atom bonded to a silicon atom of another monomer.

Additionally or alternatively, each $Z^{15}$ can be a hydroxyl group, a $C_1$-$C_2$ alkoxy group, or an oxygen atom bonded to a silicon atom of another monomer and each $Z^{16}$ can be a hydroxyl group, a $C_1$-$C_2$ alkyl group, a $C_1$-$C_2$ alkoxy group, or an oxygen atom bonded to a silicon atom of another monomer.

Additionally or alternatively, each $Z^{15}$ can be a hydroxyl group, ethoxy, or an oxygen atom bonded to a silicon atom of another siloxane and each $Z^{16}$ can be a hydroxyl group, ethoxy, or an oxygen atom bonded to a silicon atom of another monomer.

Additionally or alternatively, each $Z^{15}$ can be a hydroxyl group or an oxygen atom bonded to a silicon atom of another siloxane and each $Z^{16}$ can be a hydroxyl group, or an oxygen atom bonded to a silicon atom of another monomer.

Additionally or alternatively, each $Z^{15}$ can be a hydroxyl group, ethoxy, or an oxygen atom bonded to a silicon atom of another monomer and each $Z^{16}$ can be methyl. Additionally or alternatively, each $Z^{15}$ can be a hydroxyl group or an oxygen atom bonded to a silicon atom of another monomer and each $Z^{15}$ can be methyl.

B. Monomers of Formula (IV)

Additionally or alternatively, the organosilica material can be a polymer comprising independent units of a monomer of Formula (IV),

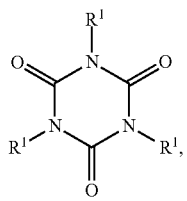

wherein each $R^1$ independently is a $X^5OX^6X^7SiX^8$ group, wherein each $X^5$ represents a hydrogen atom, a $C_1$-$C_4$ alkyl group, or a bond to a silicon atom of another monomer unit; $X^6$ and $X^7$ each independently represent a hydroxyl group, a $C_1$-$C_4$ alkyl group, a $C_1$-$C_4$ alkoxy group, or an oxygen atom bonded to a silicon atom of another monomer unit; and each $X^8$ represents a $C_1$-$C_8$ alkylene group bonded to a nitrogen atom of the cyclic polyurea In various embodiments, each $X^5$ can be a hydrogen atom.

Additionally or alternatively, each $X^5$ can be a $C_1$-$C_4$ alkyl group, a $C_1$-$C_3$ alkyl group, a $C_1$-$C_2$ alkyl group or methyl.

Additionally or alternatively, each $X^5$ can be a bond to a silicon atom of another monomer.

Additionally or alternatively, each $X^5$ can be a hydrogen atom, a $C_1$-$C_2$ alkyl group or a bond to a silicon atom of another monomer.

Additionally or alternatively, $X^6$ and $X^7$ each independently can be a hydroxyl group.

Additionally or alternatively, $X^6$ and $X^7$ each independently can be a $C_1$-$C_4$ alkyl group, a $C_1$-$C_3$ alkyl group, a $C_1$-$C_2$ alkyl group or methyl.

Additionally or alternatively, $X^6$ and $X^7$ each independently can be a $C_1$-$C_4$ alkoxy group, a $C_1$-$C_3$ alkoxy group, a $C_1$-$C_2$ alkoxy group or methoxy.

Additionally or alternatively, $X^6$ and $X^7$ each independently can be an oxygen atom bonded to a silicon atom of another monomer.

Additionally or alternatively, $X^6$ and $X^7$ each independently can be a hydroxyl group, a $C_1$-$C_2$ alkyl group, a $C_1$-$C_2$ alkoxy group, or an oxygen atom bonded to a silicon atom of another monomer.

Additionally or alternatively, each $X^5$ can be a hydrogen atom, a $C_1$-$C_2$ alkyl group or a bond to a silicon atom of another monomer; and $X^6$ and $X^7$ each independently can be a hydroxyl group, a $C_1$-$C_2$ alkyl group, a $C_1$-$C_2$ alkoxy group, or an oxygen atom bonded to a silicon atom of another monomer.

Additionally or alternatively, each $X^8$ can be a $C_1$-$C_7$ alkylene group bonded to a nitrogen atom of the cyclic polyurea, a $C_1$-$C_7$ alkylene group bonded to a nitrogen atom of the cyclic polyurea, a $C_1$-$C_6$ alkylene group bonded to a nitrogen atom of the cyclic polyurea, a $C_1$-$C_4$ alkylene group bonded to a nitrogen atom of the cyclic polyurea, a $C_1$-$C_3$ alkylene group bonded to a nitrogen atom of the cyclic polyurea, a $C_1$-$C_2$ alkylene group bonded to a nitrogen atom of the cyclic polyurea, or —$CH_2$— bonded to a nitrogen atom of the cyclic polyurea.

Additionally or alternatively, each $X^5$ can be a hydrogen atom, a $C_1$-$C_2$ alkyl group or a bond to a silicon atom of another monomer; $X^6$ and $X^7$ each independently can be a hydroxyl group, a $C_1$-$C_2$ alkyl group, a $C_1$-$C_2$ alkoxy group, or an oxygen atom bonded to a silicon atom of another monomer; and $X^8$ can be a $C_1$-$C_4$ alkylene group bonded to a nitrogen atom of the cyclic polyurea.

Additionally or alternatively, each $X^5$ can be a hydrogen atom or a bond to a silicon atom of another monomer; $X^6$ and $X^7$ each independently can be a hydroxyl group, a $C_1$-$C_2$ alkyl group or an oxygen atom bonded to a silicon atom of another monomer; and $X^8$ can be a $C_1$-$C_4$ alkylene group bonded to a nitrogen atom of the cyclic polyurea.

Additionally or alternatively, each $X^5$ can be a hydrogen atom or a bond to a silicon atom of another monomer; $X^6$ and $X^7$ each independently can be a hydroxyl group or an oxygen atom bonded to a silicon atom of another monomer; and $X^8$ can be a $C_1$-$C_4$ alkylene group bonded to a nitrogen atom of the cyclic polyurea.

In a particular embodiment, each $X^5$ can be a hydrogen atom, methyl, or a bond to a silicon atom of another monomer; $X^6$ and $X^7$ each independently can be a hydroxyl group, methoxy or an oxygen atom bonded to a silicon atom of another monomer; and $X^8$ can be —$CH_2CH_2CH_2$— bonded to a nitrogen atom of the cyclic polyurea.

In another particular embodiment, each $X^5$ can be a hydrogen atom or a bond to a silicon atom of another monomer; $X^6$ and $X^7$ each independently can be a hydroxyl group or an oxygen atom bonded to a silicon atom of another monomer; and $X^8$ can be —$CH_2CH_2CH_2$— bonded to a nitrogen atom of the cyclic polyurea.

C. Source of Reactive Silica

In various embodiments, the organosilica material further comprises an additional monomer in combination with independent units of Formula (I) and/or Formula (IV), which is a source of silica that is reactive to polymerize therewith. In order to participate in (condensation) polymerization reactions with the other monomers, the silica should typically have (or be treated to have) some hydroxyl group functionality. Examples of silica sources can include, but are not limited to, colloidal silica (such as commercially under the tradename LUDOX™ from W.R. Grace & Co. of Columbia, Md., USA) and/or other particulate silicas having a sufficiently small particle size. Particle sizes of silicas can be approximated as the diameter of spherical (or near-spherical) particles. If particles are substantially non-spherical, then their particle size herein can be a simple average of the sizes of the three dimensions (whether length/width/height for polygonal and/or elliptical particles, diameter/height for circular cylindrical particles, or other appropriate dimensions for some other odd shape). Additionally or alternatively, silica sources can include pre-polymerized/pre-oligomerized versions of particulate silicas, which can be linked to each other via condensation through the presence of a hydroxyl group attached to one or more, preferably two or more, silicon atoms thereof.

Exemplary average particle sizes for particulate/colloidal silica sources can be up to about 400 nm, e.g., up to about 250 nm, up to about 150 nm, up to about 120 nm, up to about 100 nm, up to about 80 nm, up to about 60 nm, up to about 50 nm, up to about 40 nm, up to about 30 nm, up to about 25 nm, up to about 20 nm, up to about 15 nm, or up to about 10 nm. In particular, the average particle size can be up to about 150 nm, up to about 100 nm, up to about 50 nm, up to about 30 nm, or up to about 25 nm. While minimum particle size is not believed to be critical in most embodiments, in some embodiments the practical minimum average particle size can be about 5 nm or about 3 nm. In particular, the average particle size can be from about 3 nm to about 150 nm, about 3 nm to about 100 nm, about 3 nm to about 50 nm, or about 5 nm to about 30 nm. Additionally or alternatively, the silica sources can have particle size distributions such that the d95 (i.e., the diameter of which about 95% of particles in the distribution meet or exceed) can be up to about 500 nm, e.g., up to about 250 nm, up to about 200 nm, up to about 175 nm, up to about 150 nm, up to about 125 nm, up to about 100 nm, up to about 80 nm, up to about 60 nm, up to about 50 nm, up to about 40 nm, up to about 30 nm, up to about 25 nm, up to about 20 nm, up to about 15 nm, or up to about 10 nm; optionally, in such embodiments, the d95 of the particle size distribution can be at least about 3 nm, e.g., at least about 5 nm, at least about 10 nm, at least about 15 nm, at least about 20 nm, or at least about 25 nm. In particular, the d95 of the particle size distribution can be from about 3 nm to about 200 nm, from about 5 nm to about 100 nm, from about 5 nm to about 60 nm, or from about 10 nm to about 50 nm.

If treatment of the silica source is necessary or desired, to attain adequate or additional hydroxyl group functionality for polymerization reaction, it can typically be accomplished under basic pH conditions. Such treatment may affect aspects of the particle size distribution of the silica source, including the d95 and/or average particle sizes, in which case the treated values are to be used. Furthermore, silica sources according to this invention are typically not treated to have so many hydroxyl group functionalities that the silica sources react to form predominantly (i.e., more than 50 mol %) $Si(OH)_4$.

D. Monomers of Formula (II)

In various embodiments, the organosilica material may further comprise another monomer in combination with independent units of Formula (I) and/or Formula (IV), as well as sources of silica that are reactive to polymerize therewith, such as another monomer having at least one independent unit of Formula (II) $Z^5OZ^6Z^7Z^8Si$, wherein each $Z^5$ can be a hydrogen atom, a $C_1$-$C_4$ alkyl group or a bond to a silicon atom of another monomer; and $Z^6$, $Z^7$ and $Z^8$ each independently can be selected from the group consisting of a hydroxyl group, a $C_1$-$C_4$ alkyl group, a $C_1$-$C_4$ alkoxy group, a nitrogen-containing $C_1$-$C_{10}$ alkyl group, a nitrogen-containing heteroaralkyl group, and a nitrogen-containing optionally substituted heterocycloalkyl group, and an oxygen atom bonded to a silicon atom of another monomer.

Additionally or alternatively, each $Z^5$ can be a hydrogen atom, a $C_1$-$C_4$ alkyl group or a bond to a silicon atom of another monomer; and $Z^6$, $Z^7$ and $Z^8$ each independently can be selected from the group consisting of a hydroxyl group, a $C_1$-$C_4$ alkyl group, a $C_1$-$C_4$ alkoxy group, and an oxygen atom bonded to a silicon atom of another monomer. Additionally or alternatively, $Z^6$, $Z^7$ and $Z^8$ each independently can optionally be a nitrogen-containing $C_1$-$C_{10}$ alkyl group, a nitrogen-containing heteroaralkyl group, and/or a nitrogen-containing optionally substituted heterocycloalkyl group.

In various aspects, each $Z^5$ can be a hydrogen atom.

Additionally or alternatively, each $Z^5$ can be a $C_1$-$C_4$ alkyl group, a $C_1$-$C_3$ alkyl group, a $C_1$-$C_2$ alkyl group or methyl.

Additionally or alternatively, each $Z^5$ can be a hydrogen atom or a $C_1$-$C_2$ alkyl group.

Additionally or alternatively, each $Z^5$ can be a bond to a silicon atom of another monomer.

Additionally or alternatively, each $Z^5$ can be a hydrogen atom, a $C_1$-$C_2$ alkyl group or a bond to a silicon atom of another monomer.

Additionally or alternatively, each $Z^5$ can be a hydrogen atom, ethyl, methyl or a bond to a silicon atom of another monomer.

Additionally or alternatively, $Z^6$, $Z^7$ and $Z^8$ each independently can be a hydroxyl group.

Additionally or alternatively, each $Z^5$ can be a hydrogen atom, a $C_1$-$C_2$ alkyl group or a bond to a silicon atom of another monomer; and $Z^6$, $Z^7$ and $Z^8$ each independently can be a hydroxyl group.

Additionally or alternatively, $Z^6$, $Z^7$ and $Z^8$ each independently can be a $C_1$-$C_4$ alkyl group, a $C_1$-$C_3$ alkyl group, a $C_1$-$C_2$ alkyl group or methyl.

Additionally or alternatively, $Z^6$, $Z^7$ and $Z^8$ each independently can be a hydroxyl group or a $C_1$-$C_2$ alkyl group.

Additionally or alternatively, each $Z^5$ can be a hydrogen atom, a $C_1$-$C_2$ alkyl group or a bond to a silicon atom of another monomer; and $Z^6$, $Z^7$ and $Z^8$ each independently can be a hydroxyl group or a $C_1$-$C_2$ alkyl group.

Additionally or alternatively, $Z^6$, $Z^7$ and $Z^8$ each independently can be a $C_1$-$C_4$ alkoxy group, a $C_1$-$C_3$ alkoxy group, a $C_1$-$C_2$ alkoxy group or methoxy.

Additionally or alternatively, $Z^6$, $Z^7$ and $Z^8$ each independently can be selected from the group consisting of a hydroxyl group, a $C_1$-$C_2$ alkyl group and a $C_1$-$C_2$ alkoxy group.

Additionally or alternatively, each $Z^5$ can be a hydrogen atom, a $C_1$-$C_2$ alkyl group or a bond to a silicon atom of another monomer; and $Z^6$, $Z^7$ and $Z^8$ each can be selected from the group consisting of a hydroxyl group, a $C_1$-$C_2$ alkyl group and a $C_1$-$C_2$ alkoxy group.

Additionally or alternatively, $Z^6$, $Z^7$ and $Z^8$ each independently can optionally be a nitrogen-containing $C_1$-$C_{10}$ alkyl group, a nitrogen-containing $C_1$-$C_9$ alkyl group, a nitrogen-containing $C_1$-$C_8$ alkyl group, a nitrogen-containing $C_1$-$C_7$ alkyl group, a nitrogen-containing $C_1$-$C_6$ alkyl group, a nitrogen-containing $C_1$-$C_5$ alkyl group, a nitrogen-containing $C_1$-$C_4$ alkyl group, a nitrogen-containing $C_1$-$C_3$ alkyl group, a nitrogen-containing $C_1$-$C_2$ alkyl group, or a methylamine. In particular, $Z^6$, $Z^7$ and $Z^8$ each independently can be a nitrogen-containing $C_2$-$C_{10}$ alkyl group, a nitrogen-containing $C_3$-$C_{10}$ alkyl group, a nitrogen-containing $C_3$-$C_9$ alkyl group, or a nitrogen-containing $C_3$-$C_8$ alkyl group. The aforementioned nitrogen-containing alkyl groups may have one or more nitrogen atoms (e.g., 2, 3, etc.). Examples of nitrogen-containing $C_1$-$C_{10}$ alkyl groups include, but are not limited to,

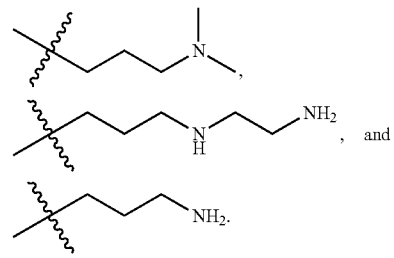

Additionally or alternatively, $Z^6$, $Z^7$ and $Z^8$ each independently can be selected from the group consisting of a hydroxyl group, a $C_1$-$C_2$ alkyl group, a $C_1$-$C_2$ alkoxy group and a nitrogen-containing $C_3$-$C_{10}$ alkyl group.

Additionally or alternatively, each $Z^5$ can be a hydrogen atom, a $C_1$-$C_2$ alkyl group or a bond to a silicon atom of another monomer; and $Z^6$, $Z^7$ and $Z^8$ each independently can be selected from the group consisting of a hydroxyl group, a $C_1$-$C_2$ alkyl group, a $C_1$-$C_2$ alkoxy group and a nitrogen-containing $C_3$-$C_{10}$ alkyl group.

Additionally or alternatively, $Z^6$, $Z^7$ and $Z^8$ each independently can optionally be a nitrogen-containing heteroaralkyl group. The nitrogen-containing heteroaralkyl group can be a nitrogen-containing $C_4$-$C_{12}$ heteroaralkyl group, a nitrogen-containing $C_4$-$C_{10}$ heteroaralkyl group, or a nitrogen-containing $C_4$-$C_8$ heteroaralkyl group. Examples of nitrogen-containing heteroaralkyl groups include but are not limited to pyridinylethyl, pyridinylpropyl, pyridinylmethyl, indolylmethyl, pyrazinylethyl, and pyrazinylpropyl. The aforementioned nitrogen-containing heteroaralkyl groups may have one or more nitrogen atoms (e.g., 2, 3, etc.).

Additionally or alternatively, $Z^6$, $Z^7$ and $Z^8$ each independently can be selected from the group consisting of a hydroxyl group, a $C_1$-$C_2$ alkyl group, a $C_1$-$C_2$ alkoxy group, nitrogen-containing $C_3$-$C_{10}$ alkyl group and a nitrogen-containing heteroaralkyl group.

Additionally or alternatively, each $Z^5$ can be a hydrogen atom, a $C_1$-$C_2$ alkyl group or a bond to a silicon atom of another monomer; and $Z^6$, $Z^7$ and $Z^8$ each independently can be selected from the group consisting of a hydroxyl group, a $C_1$-$C_2$ alkyl group, a $C_1$-$C_2$ alkoxy group, a nitrogen-containing $C_3$-$C_{10}$ alkyl group and a nitrogen-containing heteroaralkyl group.

Additionally or alternatively, $Z^6$, $Z^7$ and $Z^8$ each independently can optionally be a nitrogen-containing heterocycloalkyl group, wherein the heterocycloalkyl group may be optionally substituted with a $C_1$-$C_6$ alkyl group, particularly a $C_1$-$C_4$ alkyl group. The nitrogen-containing heterocycloalkyl group can be a nitrogen-containing $C_4$-$C_{12}$ heterocycloalkyl group, a nitrogen-containing $C_4$-$C_{10}$ heterocycloalkyl group, or a nitrogen-containing $C_4$-$C_8$ heterocycloalkyl group. Examples of nitrogen-containing heterocycloalkyl groups include but are not limited to piperazinylethyl, piperazinylpropyl, piperidinylethyl, piperidinylpropyl. The aforementioned nitrogen-containing heterocycloalkyl groups may have one or more nitrogen atoms (e.g., 2, 3, etc.).

Additionally or alternatively, $Z^6$, $Z^7$ and $Z^8$ each independently can be selected from the group consisting of a hydroxyl group, a $C_1$-$C_2$ alkyl group, a $C_1$-$C_2$ alkoxy group, nitrogen-containing $C_3$-$C_{10}$ alkyl group, a nitrogen-containing heteroaralkyl group, and a nitrogen-containing optionally substituted heterocycloalkyl group.

Additionally or alternatively, $Z^6$, $Z^7$ and $Z^8$ each independently can be selected from the group consisting of a hydroxyl group, a $C_1$-$C_2$ alkyl group, a $C_1$-$C_2$ alkoxy group, and an oxygen atom bonded to a silicon atom of another monomer.

Additionally or alternatively, each $Z^5$ can be a hydrogen atom, a $C_1$-$C_2$ alkyl group or a bond to a silicon atom of another monomer; and $Z^6$, $Z^7$ and $Z^8$ each independently can be selected from the group consisting of a hydroxyl group, a $C_1$-$C_2$ alkyl group, a $C_1$-$C_2$ alkoxy group, a nitrogen-containing $C_3$-$C_{10}$ alkyl group, a nitrogen-containing heteroaralkyl group and a nitrogen-containing optionally substituted heterocycloalkyl group.

Additionally or alternatively, $Z^6$, $Z^7$ and $Z^8$ each independently can be selected from the group consisting of a hydran oxygen atom bonded to a silicon atom of another monomer.

Additionally or alternatively, $Z^6$, $Z^7$ and $Z^8$ each independently can be an oxygen atom bonded to a silicon atom of another monomer.

Additionally or alternatively, each $Z^5$ can be a hydrogen atom, a $C_1$-$C_2$ alkyl group or a bond to a silicon atom of another monomer; and $Z^6$, $Z^7$ and $Z^8$ each independently can be selected from the group consisting of a hydroxyl group, a $C_1$-$C_2$ alkyl group, a $C_1$-$C_2$ alkoxy group, a nitrogen-containing $C_3$-$C_{10}$ alkyl group, a nitrogen-containing heteroaralkyl group, a nitrogen-containing optionally substituted heterocycloalkyl group and an oxygen atom bonded to a silicon atom of another monomer.

Additionally or alternatively, each $Z^5$ can be a hydrogen atom, a $C_1$-$C_2$ alkyl group or a bond to a silicon atom of another monomer; and $Z^6$, $Z^7$ and $Z^8$ each independently can be selected from the group consisting of a hydroxyl group, a $C_1$-$C_2$ alkyl group, a $C_1$-$C_2$ alkoxy group, a nitrogen-containing $C_3$-$C_{10}$ alkyl group, a nitrogen-containing $C_4$-$C_{10}$ heteroaralkyl group, a nitrogen-containing optionally substituted $C_4$-$C_{10}$ heterocycloalkyl group, and an oxygen atom bonded to a silicon atom of another monomer.

Additionally or alternatively, each $Z^5$ can be a hydrogen atom or a bond to a silicon atom of another monomer; and $Z^6$, $Z^7$ and $Z^8$ each independently can be selected from the group consisting of a hydroxyl group, a $C_1$-$C_2$ alkyl group, a nitrogen-containing $C_3$-$C_8$ alkyl group, $C_4$-$C_{10}$ heteroaralkyl group, a nitrogen-containing optionally substituted $C_4$-$C_{10}$ heterocycloalkyl group, and an oxygen atom bonded to a silicon atom of another monomer.

In a particular embodiment, each $Z^5$ can be a hydrogen atom, ethyl or a bond to a silicon atom of another monomer; and $Z^6$, $Z^7$ and $Z^8$ each independently can be selected from the group consisting of a hydroxyl group, ethoxy, and an oxygen atom bonded to a silicon atom of another monomer.

In another particular embodiment, each $Z^5$ can be a hydrogen atom, ethyl or a bond to a silicon atom of another monomer; $Z^6$ and $Z^7$ each independently can be selected from the group consisting of a hydroxyl group, ethoxy, and an oxygen atom bonded to a silicon atom of another monomer; and $Z^8$ can be methyl.

In another particular embodiment, each $Z^5$ can be a hydrogen atom, methyl or a bond to a silicon atom of another monomer; $Z^6$ and $Z^7$ each independently can be selected from the group consisting of a hydroxyl group, methoxy, and an oxygen atom bonded to a silicon atom of another monomer; and each $Z^8$ can be

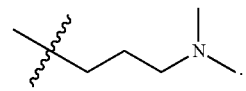 [SMILES: *CCCN(C)C]

In another particular embodiment, each $Z^5$ can be a hydrogen atom, ethyl or a bond to a silicon atom of another monomer; $Z^6$ and $Z^7$ each independently can be selected from the group consisting of a hydroxyl group, ethoxy, and an oxygen atom bonded to a silicon atom of another monomer; and each $Z^8$ can be

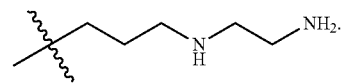 [SMILES: *CCCNCCN]

In another particular embodiment, each $Z^5$ can be a hydrogen atom, ethyl or a bond to a silicon atom of another monomer; $Z^6$ and $Z^7$ each independently can be selected from the group consisting of a hydroxyl group, ethoxy, and an oxygen atom bonded to a silicon atom of another monomer; and each $Z^8$ can be

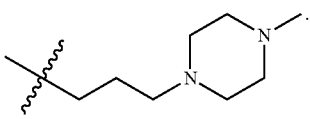 [SMILES: *CCCN1CCN(C)CC1]

In another particular embodiment, each $Z^5$ can be a hydrogen atom, ethyl or a bond to a silicon atom of another monomer; $Z^6$ and $Z^7$ each independently can be selected from the group consisting of a hydroxyl group, ethoxy, and an oxygen atom bonded to a silicon atom of another monomer; and each $Z^8$ can be

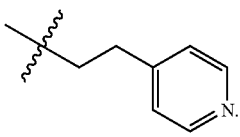 [SMILES: *CCc1ccncc1]

In another particular embodiment, each $Z^5$ can be a hydrogen atom, ethyl or a bond to a silicon atom of another monomer; $Z^6$ and $Z^7$ each independently can be selected from the group consisting of a hydroxyl group, ethoxy, and an oxygen atom bonded to a silicon atom of another monomer; and each $Z^8$ can be

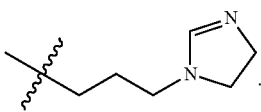 [SMILES: *CCCN1C=NCC1]

In another particular embodiment, each $Z^5$ can be a hydrogen atom, ethyl or a bond to a silicon atom of another monomer; $Z^6$ and $Z^7$ each independently can be selected from the group consisting of a hydroxyl group, ethoxy, and an oxygen atom bonded to a silicon atom of another monomer; and each $Z^8$ can be

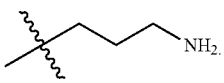 [SMILES: *CCCN]

In another particular embodiment, each $Z^5$ can be a hydrogen atom, methyl, ethyl, or a bond to a silicon atom of another monomer; and $Z^6$, $Z^7$ and $Z^8$ each independently can be selected from the group consisting of a hydroxyl group, methyl, methoxy, ethoxy,

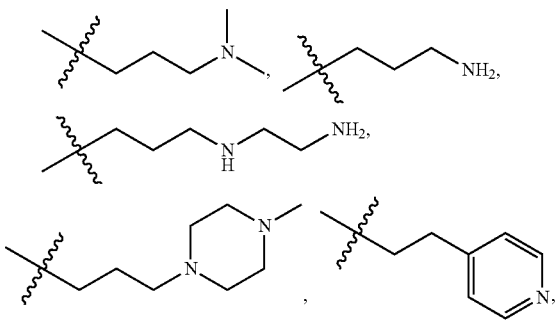

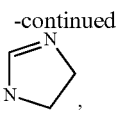

and an oxygen bonded to a silicon atom of another monomer.

E. Monomers of Formula (III)

In various embodiments, the organosilica material may further comprise another monomer in combination with independent units of Formula (I) and/or Formula (IV) and optionally independent units of Formula (II), as well as sources of silica that are reactive to polymerize therewith, such as another monomer having at least one independent unit of Formula (III), $Z^9Z^{10}Z^{11}Si$—R—$SiZ^9Z^{10}Z^{11}$, wherein each $Z^9$ independently can be a hydroxyl group, a $C_1$-$C_4$ alkoxy group, or an oxygen atom bonded to a silicon atom of another monomer; $Z^{10}$ and $Z^{11}$ each independently can a hydroxyl group, a $C_1$-$C_4$ alkoxy group, a $C_1$-$C_4$ alkyl group, or an oxygen atom bonded to a silicon atom of another monomer, and each R can be selected from the group consisting a $C_1$-$C_8$ alkylene group, a $C_2$-$C_8$ alkenylene group, a $C_2$-$C_8$ alkynylene group, a nitrogen-containing $C_1$-$C_{10}$ alkylene group, an optionally substituted $C_6$-$C_{20}$ aralkyl, and an optionally substituted $C_4$-$C_{20}$ heterocycloalkyl group.

Additionally or alternatively, each $Z^9$ independently can be a hydroxyl group, a $C_1$-$C_4$ alkoxy group or an oxygen atom bonded to a silicon atom of another monomer; $Z^{10}$ and $Z^{11}$ each independently can a hydroxyl group, a $C_1$-$C_4$ alkoxy group, a $C_1$-$C_4$ alkyl group or an oxygen atom bonded to a silicon atom of another monomer; and each R can be selected from the group consisting a $C_1$-$C_8$ alkylene group, a $C_2$-$C_8$ alkenylene group, and a $C_2$-$C_8$ alkynylene group. Additionally or alternatively, R optionally can be a nitrogen-containing $C_1$-$C_{10}$ alkylene group, an optionally substituted $C_6$-$C_{20}$ aralkyl and/or an optionally substituted $C_4$-$C_{20}$ heterocycloalkyl group.

In various aspects, each $Z^9$ can be a hydroxyl group.

Additionally or alternatively, each $Z^9$ can be a $C_1$-$C_4$ alkoxy group, a $C_1$-$C_3$ alkoxy group, a $C_1$-$C_2$ alkoxy group or methoxy.

Additionally or alternatively, each $Z^9$ can be a hydroxyl group or a $C_1$-$C_2$ alkoxy group.

Additionally or alternatively, each $Z^9$ can be an oxygen atom bonded to a silicon atom of another monomer.

Additionally or alternatively, each $Z^9$ can be a hydroxyl group, a $C_1$-$C_2$ alkoxy group or an oxygen atom bonded to a silicon atom of another monomer.

Additionally or alternatively, each $Z^9$ can be a hydroxyl group or an oxygen atom bonded to a silicon atom of another monomer.

Additionally or alternatively, $Z^{10}$ and $Z^{11}$ each independently can be a hydroxyl group.

Additionally or alternatively, $Z^{10}$ and $Z^{11}$ each independently can be a $C_1$-$C_4$ alkoxy group, a $C_1$-$C_3$ alkoxy group, a $C_1$-$C_2$ alkoxy group or methoxy.

Additionally or alternatively, $Z^{10}$ and $Z^{11}$ each independently can be a hydroxyl group or a $C_1$-$C_2$ alkoxy group.

Additionally or alternatively, $Z^{10}$ and $Z^{11}$ each independently can be a $C_1$-$C_4$ alkyl group, a $C_1$-$C_3$ alkyl group, a $C_1$-$C_2$ alkyl group or methyl.

Additionally or alternatively, $Z^{10}$ and $Z^{11}$ each independently can be a hydroxyl group, a $C_1$-$C_2$ alkoxy group, or a $C_1$-$C_2$ alkyl group.

Additionally or alternatively, $Z^{10}$ and $Z^{11}$ each independently can be an oxygen atom bonded to a silicon atom of another monomer.

Additionally or alternatively, $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer.

Additionally or alternatively, $Z^{10}$ and $Z^{11}$ each independently can be a hydroxyl group, a $C_1$-$C_2$ alkyl group, or an oxygen atom bonded to a silicon atom of another monomer.

Additionally or alternatively, each $Z^9$ can be a hydroxyl group, a $C_1$-$C_2$ alkoxy group or an oxygen atom bonded to a silicon atom of another monomer; and $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer.

Additionally or alternatively, each $Z^9$ can be a hydroxyl group, ethoxy, methoxy or an oxygen atom bonded to a silicon atom of another monomer; and $Z^{10}$ and $Z^{11}$ each independently can be a hydroxyl group, ethoxy, methyl, or an oxygen atom bonded to a silicon atom of another monomer.

Additionally or alternatively, each $Z^9$ can be a hydroxyl group or an oxygen atom bonded to a silicon atom of another monomer; and $Z^{10}$ and $Z^{11}$ each independently can be a hydroxyl group, methyl, or an oxygen atom bonded to a silicon atom of another monomer.

Additionally or alternatively, each R can be a $C_1$-$C_8$ alkylene group, a $C_1$-$C_7$ alkylene group, a $C_1$-$C_6$ alkylene group, a $C_1$-$C_5$ alkylene group, a $C_1$-$C_4$ alkylene group, a $C_1$-$C_3$ alkylene group, a $C_1$-$C_2$ alkylene group or —$CH_2$—.

Additionally or alternatively, each $Z^9$ can be a hydroxyl group, a $C_1$-$C_2$ alkoxy group or an oxygen atom bonded to a silicon atom of another monomer; $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer; and each R can be a $C_1$-$C_4$ alkylene group.

Additionally or alternatively, each R can be a $C_2$-$C_8$ alkenylene group, a $C_2$-$C_7$ alkenylene group, a $C_2$-$C_6$ alkenylene group, a $C_2$-$C_5$ alkenylene group, a $C_2$-$C_4$ alkenylene group, a $C_2$-$C_3$ alkenylene group, or —HC=CH—.

Additionally or alternatively, each $Z^9$ can be a hydroxyl group, a $C_1$-$C_2$ alkoxy group or an oxygen atom bonded to a silicon atom of another monomer; $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer; and each R can be selected from the group consisting of a $C_1$-$C_4$ alkylene group and a $C_2$-$C_4$ alkenylene group.

Additionally or alternatively, each R can be a $C_2$-$C_8$ alkynylene group, a $C_2$-$C_7$ alkynylene group, a $C_2$-$C_6$ alkynylene group, a $C_2$-$C_5$ alkynylene group, a $C_2$-$C_4$ alkynylene group, a $C_2$-$C_3$ alkynylene group, or —C≡C—.

Additionally or alternatively, each $Z^9$ can be a hydroxyl group, a $C_1$-$C_2$ alkoxy group or an oxygen atom bonded to a silicon atom of another monomer; $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer; and each R can be selected from the group consisting of a $C_1$-$C_4$ alkylene group, a $C_2$-$C_4$ alkenylene group and a $C_2$-$C_4$ alkynylene group.

Additionally or alternatively, each R can be a nitrogen-containing $C_2$-$C_{10}$ alkylene group, a nitrogen-containing $C_3$-$C_{10}$ alkylene group, a nitrogen-containing $C_4$-$C_{10}$ alkylene group, a nitrogen-containing $C_4$-$C_9$ alkylene group, a nitrogen-containing $C_4$-$C_8$ alkylene group, or nitrogen containing $C_3$-$C_8$ alkylene group. The aforementioned nitrogen-containing alkylene groups may have one or more nitrogen atoms (e.g., 2, 3, etc.). Examples of nitrogen-containing alkylene groups include, but are not limited to,

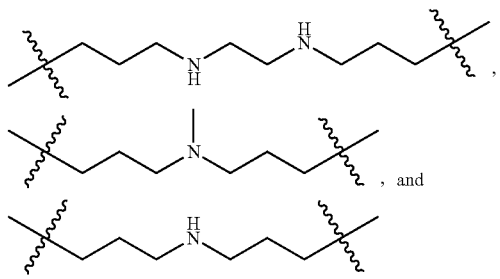

Additionally or alternatively, each $Z^9$ can be a hydroxyl group, a $C_1$-$C_2$ alkoxy group or an oxygen atom bonded to a silicon atom of another monomer; $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer; and each R can be selected from the group consisting of a $C_1$-$C_4$ alkylene group, a $C_2$-$C_4$ alkenylene group, a $C_2$-$C_4$ alkynylene group and a nitrogen-containing $C_4$-$C_{10}$ alkylene group.

Additionally or alternatively, each R can be an optionally substituted $C_6$-$C_{20}$ aralkyl, an optionally substituted $C_6$-$C_{14}$ aralkyl, or an optionally substituted $C_6$-$C_{10}$ aralkyl. Examples of $C_6$-$C_{20}$ aralkyls include, but are not limited to, phenylmethyl, phenylethyl, and naphthylmethyl. The aralkyl may be optionally substituted with a $C_1$-$C_6$ alkyl group, particularly a $C_1$-$C_4$ alkyl group.

Additionally or alternatively, each $Z^9$ can be a hydroxyl group, a $C_1$-$C_2$ alkoxy group or an oxygen atom bonded to a silicon atom of another monomer; $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer; and R can be selected from the group consisting of a $C_1$-$C_4$ alkylene group, a $C_2$-$C_4$ alkenylene group, a $C_2$-$C_4$ alkynylene group, a nitrogen-containing $C_4$-$C_{10}$ alkylene group and an optionally substituted $C_6$-$C_{10}$ aralkyl.

Additionally or alternatively, each R can be an optionally substituted $C_4$-$C_{20}$ heterocycloalkyl group, an optionally substituted $C_4$-$C_{16}$ heterocycloalkyl group, an optionally substituted $C_4$-$C_{12}$ heterocycloalkyl group, or an optionally substituted $C_4$-$C_{10}$ heterocycloalkyl group. Examples of $C_4$-$C_{20}$ heterocycloalkyl groups include, but are not limited to, thienylmethyl, furylethyl, pyrrolylmethyl, piperazinylethyl, pyridylmethyl, benzoxazolylethyl, quinolinylpropyl, and imidazolylpropyl. The heterocycloalkyl may be optionally substituted with a $C_1$-$C_6$ alkyl group, particularly a $C_1$-$C_4$ alkyl group.

Additionally or alternatively, each $Z^9$ can be a hydroxyl group, a $C_1$-$C_2$ alkoxy group or an oxygen atom bonded to a silicon atom of another monomer; $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer; and R can be selected from the group consisting of a $C_1$-$C_4$ alkylene group, a $C_2$-$C_4$ alkenylene group, a $C_2$-$C_4$ alkynylene group, a nitrogen-containing $C_4$-$C_{10}$ alkylene group, an optionally substituted $C_6$-$C_{10}$ aralkyl and an optionally substituted $C_4$-$C_{12}$ heterocycloalkyl group.

Additionally or alternatively, each $Z^9$ can be a hydroxyl group, a $C_1$-$C_2$ alkoxy group or an oxygen atom bonded to a silicon atom of another monomer; $Z^{10}$ and $Z^{11}$ each independently can be a hydroxyl group, a $C_1$-$C_2$ alkoxy group, a $C_1$-$C_2$ alkyl group, or an oxygen atom bonded to a silicon atom of another monomer; and R can be selected from the group consisting of a $C_1$-$C_4$ alkylene group, a $C_2$-$C_4$ alkenylene group, a $C_2$-$C_4$ alkynylene group, a nitrogen-containing $C_4$-$C_{10}$ alkylene group, an optionally substituted $C_6$-$C_{10}$ aralkyl and an optionally substituted $C_4$-$C_{10}$ heterocycloalkyl group.

Additionally or alternatively, each $Z^9$ can be a hydroxyl group, ethoxy, methoxy or an oxygen atom bonded to a silicon atom of another monomer; $Z^{10}$ and $Z^{11}$ each independently can be a hydroxyl group, ethoxy, methoxy, methyl, or an oxygen atom bonded to a silicon atom of another monomer; and R can be selected from the group consisting of —$CH_2$—, —$CH_2CH_2$—, —HC=CH—,

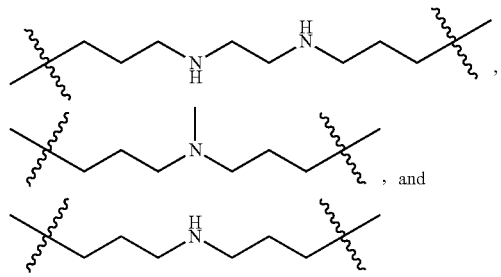

, and

Additionally or alternatively, each $Z^9$ can be a hydroxyl group or an oxygen atom bonded to a silicon atom of another monomer; $Z^{10}$ and $Z^{11}$ each independently can be a hydroxyl group, methyl, or an oxygen atom bonded to a silicon atom of another monomer; and each R can be selected from the group consisting of

—$CH_2$—, —$CH_2CH_2$—, —HC=CH—,

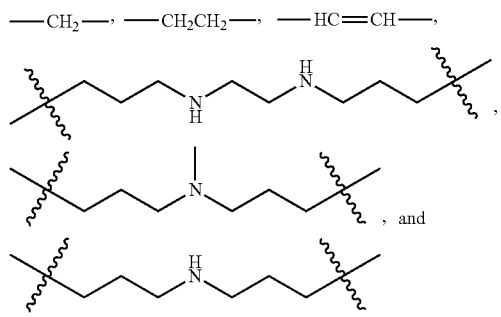

, and

In a particular embodiment, each $Z^9$ can be a hydroxyl group, ethoxy or an oxygen atom bonded to a silicon atom of another monomer; each $Z^{10}$ can be a hydroxyl group, ethoxy, and an oxygen atom bonded to a silicon atom of another monomer; each $Z^{11}$ can be methyl; and each R can be —$CH_2CH_2$—.

In another particular embodiment, each $Z^9$ can be a hydroxyl group, ethoxy or an oxygen atom bonded to a silicon atom of another monomer; $Z^{10}$ and $Z^{11}$ each independently can be selected from the group consisting of a hydroxyl group, ethoxy, and an oxygen atom bonded to a silicon atom of another monomer; and R can be —$CH_2$—.

In another particular embodiment, each $Z^9$ can be a hydroxyl group, ethoxy or an oxygen atom bonded to a silicon atom of another monomer; $Z^{10}$ and $Z^{11}$ each independently can be selected from the group consisting of a hydroxyl group, ethoxy, and an oxygen atom bonded to a silicon atom of another monomer; and R can be —HC=CH—.

In another particular embodiment, each $Z^9$ can be a hydroxyl group, methoxy or an oxygen atom bonded to a silicon atom of another monomer; $Z^{10}$ and $Z^{11}$ each independently can be selected from the group consisting of a hydroxyl group, methoxy, and an oxygen atom bonded to a silicon atom of another monomer; and each R can be

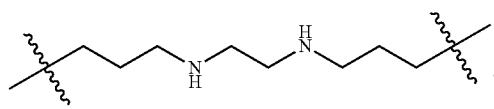 [SMILES: *CCCNCCNCCC*]

In another particular embodiment, each $Z^9$ can be a hydroxyl group, ethoxy or an oxygen atom bonded to a silicon atom of another monomer; $Z^{10}$ can be a hydroxyl group, ethoxy, and an oxygen atom bonded to a silicon atom of another monomer; $Z^{11}$ can be methyl; and each R can be

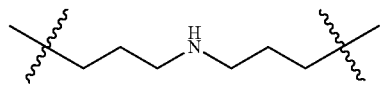

In another particular embodiment, each $Z^9$ can be a hydroxyl group, methoxy or an oxygen atom bonded to a silicon atom of another monomer; $Z^{10}$ can be a hydroxyl group, methoxy, and an oxygen atom bonded to a silicon atom of another monomer; $Z^{11}$ can be methyl; and each R can be

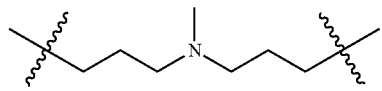

In another embodiment, the organosilica material support may comprise independent units of Formula (III) as described herein and independent units of Formula (IV) as described herein and not independent units of Formula (I) as described herein. In particular, each $Z^5$ can be a hydrogen atom, ethyl or a bond to a silicon atom of another monomer; $Z^6$, $Z^7$ and $Z^8$ each independently can be selected from the group consisting of a hydroxyl group, ethoxy, and an oxygen atom bonded to a silicon atom of another monomer and each $Z^9$ can be a hydroxyl group, ethoxy or an oxygen atom bonded to a silicon atom of another monomer; $Z^{10}$ and $Z^{11}$ each independently can be selected from the group consisting of a hydroxyl group, ethoxy, and an oxygen atom bonded to a silicon atom of another monomer; and R can be —$CH_2$—.

F. Monomers of Formula (V)

In various embodiments, the organosilica material may further optionally comprise a further additional monomer in combination with independent units of Formula (I) and/or Formula (IV), and optionally independent units of Formula (II) and/or Formula (III), as well as sources of silica that are reactive to polymerize therewith, such as a further monomer having at least one independent unit of Formula (V), $M^1(OZ^{12})_3$, wherein $M^1$ represents a Group 13 metal and each $Z^{12}$ independently represents a hydrogen atom, a $C_1$-$C_6$ alkyl, or a bond to a silicon atom of another monomer;

Additionally or alternatively, $M^1$ can be B, Al, Ga, IN Tl, or Uut. In particular, $M^1$ can be Al or B.

Additionally or alternatively, each $Z^{12}$ can be a hydrogen atom.

Additionally or alternatively, $M^1$ can be Al or B and $Z^3$ can be a hydrogen atom.

Additionally or alternatively, each $Z^{12}$ can be a $C_1$-$C_6$ alkyl group, a $C_1$-$C_5$ alkyl group, a $C_1$-$C_4$ alkyl group, a $C_1$-$C_3$ alkyl group, a $C_1$-$C_2$ alkyl group or methyl. In particular, $Z^3$ can be methyl, ethyl, propyl or butyl.

Additionally or alternatively, $M^1$ can be Al or B and $Z^{12}$ can be a hydrogen atom, methyl, ethyl, propyl or butyl.

Additionally or alternatively, each $Z^{12}$ can be a bond to a silicon atom of another monomer.

Additionally or alternatively, $M^1$ can be Al or B and each $Z^{12}$ can be a hydrogen atom, methyl, ethyl, propyl, butyl or a bond to a silicon atom of another monomer.

Additionally or alternatively, $M^1$ can be Al or B and each $Z^{12}$ can be a hydrogen atom or a bond to a silicon atom of another monomer.

Additionally or alternatively, $M^1$ can be Al and each $Z^{12}$ can be a hydrogen atom, methyl, ethyl, propyl, butyl or a bond to a silicon atom of another monomer.

In a particular embodiment, $M^1$ can be Al and each $Z^{12}$ can be a hydrogen atom, methyl or a bond to a silicon atom of another monomer.

In another particular embodiment, $M^1$ can be Al and each $Z^{12}$ can be a hydrogen atom, ethyl or a bond to a silicon atom of another monomer.

In another particular embodiment, $M^1$ can be Al and each $Z^{12}$ can be a hydrogen atom, propyl or a bond to a silicon atom of another monomer.

In another particular embodiment, $M^1$ can be Al and each $Z^{12}$ can be a hydrogen atom, butyl or a bond to a silicon atom of another monomer.

In another particular embodiment, $M^1$ can be Al or B; and each $Z^{12}$ can be a hydrogen atom or a bond to a silicon atom of another monomer.

G. Monomers of Formula (VI)

In various embodiments, the organosilica material may further optionally comprise a still further monomer in combination with independent units of Formula (I) and/or Formula (IV) and optionally independent units of Formula (II), (III), and/or (V), as well as sources of silica that are reactive to polymerize therewith, such as a still further monomer having at least one independent unit of Formula (VI), $(Z^{13}O)_2M^2$—O—$Si(OZ^{14})_3$, wherein $M^2$ represents a Group 13 metal and $Z^{13}$ and $Z^{14}$ each independently represent a hydrogen atom, a $C_1$-$C_6$ alkyl group or a bond to a silicon atom of another monomer.

Additionally or alternatively, $M^2$ can be B, Al, Ga, IN Tl, or Uut. In particular, $M^2$ can be Al or B.

Additionally or alternatively, $Z^{13}$ and/or $Z^{14}$ each can be a hydrogen atom.

Additionally or alternatively, $M^2$ can be Al or B and $Z^{13}$ and/or $Z^{14}$ each can be a hydrogen atom.

Additionally or alternatively, $Z^{13}$ and/or $Z^{14}$ each can be a $C_1$-$C_6$ alkyl group, a $C_1$-$C_5$ alkyl group, a $C_1$-$C_4$ alkyl group, a $C_1$-$C_3$ alkyl group, a $C_1$-$C_2$ alkyl group or methyl. In particular, $Z^{13}$ and/or $Z^{14}$ can be methyl, ethyl, propyl or butyl.

Additionally or alternatively, $M^2$ can be Al or B; and $Z^{13}$ and/or $Z^{14}$ each independently can be a hydrogen atom, methyl, ethyl, propyl or butyl.

Additionally or alternatively, $Z^{13}$ and/or $Z^{14}$ each can be a bond to a silicon atom of another monomer.

Additionally or alternatively, $M^2$ can be Al or B; and $Z^{13}$ and $Z^{14}$ each independently can be a hydrogen atom, methyl, ethyl, propyl, butyl or a bond to a silicon atom of another monomer.

Additionally or alternatively, $M^2$ can be Al or B; and $Z^{13}$ and $Z^{14}$ each independently can be a hydrogen atom or a bond to a silicon atom of another monomer.

Additionally or alternatively, $M^2$ can be Al; and $Z^{13}$ and $Z^{14}$ each independently can be a hydrogen atom, methyl, ethyl, propyl, butyl or a bond to a silicon atom of another monomer.

In a particular embodiment, $M^2$ can be Al; and $Z^{13}$ and $Z^{14}$ each independently can be a hydrogen atom, methyl or a bond to a silicon atom of another monomer.

In another particular embodiment, $M^2$ can be Al; and $Z^{13}$ and $Z^{14}$ each independently can be a hydrogen atom, ethyl or a bond to a silicon atom of another monomer.

In another particular embodiment, $M^2$ can be Al; and $Z^{13}$ and $Z^{14}$ each independently can be a hydrogen atom, propyl or a bond to a silicon atom of another monomer.

In another particular embodiment, $M^2$ can be Al; and $Z^{13}$ and $Z^{14}$ each independently can be a hydrogen atom, butyl or a bond to a silicon atom of another monomer.

In another particular embodiment, $M^2$ can be Al or B; and $Z^{13}$ and $Z^{14}$ each independently can be a hydrogen atom or a bond to a silicon atom of another monomer.

The organosilica materials described herein can be characterized as described in the following sections.

H. Pore Size

The organosilica materials described herein, as manufactured and/or as finally treated, may advantageously be in a mesoporous form. As indicated previously, the term mesoporous refers to solid materials having pores with a diameter within the range of from about 2 nm to about 50 nm. The average pore diameter of the organosilica materials can be determined, for example, using nitrogen adsorption-desorption isotherm techniques within the expertise of one of skill in the art, such as the BET (Brunauer Emmet Teller) method.

Additionally or alternatively, the organosilica materials can have an average pore diameter of about 2.0 nm to about 50 nm, about 2.0 nm to about 40 nm, about 2.0 nm to about 30 nm, about 2.0 nm to about 25 nm, about 2.0 nm to about 20 nm, about 2.0 nm to about 15 nm, about 2.0 nm to about 13 nm, about 2.0 nm to about 11 nm, about 2.0 nm to about 10 nm, about 2.0 nm to about 9 nm, about 2.0 nm to about 8.5 nm, about 2.0 nm to about 8.0 nm, about 2.0 nm to about 7.5 nm, about 2.0 nm to about 7.0 nm, about 2.0 nm to about 6.0 nm, about 2.0 nm to about 5.0 nm, about 2.0 nm to about 4.5 nm, about 2.0 nm to about 4.0 nm, about 2.0 nm to about 3.0 nm, about 3.0 nm to about 50 nm, about 3.0 nm to about 40 nm, about 3.0 nm to about 30 nm, about 3.0 nm to about 25 nm, about 3.0 nm to about 20 nm, about 3.0 nm to about 15 nm, about 3.0 nm to about 13 nm, about 3.0 nm to about 11 nm, about 3.0 nm to about 10 nm, about 3.0 nm to about 9 nm, about 3.0 nm to about 8.5 nm, about 3.0 nm to about 8.0 nm, about 3.0 nm to about 7.5 nm, about 3.0 nm to about 7.0 nm, about 3.0 nm to about 6.0 nm, about 3.0 nm to about 5.0 nm, about 2.0 nm to about 4.5 nm, or about 3.0 nm to about 4.0 nm. In particular, the catalysts can have an average pore diameter of about 2.0 nm to about 20 nm, about 2.0 nm to about 10 nm, about 2.0 nm to about 8.0 nm, or about 3.0 nm to about 10 nm.

I. Surface Area

The surface area of the organosilica materials, as manufactured and/or as finally treated, can be determined, for example, using nitrogen adsorption-desorption isotherm techniques within the expertise of one of skill in the art, such as the BET (Brunauer Emmet Teller) method. This method may determine a total surface area, an external surface area, and a microporous surface area. As used herein, and unless otherwise specified, "total surface area" refers to the total surface area as determined by the BET method. As used herein, and unless otherwise specified, "microporous surface area" refers to microporous surface are as determined by the BET method.

In various embodiments, the organosilica materials can have a total surface area greater than or equal to about 100 $m^2/g$, greater than or equal to about 200 $m^2/g$, greater than or equal to about 300 $m^2/g$, greater than or equal to about 400 $m^2/g$, greater than or equal to about 450 $m^2/g$, greater than or equal to about 500 $m^2/g$, greater than or equal to about 550 $m^2/g$, greater than or equal to about 600 $m^2/g$, greater than or equal to about 700 $m^2/g$, greater than or equal to about 800 $m^2/g$, greater than or equal to about 850 $m^2/g$, greater than or equal to about 900 $m^2/g$, greater than or equal to about 1,000 $m^2/g$, greater than or equal to about 1,050 $m^2/g$, greater than or equal to about 1,100 $m^2/g$, greater than or equal to about 1,150 $m^2/g$, greater than or equal to about 1,200 $m^2/g$, greater than or equal to about 1,250 $m^2/g$, greater than or equal to about 1,300 $m^2/g$, greater than or equal to about 1,400 $m^2/g$, greater than or equal to about 1,450 $m^2/g$, greater than or equal to about 1,500 $m^2/g$, greater than or equal to about 1,550 $m^2/g$, greater than or equal to about 1,600 $m^2/g$, greater than or equal to about 1,700 $m^2/g$, greater than or equal to about 1,800 $m^2/g$, greater than or equal to about 1,900 $m^2/g$, greater than or equal to about 2,000 $m^2/g$, greater than or equal to greater than or equal to about 2,100 $m^2/g$, greater than or equal to about 2,200 $m^2/g$, greater than or equal to about 2,300 $m^2/g$ or about 2,500 $m^2/g$.

Additionally or alternatively, the organosilica materials may have a total surface area of about 50 $m^2/g$ to about 2,500 $m^2/g$, about 50 $m^2/g$ to about 2,000 $m^2/g$, about 50 $m^2/g$ to about 1,500 $m^2/g$, about 50 $m^2/g$ to about 1,000 $m^2/g$, about 100 $m^2/g$ to about 2,500 $m^2/g$, about 100 $m^2/g$ to about 2,300 $m^2/g$, about 100 $m^2/g$ to about 2,200 $m^2/g$, about 100 $m^2/g$ to about 2,100 $m^2/g$, about 100 $m^2/g$ to about 2,000 $m^2/g$, about 100 $m^2/g$ to about 1,900 $m^2/g$, about 100 $m^2/g$ to about 1,800 $m^2/g$, about 100 $m^2/g$ to about 1,700 $m^2/g$, about 100 $m^2/g$ to about 1,600 $m^2/g$, about 100 $m^2/g$ to about 1,550 $m^2/g$, about 100 $m^2/g$ to about 1,500 $m^2/g$, about 100 $m^2/g$ to about 1,450 $m^2/g$, about 100 $m^2/g$ to about 1,400 $m^2/g$, about 100 $m^2/g$ to about 1,300 $m^2/g$, about 100 $m^2/g$ to about 1,250 $m^2/g$, about 100 $m^2/g$ to about 1,200 $m^2/g$, about 100 $m^2/g$ to about 1,150 $m^2/g$, about 100 $m^2/g$ to about 1,100 $m^2/g$, about 100 $m^2/g$ to about 1,050 $m^2/g$, about 100 $m^2/g$ to about 1,000 $m^2/g$, about 100 $m^2/g$ to about 900 $m^2/g$, about 100 $m^2/g$ to about 850 $m^2/g$, about 100 $m^2/g$ to about 800 $m^2/g$, about 100 $m^2/g$ to about 700 $m^2/g$, about 100 $m^2/g$ to about 600 $m^2/g$, about 100 $m^2/g$ to about 550 $m^2/g$, about 100 $m^2/g$ to about 500 $m^2/g$, about 100 $m^2/g$ to about 450 $m^2/g$, about 100 $m^2/g$ to about 400 $m^2/g$, about 100 $m^2/g$ to about 300 $m^2/g$, about 100 $m^2/g$ to about 200 $m^2/g$, about 300 $m^2/g$ to about 2,500 $m^2/g$, about 300 $m^2/g$ to about 2,300 $m^2/g$, about 300 $m^2/g$ to about 2,200 $m^2/g$, about 300 $m^2/g$ to about 2,100 $m^2/g$, about 300 $m^2/g$ to about 2,000 $m^2/g$, about 300 $m^2/g$ to about 1,900 $m^2/g$, about 300 $m^2/g$ to about 1,800 $m^2/g$, about 300 $m^2/g$ to about 1,700 $m^2/g$, about 300 $m^2/g$ to about 1,600 $m^2/g$, about 300 $m^2/g$ to about 1,550 $m^2/g$, about 300 $m^2/g$ to about 1,500 $m^2/g$, about 300 $m^2/g$ to about 1,450 $m^2/g$, about 300 $m^2/g$ to about 1,400 $m^2/g$, about 300 $m^2/g$ to about 1,300 $m^2/g$, about 300 $m^2/g$ to about 1,250 $m^2/g$, about 300 $m^2/g$ to about 1,200 $m^2/g$, about 300 $m^2/g$ to about 1,150 $m^2/g$, about 300 $m^2/g$ to about 1,100 $m^2/g$, about 300 $m^2/g$ to about 1,050 $m^2/g$, about 300 $m^2/g$ to about 1,000 $m^2/g$, about 300 $m^2/g$ to about 900 $m^2/g$, about 300 $m^2/g$ to about 850 $m^2/g$, about 300 $m^2/g$ to about 800 $m^2/g$, about 300 $m^2/g$ to about 700 $m^2/g$, about 300 $m^2/g$ to about 600 $m^2/g$, about 300 $m^2/g$ to about 550 $m^2/g$, about 300 $m^2/g$ to about 500 $m^2/g$, about 300 $m^2/g$ to about 450 $m^2/g$, or about 300 $m^2/g$ to about 400 $m^2/g$. In particular, the organosilica materials may have a total surface area of about 300 $m^2/g$ to about 1,500 $m^2$g.

J. Pore Volume

The pore volume of the organosilica materials described herein can be determined, for example, using nitrogen adsorption-desorption isotherm techniques within the expertise of one of skill in the art, such as the BET (Brunauer Emmet Teller) method.

In various embodiments, the organosilica materials can have a pore volume greater than or equal to about 0.1 $cm^3/g$, greater than or equal to about 0.2 $cm^3/g$, greater than or equal to about 0.3 $cm^3/g$, greater than or equal to about 0.4 $cm^3/g$, greater than or equal to about 0.5 $cm^3/g$, greater than or equal to about 0.6 $cm^3/g$, greater than or equal to about 0.7 $cm^3/g$, greater than or equal to about 0.8 $cm^3/g$, greater than or equal to about 0.9 $cm^3/g$, greater than or equal to about 1.0 $cm^3/g$, greater than or equal to about 1.1 $cm^3/g$, greater than or equal to about 1.2 $cm^3/g$, greater than or equal to about 1.3 $cm^3/g$, greater than or equal to about 1.4 $cm^3/g$, greater than or equal to about 1.5 $cm^3/g$, greater than or equal to about 1.6 $cm^3/g$, greater than or equal to about 1.7 $cm^3/g$, greater than or equal to about 1.8 $cm^3/g$, greater than or equal to about 1.9 $cm^3/g$, greater than or equal to about 2.0 $cm^3/g$, greater than or equal to about 2.5 $cm^3/g$, greater than or equal to about 3.0 $cm^3/g$, greater than or equal to about 3.5 $cm^3/g$, greater than or equal to about 4.0 $cm^3/g$, greater than or equal to about 5.0 $cm^3/g$, greater than or equal to about 6.0 $cm^3/g$, greater than or equal to about 7.0 $cm^3/g$, or about 10.0 $cm^3/g$.

Additionally or alternatively, the organosilica materials can have a pore volume of about 0.1 $cm^3/g$ to about 10.0 $cm^3/g$, about 0.1 $cm^3/g$ to about 5.0 $cm^3/g$, about 0.1 $cm^3/g$ to about 4.0 $cm^3/g$, about 0.1 $cm^3/g$ to about 3.0 $cm^3/g$, about 0.1 $cm^3/g$ to about 2.0 $cm^3/g$, about 0.1 $cm^3/g$ to about 1.5 $cm^3/g$, about 0.1 $cm^3/g$ to about 1.0 $cm^3/g$, about 0.1 $cm^3/g$ to about 0.9 $cm^3/g$, about 0.1 $cm^3/g$ to about 0.8 $cm^3/g$, about 0.1 $cm^3/g$ to about 0.7 $cm^3/g$, about 0.1 $cm^3/g$ to about 0.6 $cm^3/g$, about 0.1 $cm^3/g$ to about 0.5 $cm^3/g$, about 0.1 $cm^3/g$ to about 0.4 $cm^3/g$, about 0.1 $cm^3/g$ to about 0.3 $cm^3/g$, 0.3 $cm^3/g$ to about 10.0 $cm^3/g$, about 0.3 $cm^3/g$ to about 5.0 $cm^3/g$, about 0.3 $cm^3/g$ to about 4.0 $cm^3/g$, about 0.1 $cm^3/g$ to about 3.0 $cm^3/g$, about 0.3 $cm^3/g$ to about 2.0 $cm^3/g$, about 0.3 $cm^3/g$ to about 1.5 $cm^3/g$, about 0.3 $cm^3/g$ to about 1.2 $cm^3/g$, about 0.3 $cm^3/g$ to about 1.0 $cm^3/g$, about 0.3 $cm^3/g$ to about 0.9 $cm^3/g$, about 0.1 $cm^3/g$ to about 0.8 $cm^3/g$, about 0.3 $cm^3/g$ to about 0.7 $cm^3/g$, about 0.3 $cm^3/g$ to about 0.6 $cm^3/g$, about 0.3 $cm^3/g$ to about 0.5 $cm^3/g$, about 0.3 $cm^3/g$ to about 0.4 $cm^3/g$, about 0.6 $cm^3/g$ to about 2.0 $cm^3/g$, about 0.6 $cm^3/g$ to about 1.5 $cm^3/g$, about 0.6 $cm^3/g$ to about 1.2 $cm^3/g$, about 0.6 $cm^3/g$ to about 1.1 $cm^3/g$, or about 0.6 $cm^3/g$ to about 1.0 $cm^3/g$.

In particular, the organosilica materials can have a pore volume of about 0.3 cm³/g to about 1.1 cm³/g or about 0.6 cm³/g to about 1.2 cm³/g.

The organosilica materials made by the methods described herein can be characterized as described in the following sections.

K. X-Ray Diffraction Peaks

The organosilica materials described herein can exhibit powder X-ray diffraction patterns with one peak between about 1 and about 6 degrees 2θ, particularly one peak between about 1 and about 4 degrees 2θ, between about 1 and about 3 degrees 2θ, or between about 1 and about 2 degrees 2θ. Additionally or alternatively, the organosilica materials can exhibit substantially no peaks in the range of about 0.5 to about 10 degrees 2θ, about 0.5 to about 12 degrees 2θ range, about 0.5 to about 15 degrees 2θ, about 0.5 to about 20 degrees 2θ, about 0.5 to about 30 degrees 2θ, about 0.5 to about 40 degrees 2θ, about 0.5 to about 50 degrees 2θ, about 0.5 to about 60 degrees 2θ, about 0.5 to about 70 degrees 2θ, about 2 to about 10 degrees 2θ, about 2 to about 12 degrees 2θ range, about 2 to about 15 degrees 2θ, about 2 to about 20 degrees 2θ, about 2 to about 30 degrees 2θ, about 2 to about 40 degrees 2θ, about 2 to about 50 degrees 2θ, about 2 to about 60 degrees 2θ, about 2 to about 70 degrees 2θ, about 3 to about 10 degrees 2θ, about 3 to about 12 degrees 2θ range, about 3 to about 15 degrees 2θ, about 3 to about 20 degrees 2θ, about 3 to about 30 degrees 2θ, about 3 to about 40 degrees 2θ, about 3 to about 50 degrees 2θ, about 3 to about 60 degrees 2θ, about 3 to about 70 degrees 2θ, about 4 to about 10 degrees 2θ, about 4 to about 12 degrees 2θ range, about 4 to about 15 degrees 2θ, about 4 to about 20 degrees 2θ, about 4 to about 30 degrees 2θ, about 4 to about 40 degrees 2θ, about 4 to about 50 degrees 2θ, about 4 to about 60 degrees 2θ, or about 4 to about 70 degrees 2θ.

L. Silanol Content

The organosilica materials obtainable by the method of the invention can have a silanol content that varies within wide limits, depending on the composition of the synthesis solution. The silanol content can conveniently be determined by solid state silicon NMR.

In various aspects, the organosilica material can have a silanol content of greater than about 5%, greater than about 10%, greater than about 15%, greater than about 20%, greater than about 25%, greater than about 30%, greater than about 33%, greater than 35%, greater than about 40%, greater than about 41%, greater than about 44%, greater than about 45%, greater than about 50%, greater than about 55%, greater than about 60%, greater than about 65%, greater than about 70%, greater than about 75%, or about 80%. In certain embodiments, the silanol content can be greater than about 30% or greater than about 41%.

Additionally or alternatively, the organosilica material may have a silanol content of about 5% to about 80%, about 5% to about 75%, about 5% to about 70%, about 5% to about 65%, about 5% to about 60%, about 5% to about 55%, about 5% to about 50%, about 5% to about 45%, about 5% to about 44%, about 5% to to about 41%, about 5% to about 40%, about 5% to about 35%, about 5% to about 33%, about 5% to about 30%, about 5% to about 25%, about 5% to about 20%, about 5% to about 15%, about 5% to about 10%, about 10% to about 80%, about 10% to about 75%, about 10% to about 70%, about 10% to about 65%, about 10% to about 60%, about 10% to about 55%, about 10% to about 50%, about 10% to about 45%, about 10% to about 44%, about 10% to about 41%, about 10% to about 40%, about 10% to about 35%, about 10% to about 33%, about 10% to about 30%, about 10% to about 25%, about 10% to about 20%, about 20% to about 80%, about 20% to about 75%, about 20% to about 70%, about 20% to about 65%, about 20% to about 60%, about 20% to about 55%, about 20% to about 50%, about 20% to about 45%, about 20% to about 44%, about 20% to about 41%, about 20% to about 40%, about 20% to about 35%, about 20% to about 33%, about 20% to about 30%, about 20% to about 25%, about 30% to about 80%, about 30% to about 75%, about 30% to about 70%, about 30% to about 65%, about 30% to about 60%, about 30% to about 55%, about 30% to about 50%, about 30% to about 45%, about 30% to about 44%, about 30% to about 41%, about 30% to about 40%, about 30% to about 35%, about 30% to about 33%, about 40% to about 80%, about 40% to about 75%, about 40% to about 70%, about 40% to about 65%, about 40% to about 60%, about 40% to about 55%, about 40% to about 50%, about 40% to about 45%, about 40% to about 44%, or about 40% to about 41%, M. Catalyst Metal The organosilica materials may further be treated to comprise at least one catalyst metal, particularly in embodiments where the end use application is a catalytic one. The at least one catalyst metal may be deposited onto, and advantageously incorporated within the pores of, the organosilica material. Exemplary catalyst metals can include, but are not limited to, a Group 6 metal, a Group 8 metal, a Group 9 metal, a Group 10 metal, or a combination thereof. Exemplary Group 6 metals can include, but are not limited to, chromium, molybdenum, and/or tungsten, particularly including molybdenum and/or tungsten. Exemplary Group 8 metals can include, but are not limited to, iron, ruthenium, and/or osmium. Exemplary Group 9 metals can include, but are not limited to, cobalt, rhodium, and/or iridium, particularly including cobalt. Exemplary Group 10 metals can include, but are not limited to, nickel, palladium and/or platinum.

In a particular embodiment, the catalyst metal may be a noble metal selected from the group consisting of a Group 8 metal, a Group 9 metal, a Group 10 metal and a combination thereof. Additionally or alternatively, the at least one catalyst metal may be selected from the group consisting of platinum (Pt), palladium (Pd), iridium (Ir), rhodium (Rh), rehenium (Re), ruthenium (Ru), osmium (Os) or a combination thereof, particularly, platinum (Pt), palladium (Pd), and a mixture thereof.

The catalyst metal may be present in an amount of at least about 0.01 wt %, e.g., at least about 0.05 wt %, at least about 0.1 wt %, at least about 0.2 wt %, at least about 0.4 wt %, at least about 0.5 wt %, at least about 0.6 wt %, at least about 0.8 wt %, at least about 1.0 wt %, at least about 1.2 wt %, at least about 1.4 wt %, at least about 1.5 wt %, at least about 1.6 wt %, at least about 1.8 wt %, at least about 2.0 wt %, at least about 2.2 wt %, at least about 2.4 wt %, at least about 2.6 wt %, at least about 2.8 wt %, at least about 3.0 wt %, at least about 3.5 wt %, or at least about 4.0 wt %. Additionally or alternatively, the catalyst metal may be present in an amount of at most about 35 wt %, e.g., at most about 30 wt %, at most about 25 wt %, at most about 20 wt %, at most about 15 wt %, at most about 10 wt %, at most about 8.0 wt %, at most about 6.0 wt %, at most about 4.0 wt %, at most about 3.0 wt %, at most about 2.0 wt %, or at most about 1.0 wt %. All catalyst metal weight percents are on support. By "on support" it is meant that the percents are based on the weight of the support, i.e., organosilica material. For example, if the organosilica material were to weigh ~100 grams, then ~20 wt % catalyst metal would mean that ~20 grams of the catalyst metal(s) was(were) added onto the organosilica material.

Additionally or alternatively, when the catalyst metal is a noble metal, it may be present in an amount of about 0.01 wt % to about 4.0 wt %, about 0.01 wt % to about 3.5 wt %, about 0.01 wt % to about 3.0 wt %, about 0.01 wt % to about 2.8 wt %, about 0.01 wt % to about 2.6 wt %, about 0.01 wt % to about 2.4 wt %, about 0.01 wt % to about 2.2 wt %, about 0.01 wt % to about 2.0 wt %, about 0.01 wt % to about 1.8 wt %, about 0.01 wt % to about 1.6 wt %, about 0.01 wt % to about 1.5 wt %, about 0.01 wt % to about 1.4 wt %, about 0.01 wt % to at least about 1.2 wt %, about 0.01 wt % to about 1.0 wt %, about 0.01 wt % to about 0.8 wt %, about 0.01 wt % to about 0.6 wt %, about 0.01 wt % to about 0.5 wt %, about 0.01 wt % to about 0.4 wt %, about 0.01 wt % to about 0.2 wt %, about 0.01 wt % to about 0.1 wt %, about 0.1 wt % to about 4.0 wt %, about 0.1 wt % to about 3.5 wt %, about 0.1 wt % to about 3.0 wt %, about 0.1 wt % to about 2.8 wt %, about 0.1 wt % to about 2.6 wt %, about 0.1 wt % to about 2.4 wt %, about 0.1 wt % to about 2.2 wt %, about 0.1 wt % to about 2.0 wt %, about 0.1 wt % to about 1.8 wt %, about 0.1 wt % to about 1.6 wt %, about 0.1 wt % to about 1.5 wt %, about 0.1 wt % to about 1.4 wt %, about 0.1 wt % to at least about 1.2 wt %, about 0.1 wt % to about 1.0 wt %, about 0.1 wt % to about 0.8 wt %, about 0.1 wt % to about 0.6 wt %, about 0.1 wt % to about 0.5 wt %, about 0.1 wt % to about 0.4 wt %, about 0.1 wt % to about 0.2 wt %, about 1.0 wt % to about 4.0 wt %, about 1.0 wt % to about 3.5 wt %, about 1.0 wt % to about 3.0 wt %, about 1.0 wt % to about 2.8 wt %, about 1.0 wt % to about 2.6 wt %, about 1.0 wt % to about 2.4 wt %, about 1.0 wt % to about 2.2 wt %, about 1.0 wt % to about 2.0 wt %, about 1.0 wt % to about 1.8 wt %, about 1.0 wt % to about 1.6 wt %, about 1.0 wt % to about 1.5 wt %, about 1.0 wt % to about 1.4 wt %, or about 1.0 wt % to at least about 1.2 wt %. In particular, when the catalyst metal is a noble metal, it may be present in an amount of about 0.01 wt % to about 4.0 wt %, about 0.05 wt % to about 3.5 wt %, about 0.1 wt % to about 2.0 wt %, or about 0.1 wt % to about 1.4 wt %.

In another particular embodiment, the catalyst metal may include at least one Group 6 metal and at least one non-noble metal from Groups 8-10. Additionally or alternatively, the catalyst metal may include at least one of chromium, molybdenum, and tungsten (particularly including molybdenum and/or tungsten), as well as at least one of iron, cobalt, and nickel (particularly including cobalt and/or nickel).

Additionally or alternatively, when the catalyst metal comprises a combination of a Group 6 metal and a group 8-10 non-noble metal, N. Binder In various aspects, the organosilica materials described herein may be further combined with binder. Suitable binders can include, but need not be limited to, active and inactive materials, synthetic or naturally occurring zeolites, as well as inorganic materials such as clays and/or oxides such as silica, alumina, zirconia, titania, silica-alumina, cerium oxide, magnesium oxide, or combinations thereof. In particular, the further binder may be selected from the group consisting of active and inactive materials, inorganic materials, clays, alumina, silica, silica-alumina, titania, zirconia, or a combination thereof. Particularly, the further binder may be silica-alumina, alumina and/or zirconia, particularly alumina. Silica-alumina may be either naturally occurring or in the form of gelatinous precipitates or gels including mixtures of silica and metal oxides. It should be noted it is recognized herein that the use of a material in conjunction with a zeolite binder material, i.e., combined therewith or present during its synthesis, which itself is catalytically active may change the conversion and/or selectivity of the finished catalyst. It is also recognized herein that inactive materials can suitably serve as diluents to control the amount of conversion if the present invention is employed in alkylation processes so that alkylation products can be obtained economically and orderly without employing other means for controlling the rate of reaction. These inactive materials may be incorporated into naturally occurring clays, e.g., bentonite and kaolin, to improve the crush strength of the catalyst under commercial operating conditions and function as binders or matrices for the catalyst.

O. Additional Metals

In some embodiments, the organosilica material can further be combined with cationic metal sites incorporated into the network structure. Such cationic metal sites may be incorporated by any convenient method, such as impregnation or complexation to the surface, through an organic precursor, or by some other method. This organometallic material may be employed in a number of hydrocarbon separations conducted in petroleum refining or petrochemicals production. Examples of such compounds to be desirably separated from petrochemicals/fuels can include olefins, paraffins, aromatics, and the like.

Additionally or alternatively, the organosilica material can have deposited thereon/therein a surface metal within the pores of the organosilica material. The surface metal can be selected from a Group 1 element, a Group 2 element, a Group 13 element, and a combination thereof. When a Group 1 element is present, it can preferably comprise or be sodium and/or potassium. When a Group 2 element is present, it can include, but may not be limited to, magnesium and/or calcium. When a Group 13 element is present, it can include, but may not be limited to, boron and/or aluminum.

One or more of the Group 1, 2, 6, 8-10 and/or 13 elements may be present on an exterior and/or interior surface of the organosilica material support. For example, one or more of the Group 1, 2 and/or 13 elements may be present in a first layer on the organosilica material and one or more of the Group 6, 8, 9 and/or 10 elements may be present in a second layer, e.g., at least partially atop the Group 1, 2 and/or 13 elements. Additionally or alternatively, only one or more Group 6, 8, 9 and/or 10 elements may present on an exterior and/or interior surface of the organosilica material. The surface metal(s) can be incorporated into/onto the organosilica material by any convenient method, such as by impregnation, deposition, grafting, co-condensation, by ion exchange, and/or the like. In particular, a Group 13 metal, such as, but not limited to, aluminum may be grafted onto a surface of the organosilica material support. Additionally or alternatively, a Group 4 metal, such as, but not limited to, titanium, zirconium and hafnium, may be grafted onto a surface of the organosilica material support.

III. Methods of Making Catalysts

In another embodiment, methods of producing the organosilica material described herein are provided. The methods can advantageously comprise:

(a) providing an aqueous mixture that contains essentially no structure directing agent and/or porogen;

(b) adding into the aqueous mixture to form a solution at least one compound of: (i) Formula (I), $[Z^{15}Z^{16}SiCH_2]_3$, wherein each $Z^{15}$ can be a $C_1$-$C_4$ alkoxy group and each $Z^{16}$ can be a $C_1$-$C_4$ alkoxy group or a $C_1$-$C_4$ alkyl group; and/or (ii) a cyclic polyurea monomer of formula (IV),

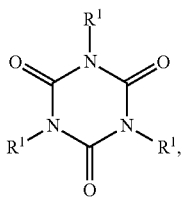

wherein each $R^1$ independently is a $X^5OX^6X^7SiX^8$ group, wherein each $X^5$ represents a $C_1$-$C_4$ alkyl group; $X^6$ and $X^7$ each independently represent a $C_1$-$C_4$ alkyl group or a $C_1$-$C_4$ alkoxy group; and each $X^8$ represents a $C_1$-$C_8$ alkylene group bonded to a nitrogen atom of the cyclic polyurea; and (iii) an additional comonomer comprising a source of silica that is reactive to polymerize with the at least one compound of Formula (I) and/or Formula (IV);

(c) aging the solution to produce a pre-product; and (d) drying the pre-product to obtain an organosilica material which is a polymer comprising at least one independent monomer of Formula (I) and/or Formula (IV) as described herein that are linked to the silica (and/or to each other) through at least one (and preferably at least two) silyl ether bonds.

Additionally or alternatively, at least a portion of the compounds of Formula (I) and/or the cyclic polyuria monomer of formula (IV) can be added in step (b) as at least partially hydroxylated and/or as at least partially polymerized/oligomerized, such that each $Z^{15}$ can more broadly represent a hydroxyl group, a $C_1$-$C_4$ alkoxy group or an oxygen atom bonded to a silicon atom of another siloxane and each $Z^{16}$ can more broadly represent a hydroxyl group, a $C_1$-$C_4$ alkoxy group, a $C_1$-$C_4$ alkyl group, or an oxygen atom bonded to a silicon atom of another siloxane and/or such that each $X^5$ can more broadly represent a hydrogen atom, a $C_1$-$C_4$ alkyl group, or a bond to a silicon atom of another monomer unit; $X^6$ and $X^7$ can each independently more broadly represent a hydroxyl group, a $C_1$-$C_4$ alkyl group, a $C_1$-$C_4$ alkoxy group, or an oxygen atom bonded to a silicon atom of another monomer unit; and each $X^8$ can more broadly represent a $C_1$-$C_8$ alkylene group bonded to a nitrogen atom of the cyclic polyurea. In other words, an unaged pre-product can be added in step (b), in addition to or as an alternative to the monomeric compound(s) of Formula (I) and/or Formula (IV).

Further additionally or alternatively, at least a portion of the silica (e.g., reactive with itself and the other compound(s) of Formula (I) and/or Formula (IV) via condensation through the presence of a hydroxyl group attached to one or more, preferably two or more, silicon atoms) can be added to step (b) as at least partially hydroxylated and/or as at least partially polymerized/oligomerized (i.e., as an unaged pre-product, in addition to or as an alternative to the particulate silica source).

A. Aqueous Mixture

The catalysts described herein may be made using essentially no structure directing agent or porogen. Thus, the aqueous mixture can contain essentially no added structure directing agent and/or no added porogen.

As used herein, "no added structure directing agent," and "no added porogen" means either (i) there is no component present in the synthesis of the organosilica material that aids in and/or guides the polymerization and/or polycondensing and/or organization of the building blocks that form the framework of the organosilica material; or (ii) such component is present in the synthesis of the organosilica material in a minor, or a non-substantial, or a negligible amount such that the component cannot be said to aid in and/or guide the polymerization and/or polycondensing and/or organization of the building blocks that form the framework of the organosilica material. Further, "no added structure directing agent" is synonymous with "no added template" and "no added templating agent."

1. Structure Directing Agent

Examples of a structure directing agent can include, but are not limited to, non-ionic surfactants, ionic surfactants, cationic surfactants, silicon surfactants, amphoteric surfactants, polyalkylene oxide surfactants, fluorosurfactants, colloidal crystals, polymers, hyper branched molecules, star-shaped molecules, macromolecules, dendrimers, and combinations thereof. Additionally or alternatively, the surface directing agent can comprise or be a poloxamer, a triblock polymer, a tetraalkylammonium salt, a nonionic polyoxyethylene alkyl, a Gemini surfactant, or a mixture thereof. Examples of a tetraalkylammonium salt can include, but are not limited to, cetyltrimethylammonium halides, such as cetyltrimethylammonium chloride (CTAC), cetyltrimethylammonium bromide (CTAB), and octadecyltrimethylammonium chloride. Other exemplary surface directing agents can additionally or alternatively include hexadecyltrimethylammonium chloride and/or cetylpyridinium bromide.

Poloxamers are block copolymers of ethylene oxide and propylene oxide, more particularly nonionic triblock copolymers composed of a central hydrophobic chain of polyoxypropylene (poly(propylene oxide)) flanked by two hydrophilic chains of polyoxyethylene (poly(ethylene oxide)). Specifically, the term "poloxamer" refers to a polymer having the formula $HO(C_2H_4)a(C_3H_6O)_b(C_2H_4O)_aH$ in which "a" and "b" denote the number of polyoxyethylene and polyoxypropylene units, respectively. Poloxamers are also known by the trade name Pluronic®, for example Pluronic® 123 and Pluronic® F127. An additional triblock polymer is B50-6600.

Nonionic polyoxyethylene alkyl ethers are known by the trade name Brij®, for example Brij® 56, Brij® 58, Brij® 76, Brij® 78. Gemini surfactants are compounds having at least two hydrophobic groups and at least one or optionally two hydrophilic groups per molecule have been introduced.

2. Porogen

A porogen material is capable of forming domains, discrete regions, voids and/or pores in the organosilica material. An example of a porogen is a block copolymer (e.g., a di-block polymer). As used herein, porogen does not include water. Examples of polymer porogens can include, but are not limited to, polyvinyl aromatics, such as polystyrenes, polyvinylpyridines, hydrogenated polyvinyl aromatics, polyacrylonitriles, polyalkylene oxides, such as polyethylene oxides and polypropylene oxides, polyethylenes, polylactic acids, polysiloxanes, polycaprolactones, polycaprolactams, polyurethanes, polymethacrylates, such as polymethylmethacrylate or polymethacrylic acid, polyacrylates, such as polymethylacrylate and polyacrylic acid, polydienes such as polybutadienes and polyisoprenes, polyvinyl chlorides, polyacetals, and amine-capped alkylene oxides, as well as combinations thereof.

Additionally or alternatively, porogens can be thermoplastic homopolymers and random (as opposed to block) copolymers. As used herein, "homopolymer" means compounds comprising repeating units from a single monomer. Suitable thermoplastic materials can include, but are not limited to, homopolymers or copolymers of polystyrenes, polyacrylates, polymethacrylates, polybutadienes, polyisoprenes, polyphenylene oxides, polypropylene oxides, polyethylene oxides, poly(dimethylsiloxanes), polytetrahydrofurans, polyethylenes, polycyclohexylethylenes, polyethyloxazolines, polyvinylpyridines, polycaprolactones, polylactic acids, copolymers of these materials and mixtures of these materials. Examples of polystyrene include, but are not limited to anionic polymerized polystyrene, syndiotactic polystyrene, unsubstituted and substituted polystyrenes (for example, poly(α-methyl styrene)). The thermoplastic materials may be linear, branched, hyperbranched, dendritic, or star like in nature.

Additionally or alternatively, the porogen can be a solvent. Examples of solvents can include, but are not limited to, ketones (e.g., cyclohexanone, cyclopentanone, 2-heptanone, cycloheptanone, cyclooctanone, cyclohexylpyrrolidinone, methyl isobutyl ketone, methyl ethyl ketone, acetone), carbonate compounds (e.g., ethylene carbonate, propylene carbonate), heterocyclic compounds (e.g., 3-methyl-2-oxazolidinone, dimethylimidazolidinone, N-methylpyrrolidone, pyridine), cyclic ethers (e.g., dioxane, tetrahydrofuran), chain ethers (e.g., diethyl ether, ethylene glycol dimethyl ether, propylene glycol dimethyl ether, tetraethylene glycol dimethyl ether, polyethylene glycol dimethyl ether, ethylene glycol monomethyl ether, ethylene glycol monoethyl ether, propylene glycol monomethyl ether (PGME), triethylene glycol monobutyl ether, propylene glycol monopropyl ether, triethylene glycol monomethyl ether, diethylene glycol ethyl ether, diethylene glycol methyl ether, dipropylene glycol methyl ether, dipropylene glycol dimethyl ether, propylene glycol phenyl ether, tripropylene glycol methyl ether), alcohols (e.g., methanol, ethanol), polyhydric alcohols (e.g., ethylene glycol, propylene glycol, polyethylene glycol, polypropylene glycol, glycerin, dipropylene glycol), nitrile compounds (e.g., acetonitrile, glutarodinitrile, methoxyacetonitrile, propionitrile, benzonitrile), esters (e.g., ethyl acetate, butyl acetate, methyl lactate, ethyl lactate, methyl methoxypropionate, ethyl ethoxypropionate, methyl pyruvate, ethyl pyruvate, propyl pyruvate, 2-methoxyethyl acetate, ethylene glycol monoethyl ether acetate, propylene glycol monomethyl ether acetate (PGMEA), butyrolactone, phosphoric acid ester, phosphonic acid ester), aprotic polar substances (e.g., dimethyl sulfoxide, sulfolane, dimethylformamide, dimethylacetamide), nonpolar solvents (e.g., toluene, xylene, mesitylene), chlorine-based solvents (e.g., methylene dichloride, ethylene dichloride), benzene, dichlorobenzene, naphthalene, diphenyl ether, diisopropylbenzene, triethylamine, methyl benzoate, ethyl benzoate, butyl benzoate, monomethyl ether acetate hydroxy ethers such as dibenzylethers, diglyme, triglyme, and mixtures thereof.

3. Base/Acid

In various embodiments, the aqueous mixture used in the methods provided herein can comprise a base and/or an acid. It is understood that pH of the aqueous mixture may change over time.

In certain embodiments where the aqueous mixture comprises a base, the aqueous mixture can have a pH from about 8 to about 15, from about 8 to about 14.5, from about 8 to about 14, from about 8 to about 13.5, from about 8 to about 13, from about 8 to about 12.5, from about 8 to about 12, from about 8 to about 11.5, from about 8 to about 11, from about 8 to about 10.5, from about 8 to about 10, from about 8 to about 9.5, from about 8 to about 9, from about 8 to about 8.5, from about 8.5 to about 15, from about 8.5 to about 14.5, from about 8.5 to about 14, from about 8.5 to about 13.5, from about 8.5 to about 13, from about 8.5 to about 12.5, from about 8.5 to about 12, from about 8.5 to about 11.5, from about 8.5 to about 11, from about 8.5 to about 10.5, from about 8.5 to about 10, from about 8.5 to about 9.5, from about 8.5 to about 9, from about 9 to about 15, from about 9 to about 14.5, from about 9 to about 14, from about 9 to about 13.5, from about 9 to about 13, from about 9 to about 12.5, from about 9 to about 12, from about 9 to about 11.5, from about 9 to about 11, from about 9 to about 10.5, from about 9 to about 10, from about 9 to about 9.5, from about 9.5 to about 15, from about 9.5 to about 14.5, from about 9.5 to about 14, from about 9.5 to about 13.5, from about 9.5 to about 13, from about 9.5 to about 12.5, from about 9.5 to about 12, from about 9.5 to about 11.5, from about 9.5 to about 11, from about 9.5 to about 10.5, from about 9.5 to about 10, from about 10 to about 15, from about 10 to about 14.5, from about 10 to about 14, from about 10 to about 13.5, from about 10 to about 13, from about 10 to about 12.5, from about 10 to about 12, from about 10 to about 11.5, from about 10 to about 11, from about 10 to about 10.5, from about 10.5 to about 15, from about 10.5 to about 14.5, from about 10.5 to about 14, from about 10.5 to about 13.5, from about 10.5 to about 13, from about 10.5 to about 12.5, from about 10.5 to about 12, from about 10.5 to about 11.5, from about 10.5 to about 11, from about 11 to about 15, from about 11 to about 14.5, from about 11 to about 14, from about 11 to about 13.5, from about 11 to about 13, from about 11 to about 12.5, from about 11 to about 12, from about 11 to about 11.5, from about 11.5 to about 15, from about 11.5 to about 14.5, from about 11.5 to about 14, from about 11.5 to about 13.5, from about 11.5 to about 13, from about 11.5 to about 12.5, from about 11.5 to about 12, from about 12 to about 15, from about 12 to about 14.5, from about 12 to about 14, from about 12 to about 13.5, from about 12 to about 13, from about 12 to about 12.5, from about 12.5 to about 15, from about 12.5 to about 14.5, from about 12.5 to about 14, from about 12.5 to about 13.5, from about 12.5 to about 13, from about 12.5 to about 15, from about 12.5 to about 14.5, from about 12.5 to about 14, from about 12.5 to about 13.5, from about 12.5 to about 13, from about 13 to about 15, from about 13 to about 14.5, from about 13 to about 14, from about 13 to about 13.5, from about 13.5 to about 15, from about 13.5 to about 14.5, from about 13.5 to about 14, from about 14 to about 15, from about 14 to about 14.5, and from about 14.5 to about 15.

In a particular embodiment comprising a base, the pH can be from about 9 to about 15, from about 9 to about 14, or about 8 to about 14.

Exemplary bases can include, but are not limited to, sodium hydroxide, potassium hydroxide, lithium hydroxide, sodium hydrogen carbonate, potassium hydrogen carbonate, pyridine, pyrrole, piperazine, pyrrolidine, piperidine, picoline, monoethanolamine, diethanolamine, dimethylmonoethanolamine, monomethyldiethanolamine, triethanolamine, diazabicyclooctane, diazabicyclononane, diazabicycloundecene, tetramethylammonium hydroxide, tetraethylammonium hydroxide, tetrapropylammonium hydroxide, tetrabutylammonium hydroxide, ammonia, ammonium hydroxide, methylamine, ethylamine, propylamine, butylamine, pentylamine, hexylamine, octylamine, nonylamine, decylamine, N,N-dimethylamine, N,N-diethylamine, N,N-dipropylamine, N,N-dibutylamine, trimethylamine, triethylamine, tripropylamine, tributylamine, cyclohexylamine, trimethylimidine, 1-amino-3-methylbutane, dimethylglycine, 3-amino-3-methylamine, and the like. These bases may be used either singly or in combination. In a particular embodiment, the base can comprise or be sodium hydroxide, sodium hydrogen carbonate, and/or ammonium hydroxide.

In certain embodiments where the aqueous mixture comprises an acid, the aqueous mixture can have a pH from about 0.01 to about 6.0, from about 0.01 to about 5, from about 0.01 to about 4, from about 0.01 to about 3, from about 0.01 to about 2, from about 0.01 to about 1, 0.1 to about 6.0, about 0.1 to about 5.5, about 0.1 to about 5.0, from about 0.1 to about 4.8, from about 0.1 to about 4.5, from about 0.1 to about 4.2, from about 0.1 to about 4.0, from about 0.1 to about 3.8, from about 0.1 to about 3.5, from about 0.1 to about 3.2, from about 0.1 to about 3.0, from about 0.1 to about 2.8, from about 0.1 to about 2.5, from about 0.1 to about 2.2, from about 0.1 to about 2.0, from about 0.1 to about 1.8, from about 0.1 to about 1.5, from about 0.1 to about 1.2, from about 0.1 to about 1.0, from about 0.1 to about 0.8, from about 0.1 to about 0.5, from about 0.1 to about 0.2, about 0.2 to about 6.0, about 0.2 to about 5.5, from about 0.2 to about 5, from about 0.2 to about 4.8, from about 0.2 to about 4.5, from about 0.2 to about 4.2, from about 0.2 to about 4.0, from about 0.2 to about 3.8, from about 0.2 to about 3.5, from about 0.2 to about 3.2, from about 0.2 to about 3.0, from about 0.2 to about 2.8, from about 0.2 to about 2.5, from about 0.2 to about 2.2, from about 0.2 to about 2.0, from about 0.2 to about 1.8, from about 0.2 to about 1.5, from about 0.2 to about 1.2, from about 0.2 to about 1.0, from about 0.2 to about 0.8, from about 0.2 to about 0.5, about 0.5 to about 6.0, about 0.5 to about 5.5, from about 0.5 to about 5, from about 0.5 to about 4.8, from about 0.5 to about 4.5, from about 0.5 to about 4.2, from about 0.5 to about 4.0, from about 0.5 to about 3.8, from about 0.5 to about 3.5, from about 0.5 to about 3.2, from about 0.5 to about 3.0, from about 0.5 to about 2.8, from about 0.5 to about 2.5, from about 0.5 to about 2.2, from about 0.5 to about 2.0, from about 0.5 to about 1.8, from about 0.5 to about 1.5, from about 0.5 to about 1.2, from about 0.5 to about 1.0, from about 0.5 to about 0.8, about 0.8 to about 6.0, about 0.8 to about 5.5, from about 0.8 to about 5, from about 0.8 to about 4.8, from about 0.8 to about 4.5, from about 0.8 to about 4.2, from about 0.8 to about 4.0, from about 0.8 to about 3.8, from about 0.8 to about 3.5, from about 0.8 to about 3.2, from about 0.8 to about 3.0, from about 0.8 to about 2.8, from about 0.8 to about 2.5, from about 0.8 to about 2.2, from about 0.8 to about 2.0, from about 0.8 to about 1.8, from about 0.8 to about 1.5, from about 0.8 to about 1.2, from about 0.8 to about 1.0, about 1.0 to about 6.0, about 1.0 to about 5.5, from about 1.0 to about 5.0, from about 1.0 to about 4.8, from about 1.0 to about 4.5, from about 1.0 to about 4.2, from about 1.0 to about 4.0, from about 1.0 to about 3.8, from about 1.0 to about 3.5, from about 1.0 to about 3.2, from about 1.0 to about 3.0, from about 1.0 to about 2.8, from about 1.0 to about 2.5, from about 1.0 to about 2.2, from about 1.0 to about 2.0, from about 1.0 to about 1.8, from about 1.0 to about 1.5, from about 1.0 to about 1.2, about 1.2 to about 6.0, about 1.2 to about 5.5, from about 1.2 to about 5.0, from about 1.2 to about 4.8, from about 1.2 to about 4.5, from about 1.2 to about 4.2, from about 1.2 to about 4.0, from about 1.2 to about 3.8, from about 1.2 to about 3.5, from about 1.2 to about 3.2, from about 1.2 to about 3.0, from about 1.2 to about 2.8, from about 1.2 to about 2.5, from about 1.2 to about 2.2, from about 1.2 to about 2.0, from about 1.2 to about 1.8, from about 1.2 to about 1.5, about 1.5 to about 6.0, about 1.5 to about 5.5, from about 1.5 to about 5.0, from about 1.5 to about 4.8, from about 1.5 to about 4.5, from about 1.5 to about 4.2, from about 1.5 to about 4.0, from about 1.5 to about 3.8, from about 1.5 to about 3.5, from about 1.5 to about 3.2, from about 1.5 to about 3.0, from about 1.5 to about 2.8, from about 1.5 to about 2.5, from about 1.5 to about 2.2, from about 1.5 to about 2.0, from about 1.5 to about 1.8, about 1.8 to about 6.0, about 1.8 to about 5.5, from about 1.8 to about 5.0, from about 1.8 to about 4.8, from about 1.8 to about 4.5, from about 1.8 to about 4.2, from about 1.8 to about 4.0, from about 1.8 to about 3.8, from about 1.8 to about 3.5, from about 1.8 to about 3.2, from about 1.8 to about 3.0, from about 1.8 to about 2.8, from about 1.8 to about 2.5, from about 1.8 to about 2.2, from about 1.8 to about 2.0, about 2.0 to about 6.0, about 2.0 to about 5.5, from about 2.0 to about 5.0, from about 2.0 to about 4.8, from about 2.0 to about 4.5, from about 2.0 to about 4.2, from about 2.0 to about 4.0, from about 2.0 to about 3.8, from about 2.0 to about 3.5, from about 2.0 to about 3.2, from about 2.0 to about 3.0, from about 2.0 to about 2.8, from about 2.0 to about 2.5, from about 2.0 to about 2.2, about 2.2 to about 6.0, about 2.2 to about 5.5, from about 2.2 to about 5.0, from about 2.2 to about 4.8, from about 2.2 to about 4.5, from about 2.2 to about 4.2, from about 2.2 to about 4.0, from about 2.2 to about 3.8, from about 2.2 to about 3.5, from about 2.2 to about 3.2, from about 2.2 to about 3.0, from about 2.2 to about 2.8, from about 2.2 to about 2.5, about 2.5 to about 6.0, about 2.5 to about 5.5, from about 2.5 to about 5.0, from about 2.5 to about 4.8, from about 2.5 to about 4.5, from about 2.5 to about 4.2, from about 2.5 to about 4.0, from about 2.5 to about 3.8, from about 2.5 to about 3.5, from about 2.5 to about 3.2, from about 2.5 to about 3.0, from about 2.5 to about 2.8, from about 2.8 to about 6.0, about 2.8 to about 5.5, from about 2.8 to about 5.0, from about 2.8 to about 4.8, from about 2.8 to about 4.5, from about 2.8 to about 4.2, from about 2.8 to about 4.0, from about 2.8 to about 3.8, from about 2.8 to about 3.5, from about 2.8 to about 3.2, from about 2.8 to about 3.0, from about 3.0 to about 6.0, from about 3.5 to about 5.5, from about 3.0 to about 5.0, from about 3.0 to about 4.8, from about 3.0 to about 4.5, from about 3.0 to about 4.2, from about 3.0 to about 4.0, from about 3.0 to about 3.8, from about 3.0 to about 3.5, from about 3.0 to about 3.2, from about 3.2 to about 6.0, from about 3.2 to about 5.5, from about 3.2 to about 5, from about 3.2 to about 4.8, from about 3.2 to about 4.5, from about 3.2 to about 4.2, from about 3.2 to about 4.0, from about 3.2 to about 3.8, from about 3.2 to about 3.5, from about 3.5 to about 6.0, from about 3.5 to about 5.5, from about 3.5 to about 5, from about 3.5 to about 4.8, from about 3.5 to about 4.5, from about 3.5 to about 4.2, from about 3.5 to about 4.0, from about 3.5 to about 3.8, from about 3.8 to about 5, from about 3.8 to about 4.8, from about 3.8 to about 4.5, from about 3.8 to about 4.2, from about 3.8 to about 4.0, from about 4.0 to about 6.0, from about 4.0 to about 5.5, from about 4.0 to about 5, from about 4.0 to about 4.8, from about 4.0 to about 4.5, from about 4.0 to about 4.2, from about 4.2 to about 5, from about 4.2 to about 4.8, from about 4.2 to about 4.5, from about 4.5 to about 5, from about 4.5 to about 4.8, or from about 4.8 to about 5.

In a particular embodiment comprising an acid, the pH can be from about 0.01 to about 6.0, 0.2 to about 6.0, about 0.2 to about 5.0, or about 0.2 to about 4.5.

Exemplary acids can include, but are not limited to, inorganic acids such as hydrochloric acid, ammonium chloride, ammonium fluoride, nitric acid, sulfuric acid, hydrofluoric acid, phosphoric acid, boric acid, oxalic acid, and combinations thereof; and organic acids such as acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethylhexanoic acid, oleic acid, stearic acid, linoleic acid, linolenic acid, salicylic acid, benzoic acid, p-amino-benzoic acid, p-toluenesulfonic acid, benzenesulfonic acid, monochloroacetic acid, dichloroacetic acid, trichloroacetic acid, trifluoroacetic acid, formic acid, malonic acid, sulfonic acid, phthalic acid, fumaric acid, citric acid, tartaric acid, succinic acid, itaconic acid, mesaconic acid, citraconic acid, malic acid, a hydrolysate of glutaric acid, a hydrolysate of maleic anhydride, a hydrolysate of phthalic anhydride, and the like, and combinations thereof. In a particular embodiment, the acid can comprise or be hydrochloric acid or ammonium chloride.

4. Molar Proportions

When more than one compound of Formula (I) is used, the respective compounds may be used in a wide variety of molar ratios. For example, if two compounds of Formula (I) are used, the molar ratio of each compound may vary from 1:99 to 99:1, such as from 10:90 to 90:10. The use of different compounds of Formula (I) can allow tailoring of the properties of the organosilica material made by the process of the invention.

When more than one compound of Formula (IV) is used, the respective compounds may be used in a wide variety of molar ratios. For example, if two compounds of Formula (IV) are used, the molar ratio of each compound may vary from 1:99 to 99:1, such as from 10:90 to 90:10. The use of different compounds of Formula (IV) can allow tailoring of the properties of the organosilica material made by the process of the invention.

When compounds of both Formulae (I) and (IV) are used, the respective compounds may be used in a wide variety of molar ratios. For example, the molar ratio of the compound(s) of Formula (I) may vary from 1:99 to 99:1, such as from 10:90 to 90:10, and the molar ratio of the compound(s) of Formula (IV) may vary from 1:99 to 99:1, such as from 10:90 to 90:10. The use of combinations of compounds of Formulae (I) and (IV) can allow tailoring of the properties of the organosilica material made by the process of the invention.

5. Optional Additional (Co)Monomers

In some embodiments, the methods provided herein can further comprise adding to the aqueous solution a compound of Formula (II), $Z^5OZ^6Z^7Z^8Si$, and/or a compound of formula (III), $Z^9Z^{10}Z^{11}Si—R—SiZ^9Z^{10}Z^{11}$.

If present in the aqueous solution, the molar ratio of compound of Formula (II) to the compound(s) of Formula (I) and/or Formula (IV) may vary within wide limits, such as from about 99:1 to about 1:99, from about 1:5 to about 5:1, from about 4:1 to about 1:4 or from about 3:2 to about 2:3. For example, the molar ratio of compound of Formula (II) to the compound(s) of Formula (I) and/or Formula (IV) can be from about 4:1 to 1:4, from about 2.5:1 to about 1:2.5, from about 2:1 to about 1:2, or from about 1.5:1 to about 1.5:1.

If present in the aqueous solution, the molar ratio of compound of Formula (III) to the compound(s) of Formula (I) and/or Formula (IV) may vary within wide limits, such as from about 99:1 to about 1:99, from about 1:5 to about 5:1, from about 4:1 to about 1:4 or from about 3:2 to about 2:3. For example, the molar ratio of compound of Formula (III) to the compound(s) of Formula (I) and/or Formula (IV) can be from about 4:1 to 1:4, from about 2.5:1 to about 1:2.5, from about 2:1 to about 1:2, or from about 1.5:1 to about 1.5:1.

Additionally or alternatively, the methods provided herein can further comprise adding to the aqueous solution a compound of Formula (V), $M^1(OZ^{12})_3$, and/or a compound of Formula (VI), $(Z^{13}O)_2M^2$-O—$Si(OZ^{14})_3$.

If present in the aqueous solution, the molar ratio of compound of Formula (V) to the compound(s) of Formula (I) and/or Formula (IV) may vary within wide limits, such as from about 99:1 to about 1:99, from about 1:5 to about 5:1, from about 4:1 to about 1:4 or from about 3:2 to about 2:3. For example, the molar ratio of compound of Formula (V) to the compound(s) of Formula (I) and/or Formula (IV) can be from about 4:1 to 1:4, from about 2.5:1 to about 1:2.5, from about 2:1 to about 1:2, or from about 1.5:1 to about 1.5:1.

If present in the aqueous solution, the molar ratio of compound of Formula (VI) to the compound(s) of Formula (I) and/or Formula (IV) may vary within wide limits, such as from about 99:1 to about 1:99, from about 1:5 to about 5:1, from about 4:1 to about 1:4 or from about 3:2 to about 2:3. For example, the molar ratio of compound of Formula (VI) to the compound(s) of Formula (I) and/or Formula (IV) can be from about 4:1 to 1:4, from about 2.5:1 to about 1:2.5, from about 2:1 to about 1:2, or from about 1.5:1 to about 1.5:1.

B. Aging the Solution

The solution formed in the methods described herein can be aged for at least about 4 hours, at least about 6 hours, at least about 12 hours, at least about 18 hours, at least about 24 hours (1 day), at least about 30 hours, at least about 36 hours, at least about 42 hours, at least about 48 hours (2 days), at least about 54 hours, at least about 60 hours, at least about 66 hours, at least about 72 hours (3 days), at least about 96 hours (4 days), at least about 120 hours (5 days) or at least about 144 hours (6 days).

Additionally or alternatively, the solution formed in the methods described herein can be aged for about 4 hours to about 144 hours (6 days), about 4 hours to about 120 hours (5 days), about 4 hours to about 96 hours (4 days), about 4 hours to about 72 hours (3 days), about 4 hours to about 66 hours, about 4 hours to about 60 hours, about 4 hours to about 54 hours, about 4 hours to about 48 hours (2 days), about 4 hours to about 42 hours, about 4 hours to about 36 hours, about 4 hours to about 30 hours, about 4 hours to about 24 hours (1 day), about 4 hours to about 18 hours, about 4 hours to about 12 hours, about 4 hours to about 6 hours, about 6 hours to about 144 hours (6 days), about 6 hours to about 120 hours (5 days), about 6 hours to about 96 hours (4 days), about 6 hours to about 72 hours (3 days), about 6 hours to about 66 hours, about 6 hours to about 60 hours, about 6 hours to about 54 hours, about 6 hours to about 48 hours (2 days), about 6 hours to about 42 hours, about 6 hours to about 36 hours, about 6 hours to about 30 hours, about 6 hours to about 24 hours (1 day), about 6 hours to about 18 hours, about 6 hours to about 12 hours, about 12 hours to about 144 hours (6 days), about 12 hours to about 120 hours (5 days), about 12 hours to about 96 hours (4 days), about 12 hours to about 72 hours (3 days), about 12 hours to about 66 hours, about 12 hours to about 60 hours, about 12 hours to about 54 hours, about 12 hours to about 48 hours (2 days), about 12 hours to about 42 hours, about 12 hours to about 36 hours, about 12 hours to about 30 hours, about 12 hours to about 24 hours (1 day), about 12 hours to about 18 hours, about 18 hours to about 144 hours (6 days), about 18 hours to about 120 hours (5 days), about 18 hours to about 96 hours (4 days), about 18 hours to about 72 hours (3 days), about 18 hours to about 66 hours, about 18 hours to about 60 hours, about 18 hours to about 54 hours, about 18 hours to about 48 hours (2 days), about 18 hours to about 42 hours, about 18 hours to about 36 hours, about 18 hours to about 30 hours, about 18 hours to about 24 hours (1 day), about 24 hours (1 day) to about 144 hours (6 days), about 24 (1 day) hours (1 day) to about 120 hours (5 days), about 24 hours (1 day) to about 96 hours (4 days), about 24 hours (1 day) to about 72 hours (3 days), about 24 hours (1 day) to about 66 hours, about 24 hours (1 day) to about 60 hours, about 24 hours (1 day) to about 54 hours, about 24 hours (1 day) to about 48 hours (2 days), about 24 hours (1 day) to about 42 hours, about 24 hours (1 day) to about 36 hours, about 24 hours (1 day) to about 30 hours, about 30 hours to about 144 hours (6 days), about 30 hours to about 120 hours (5 days), about 30 hours to about 96 hours (4 days), about 30 hours to about 72 hours (3 days), about 30 hours to about 66 hours, about 30 hours to about 60 hours, about 30 hours to about 54 hours, about 30 hours to about 48 hours (2 days), about 30 hours to about 42 hours, about 30 hours to about 36 hours, about 36 hours to about 144 hours (6 days), about 36 hours to about 120 hours (5 days), about 36 hours to about 96 hours (4 days), about 36 hours to about 72 hours (3 days), about 36 hours to about 66 hours, about 36 hours to about 60 hours, about 36 hours to about 54 hours, about 36 hours to about 48 hours (2 days), about 36 hours to about 42 hours, about 42 hours to about 144 hours (6 days), about 42 hours to about 120 hours (5 days), about 42 hours to about 96 hours (4 days), about 42 hours to about 72 hours (3 days), about 42 hours to about 66 hours, about 42 hours to about 60 hours, about 42 hours to about 54 hours, about 42 hours to about 48 hours (2 days), about 48 hours (2 days) to about 144 hours (6 days), about 48 hours (2 days) to about 120 hours (5 days), about 48 hours (2 days) to about 96 hours (4 days), about 48 hours (2 days) to about 72 hours (3 days), about 48 hours (2 days) to about 66 hours, about 48 hours (2 days) to about 60 hours, about 48 hours (2 days) to about 54 hours, about 54 hours to about 144 hours (6 days), about 54 hours to about 120 hours (5 days), about 54 hours to about 96 hours (4 days), about 54 hours to about 72 hours (3 days), about 54 hours to about 66 hours, about 54 hours to about 60 hours, about 60 hours to about 144 hours (6 days), about 60 hours to about 120 hours (5 days), about 60 hours to about 96 hours (4 days), about 60 hours to about 72 hours (3 days), about 60 hours to about 66 hours, about 66 hours to about 144 hours (6 days), about 66 hours to about 120 hours (5 days), about 66 hours to about 96 hours (4 days), about 66 hours to about 72 hours (3 days), about 72 hours (3 days) to about 144 hours (6 days), about 72 hours (3 days) to about 120 hours (5 days), about 72 hours (3 days) to about 96 hours (4 days), about 96 hours (4 days) to about 144 hours (6 days), about 96 hours (4 days) to about 120 hours (5 days), or about 120 hours (5 days) to about 144 hours (6 days).

Additionally or alternatively, the solution formed in the method can be aged at temperature of at least about 10° C., at least about 20° C., at least about 30° C., at least about 40° C., at least about 50° C., at least about 60° C., at least about 70° C., at least about 80° C., at least about 90° C., at least about 100° C., at least about 110° C., at least about 120° C. at least about 130° C., at least about 140° C., at least about 150° C., at least about 175° C., at least about 200° C., at least about 250° C., or about 300° C.

Additionally or alternatively, the solution formed in the method can be aged at temperature of about 10° C. to about 300° C., about 10° C. to about 250° C., about 10° C. to about 200° C., about 10° C. to about 175° C., about 10° C. to about 150° C., about 10° C. to about 140° C., about 10° C. to about 130° C., about 10° C. to about 120° C., about 10° C. to about 110° C., about 10° C. to about 100° C., about 10° C. to about 90° C., about 10° C. to about 80° C., about 10° C. to about 70° C., about 10° C. to about 60° C., about 10° C. to about 50° C., about 20° C. to about 300° C., about 20° C. to about 250° C., about 20° C. to about 200° C., about 20° C. to about 175° C., about 20° C. to about 150° C., about 20° C. to about 140° C., about 20° C. to about 130° C., about 20° C. to about 120° C., about 20° C. to about 110° C., about 20° C. to about 100° C., about 20° C. to about 90° C., about 20° C. to about 80° C., about 20° C. to about 70° C., about 20° C. to about 60° C., about 20° C. to about 50° C., about 30° C. to about 300° C., about 30° C. to about 250° C., about 30° C. to about 200° C., about 30° C. to about 175° C., about 30° C. to about 150° C., about 30° C. to about 140° C., about 30° C. to about 130° C., about 30° C. to about 120° C., about 30° C. to about 110° C., about 30° C. to about 100° C., about 30° C. to about 90° C., about 30° C. to about 80° C., about 30° C. to about 70° C., about 30° C. to about 60° C., about 30° C. to about 50° C., about 50° C. to about 300° C., about 50° C. to about 250° C., about 50° C. to about 200° C., about 50° C. to about 175° C., about 50° C. to about 150° C., about 50° C. to about 140° C., about 50° C. to about 130° C., about 50° C. to about 120° C., about 50° C. to about 110° C., about 50° C. to about 100° C., about 50° C. to about 90° C., about 50° C. to about 80° C., about 50° C. to about 70° C., about 50° C. to about 60° C., about 70° C. to about 300° C., about 70° C. to about 250° C., about 70° C. to about 200° C., about 70° C. to about 175° C., about 70° C. to about 150° C., about 70° C. to about 140° C., about 70° C. to about 130° C., about 70° C. to about 120° C., about 70° C. to about 110° C., about 70° C. to about 100° C., about 70° C. to about 90° C., about 70° C. to about 80° C., about 80° C. to about 300° C., about 80° C. to about 250° C., about 80° C. to about 200° C., about 80° C. to about 175° C., about 80° C. to about 150° C., about 80° C. to about 140° C., about 80° C. to about 130° C., about 80° C. to about 120° C., about 80° C. to about 110° C., about 80° C. to about 100° C., about 80° C. to about 90° C., about 90° C. to about 300° C., about 90° C. to about 250° C., about 90° C. to about 200° C., about 90° C. to about 175° C., about 90° C. to about 150° C., about 90° C. to about 140° C., about 90° C. to about 130° C., about 90° C. to about 120° C., about 90° C. to about 110° C., about 90° C. to about 100° C., about 100° C. to about 300° C., about 100° C. to about 250° C., about 100° C. to about 200° C., about 100° C. to about 175° C., about 100° C. to about 150° C., about 100° C. to about 140° C., about 100° C. to about 130° C., about 100° C. to about 120° C., about 100° C. to about 110° C., about 110° C. to about 300° C., about 110° C. to about 250° C., about 110° C. to about 200° C., about 110° C. to about 175° C., about 110° C. to about 150° C., about 110° C. to about 140° C., about 110° C. to about 130° C., about 110° C. to about 120° C., about 120° C. to about 300° C., about 120° C. to about 250° C., about 120° C. to about 200° C., about 120° C. to about 175° C., about 120° C. to about 150° C., about 120° C. to about 140° C., about 120° C. to about 130° C., about 130° C. to about 300° C., about 130° C. to about 250° C., about 130° C. to about 200° C., about 130° C. to about 175° C., about 130° C. to about 150° C., or about 130° C. to about 140° C.

In various aspects, adjusting the aging time and/or aging temperature of the solution formed in the methods described herein can affect the total surface area, microporous surface area, pore volume, pore radius and pore diameter of the organosilica material made. Thus, the porosity of the organosilica material may be adjusted by adjusting aging time and/or temperature.

For example, when the solution is aged for about 1 hour to about 7 hours (e.g., 1, 2, 3, 4, 5, 6 hours) at a temperature of about 80° C. to about 100° C. (e.g., 80° C., 85° C., 90° C., 95° C., etc.), the organosilica material may have one or more of the following:
  (i) a total surface area of about 200 m$^2$/g to about 1400 m$^2$/g, particularly about 400 m$^2$/g to about 1300 m$^2$/g, and particularly about 400 m$^2$/g to about 1200 m$^2$/g;
  (ii) a microporous surface area of about 200 m$^2$/g to about 600 m$^2$/g, particularly about 200 m$^2$/g to about 500 m$^2$/g;
  (iii) a pore volume of about 0.2 cm$^3$/g to about 1.0 cm$^3$/g, particularly about 0.2 cm$^3$/g to about 0.8 cm$^3$/g; and
  (iv) an average pore radius of about 0.5 nm to about 2.0 nm, particularly about 0.5 nm to about 2.0 nm, and particularly about 1.0 nm to about 1.5 nm.

Additionally or alternatively, when the solution is aged for greater than about 7 hours to about 150 hours (e.g., 23, 48, 72, 144 hours) at a temperature of about 80° C. to about 100° C. (e.g., 80° C., 85° C., 90° C., 95° C., etc.), the organosilica material may have one or more of the following:
  (i) a total surface area of about 600 m$^2$/g to about 1400 m$^2$/g, particularly about 800 m$^2$/g to about 1400 m$^2$/g, and particularly about 800 m$^2$/g to about 1200 m$^2$/g;
  (ii) substantially no microporous surface area;
  (iii) a pore volume of about 0.8 cm$^3$/g to about 1.4 cm$^3$/g, particularly about 0.9 cm$^3$/g to about 1.4 cm$^3$/g; and
  (iv) an average pore radius of about 1.0 nm to about 4.0 nm, particularly about 1.0 nm to about 4.0 nm.

Additionally or alternatively, when the solution is aged for about 1 hour to about 7 hours (e.g., 1, 2, 3, 4, 5, 6 hours) at a temperature of about 110° C. to about 130° C. (e.g., 110° C., 115° C., 120° C., 125° C., etc.), the organosilica material may have one or more of the following:
  (i) a pore volume of about 1.0 cm$^3$/g to about 1.8 cm$^3$/g, particularly about 1.2 cm$^3$/g to about 1.8 cm$^3$/g, particularly about 1.4 cm$^3$/g to about 1.7 cm$^3$/g; and
  (ii) an average pore diameter of about 2.0 nm to about 8.0 nm, particularly 4.0 nm to about 6.0 nm.

Additionally or alternatively, when the solution is aged for greater than about 7 hours to about 150 hours (e.g., 23, 48, 72, 144 hours) at a temperature of about 110° C. to about 130° C. (e.g., 110° C., 115° C., 120° C., 125° C., etc.), the organosilica material may have one or more of the following:
  (i) a pore volume of about 1.0 cm$^3$/g to about 1.8 cm$^3$/g, particularly about 1.2 cm$^3$/g to about 1.8 cm$^3$/g; and
  (ii) an average pore diameter of about 8.0 nm to about 16.0 nm, particularly about 10.0 nm to about 16.0 nm, particularly about 10.0 nm to about 14.0 nm.

Thus, at shorter aging times (e.g., 7, 6, 5, 4 hours, etc.) the surface area of an organosilica material made is microporous and mesoporous, but as aging time increase, the surface area transitions to primarily mesoporous. Further, as aging time increases, pore volume, average pore radius and average pore diameter increases. Increasing aging temperature along with aging time, accelerates the above-described surface area transition and increase in pore volume, average pore radius and average pore diameter.

C. Drying the Pre-Product

The methods described herein comprise drying the pre-product (e.g., a gel) to produce an organosilica material.

In some embodiments, the pre-product (e.g., a gel) formed in the method can be dried at a temperature of greater than or equal to about 50° C., greater than or equal to about 70° C., greater than or equal to about 80° C., greater than or equal to about 100° C., greater than or equal to about 110° C., greater than or equal to about 120° C., greater than or equal to about 150° C., greater than or equal to about 200° C., greater than or equal to about 250° C., greater than or equal to about 300° C., greater than or equal to about 350° C., greater than or equal to about 400° C., greater than or equal to about 450° C., greater than or equal to about 500° C., greater than or equal to about 550° C., or greater than or equal to about 600° C.

Additionally or alternatively, the pre-product (e.g., a gel) formed in the method can be dried at temperature of about 50° C. to about 600° C., about 50° C. to about 550° C., about 50° C. to about 500° C., about 50° C. to about 450° C., about 50° C. to about 400° C., about 50° C. to about 350° C., about 50° C. to about 300° C., about 50° C. to about 250° C., about 50° C. to about 200° C., about 50° C. to about 150° C., about 50° C. to about 120° C., about 50° C. to about 110° C., about 50° C. to about 100° C., about 50° C. to about 80° C., about 50° C. to about 70° C., about 70° C. to about 600° C., about 70° C. to about 550° C., about 70° C. to about 500° C., about 70° C. to about 450° C., about 70° C. to about 400° C., about 70° C. to about 350° C., about 70° C. to about 300° C., about 70° C. to about 250° C., about 70° C. to about 200° C., about 70° C. to about 150° C., about 70° C. to about 120° C., about 70° C. to about 110° C., about 70° C. to about 100° C., about 70° C. to about 80° C., about 80° C. to about 600° C., about 70° C. to about 550° C., about 80° C. to about 500° C., about 80° C. to about 450° C., about 80° C. to about 400° C., about 80° C. to about 350° C., about 80° C. to about 300° C., about 80° C. to about 250° C., about 80° C. to about 200° C., about 80° C. to about 150° C., about 80° C. to about 120° C., about 80° C. to about 110° C., or about 80° C. to about 100° C.

In a particular embodiment, the pre-product (e.g., a gel) formed in the method can be dried at temperature from about 70° C. to about 200° C.

Additionally or alternatively, the pre-product (e.g., a gel) formed in the method can be dried in a N$_2$ and/or air atmosphere.

D. Optional Further Steps

In some embodiments, the method can further comprise calcining the organosilica material to obtain a silica material. The calcining can be performed in air or an inert gas, such as nitrogen or air enriched in nitrogen. Calcining can take place at a temperature of at least about 300° C., at least about 350° C., at least about 400° C., at least about 450° C., at least about 500° C., at least about 550° C., at least about 600° C., or at least about 650° C., for example at least about 400° C. Additionally or alternatively, calcining can be performed at a temperature of about 300° C. to about 650° C., about 300° C. to about 600° C., about 300° C. to about 550° C., about 300° C. to about 400° C., about 300° C. to about 450° C., about 300° C. to about 400° C., about 300° C. to about 350° C., about 350° C. to about 650° C., about 350° C. to about 600° C., about 350° C. to about 550° C., about 350° C. to about 400° C., about 350° C. to about 450° C., about 350° C. to about 400° C., about 400° C. to about 650° C., about 400° C. to about 600° C., about 400° C. to about 550° C., about 400° C. to about 500° C., about 400° C. to about 450° C., about 450° C. to about 650° C., about 450° C. to about 600° C., about 450° C. to about 550° C., about 450° C. to about 500° C., about 500° C. to about 650° C., about 500° C. to about 600° C., about 500° C. to about 550° C., about 550° C. to about 650° C., about 550° C. to about 600° C. or about 600° C. to about 650° C.

In some embodiments, the method can further comprise incorporating a catalyst metal within the pores of the organosilica material. Exemplary catalyst metals can include, but are not limited to, a Group 6 element, a Group 8 element, a Group 9 element, a Group 10 element or a combination thereof. Exemplary Group 6 elements can include, but are not limited to, chromium, molybdenum, and/or tungsten, particularly including molybdenum and/or tungsten. Exemplary Group 8 elements can include, but are not limited to, iron, ruthenium, and/or osmium. Exemplary Group 9 elements can include, but are not limited to, cobalt, rhodium, and/or iridium, particularly including cobalt. Exemplary Group 10 elements can include, but are not limited to, nickel, palladium and/or platinum.

The catalyst metal can be incorporated into the organosilica material by any convenient method, such as by impregnation, by ion exchange, or by complexation to surface sites. The catalyst metal so incorporated may be employed to promote any one of a number of catalytic tranformations commonly conducted in petroleum refining or petrochemicals production. Examples of such catalytic processes can include, but are not limited to, hydrogenation, dehydrogenation, aromatization, aromatic saturation, hydrodesulfurization, olefin oligomerization, polymerization, hydrodenitrogenation, hydrocracking, naphtha reforming, paraffin isomerization, aromatic transalkylation, saturation of double/triple bonds, and the like, as well as combinations thereof.

Thus, in another embodiment, a catalyst material comprising the organosilica material described herein is provided. The catalyst material may optionally comprise a binder or be self-bound. Suitable binders, include but are not limited to active and inactive materials, synthetic or naturally occurring zeolites, as well as inorganic materials such as clays and/or oxides such as silica, alumina, zirconia, titania, silica-alumina, cerium oxide, magnesium oxide, or combinations thereof. In particular, the binder may be silica-alumina, alumina and/or a zeolite, particularly alumina. Silica-alumina may be either naturally occurring or in the form of gelatinous precipitates or gels including mixtures of silica and metal oxides. It should be noted it is recognized herein that the use of a material in conjunction with a zeolite binder material, i.e., combined therewith or present during its synthesis, which itself is catalytically active may change the conversion and/or selectivity of the finished catalyst. It is also recognized herein that inactive materials can suitably serve as diluents to control the amount of conversion if the present invention is employed in alkylation processes so that alkylation products can be obtained economically and orderly without employing other means for controlling the rate of reaction. These inactive materials may be incorporated into naturally occurring clays, e.g., bentonite and kaolin, to improve the crush strength of the catalyst under commercial operating conditions and function as binders or matrices for the catalyst. The catalysts described herein typically can comprise, in a composited form, a ratio of support material to binder material of about 100 parts support material to about zero parts binder material; about 99 parts support material to about 1 parts binder material; about 95 parts support material to about 5 parts binder material. Additionally or alternatively, the catalysts described herein typically can comprise, in a composited form, a ratio of support material to binder material ranging from about 90 parts support material to about 10 parts binder material to about 10 parts support material to about 90 parts binder material; about 85 parts support material to about 15 parts binder material to about 15 parts support material to about 85 parts binder material; about 80 parts support material to 20 parts binder material to 20 parts support material to 80 parts binder material, all ratios being by weight, typically from 80:20 to 50:50 support material: binder material, preferably from 65:35 to 35:65. Compositing may be done by conventional means including mulling the materials together followed by extrusion of pelletizing into the desired finished catalyst particles.

In some embodiments, the method can further comprise incorporating cationic metal sites into the network structure by any convenient method, such as impregnation or complexation to the surface, through an organic precursor, or by some other method. This organometallic material may be employed in a number of hydrocarbon separations conducted in petroleum refining or petrochemicals production. Examples of such compounds to be desirably separated from petrochemicals/fuels can include olefins, paraffins, aromatics, and the like.

Additionally or alternatively, the method can further comprise incorporating a surface metal within the pores of the organosilica material. The surface metal can be selected from a Group 1 element, a Group 2 element, a Group 13 element, and a combination thereof. When a Group 1 element is present, it can preferably comprise or be sodium and/or potassium. When a Group 2 element is present, it can include, but may not be limited to, magnesium and/or calcium. When a Group 13 element is present, it can include, but may not be limited to, boron and/or aluminum.

One or more of the Group 1, 2, 6, 8-10 and/or 13 elements may be present on an exterior and/or interior surface of the organosilica material. For example, one or more of the Group 1, 2 and/or 13 elements may be present in a first layer on the organosilica material and one or more of the Group 6, 8, 9 and/or 10 elements may be present in a second layer, e.g., at least partially atop the Group 1, 2 and/or 13 elements. Additionally or alternatively, only one or more Group 6, 8, 9 and/or 10 elements may present on an exterior and/or interior surface of the organosilica material. The surface metal(s) can be incorporated into/onto the organosilica material by any convenient method, such as by impregnation, deposition, grafting, co-condensation, by ion exchange, and/or the like.

IV. Uses of the Organosilica Materials

The organosilica materials described herein find uses in several areas.

In certain embodiments, the organosilica material described herein can be used as adsorbents or support matrices for separation and/or catalysis processes.

A. Gas Separation Processes

In some cases, the organosilica materials can be used in a gas separation process as provided herein. The gas separation process can comprise contacting a gas mixture containing at least one contaminant with the organosilica material described herein as prepared according to the methods described herein.

In various embodiments, the gas separation process can be achieved by swing adsorption processes, such as pressure swing adsorption (PSA) and temperature swing adsorption (TSA). All swing adsorption processes typically have an adsorption step in which a feed mixture (typically in the gas phase) is flowed over an adsorbent to preferentially adsorb a more readily adsorbed component relative to a less readily adsorbed component. A component may be more readily adsorbed because of kinetic or equilibrium properties of the adsorbent. The adsorbent can typically be contained in a contactor that is part of the swing adsorption unit. The contactor can typically contain an engineered structured adsorbent bed or a particulate adsorbent bed. The bed can contain the adsorbent and other materials such as other adsorbents, mesopore filling materials, and/or inert materials used to mitigated temperature excursions from the heat of adsorption and desorption. Other components in the swing adsorption unit can include, but are not necessarily limited to, valves, piping, tanks, and other contactors. Swing adsorption processes are described in detail in U.S. Pat. Nos. 8,784,533; 8,784,534; 8,858,683; and 8,784,535, each of which are incorporated herein by reference. Examples of processes that can be used herein either separately or in combination are PSA, TSA, pressure temperature swing adsorption (PTSA), partial purge displacement swing adsorption (PPSA), PPTSA, rapid cycle PSA (RCPSA), RCTSA, RCPPSA and RCPTSA.

Swing adsorption processes can be applied to remove a variety of target gases, also referred to as "contaminant gas" from a wide variety of gas mixtures. Typically, in binary separation systems, the "light component" as utilized herein is taken to be the species or molecular component(s) not preferentially taken up by the adsorbent in the adsorption step of the process. Conversely in such binary systems, the "heavy component" as utilized herein is typically taken to be the species or molecular component(s) preferentially taken up by the adsorbent in the adsorption step of the process. However, in binary separation systems where the component(s) that is(are) preferentially adsorbed has(have) a lower molecular weight than the component(s) that is(are) not preferentially adsorbed, those descriptions may not necessarily correlate as disclosed above.

An example of gas mixture that can be separated in the methods described herein is a gas mixture comprising $CH_4$, such as a natural gas stream. A gas mixture comprising $CH_4$ can contain significant levels of contaminants such as $H_2O$, $H_2S$, $CO_2$, $N_2$, mercaptans, and/or heavy hydrocarbons. Additionally or alternatively, the gas mixture can comprise $NO_x$ and/or $SO_x$ species as contaminants, such as a waste gas stream, a flue gas stream and a wet gas stream. As used herein, the terms "$NO_x$," and "$NO_x$" species refers to the various oxides of nitrogen that may be present in waste gas, such as waste gas from combustion processes. The terms refer to all of the various oxides of nitrogen including, but not limited to, nitric oxide (NO), nitrogen dioxide ($NO_2$), nitrogen peroxide ($N_2O$), nitrogen pentoxide ($N_2O_5$), and mixtures thereof. As used herein, the terms "$SO_x$," and "$SO_x$ species," refers to the various oxides of sulfur that may be present in waste gas, such as waste gas from combustion processes. The terms refer to all of the various oxides of sulfur including, but not limited to, SO, $SO_2$, $SO_3$, $SO_4$, $S_7O_2$ and $S_6O_2$. Thus, examples of contaminants include, but are not limited to $H_2O$, $H_2S$, $CO_2$, $N_2$, mercaptans, heavy hydrocarbons, $NO_x$ and/or $SO_x$ species.

B. Aromatic Hydrogenation Process

The organosilica materials made according to the methods described herein can be used as support materials in hydrogenation catalysts. In particular, the hydrogenation catalyst can comprise the organosilica materials as a support material where the organosilica material has at least one catalyst metal incorporated on the pore surface. The at least one catalyst metal may be a Group 8 metal, a Group 9 metal, a Group 10 metal, e.g., Pt, Pd, Ir, Rh, Ru or a combination thereof. The hydrogenation catalyst can further comprise a binder such as, but not limited to, active and inactive materials, inorganic materials, clays, ceramics, activated carbon, alumina, silica, silica-alumina, titania, zirconia, niobium oxide, tantalum oxide, or a combination thereof, particularly, silica-alumina, alumina, titania, or zirconia. These hydrogenation catalysts can be used for both hydrogenation and aromatic saturation of a feedstream.

In various embodiments, the hydrogenation process can be achieved by contacting a hydrocarbon feedstream comprising aromatics with a hydrogenation catalyst described herein in the presence of a hydrogen-containing treat gas in a first reaction stage operated under effective aromatics hydrogenation conditions to produce a reaction product with reduced aromatics content.

Hydrogen-containing treat gasses suitable for use in a hydrogenation process can be comprised of substantially pure hydrogen or can be mixtures of other components typically found in refinery hydrogen streams. It is preferred that the hydrogen-containing treat gas stream contains little, more preferably no, hydrogen sulfide. The hydrogen-containing treat gas purity can advantageously be at least about 50% by volume hydrogen, such at least about 75% by volume hydrogen or at least about 90% by volume hydrogen for best results. In many embodiments, the hydrogen-containing stream be substantially pure hydrogen.

Feedstreams suitable for hydrogenation by the hydrogenation catalyst described herein include any conventional hydrocarbon feedstreams where hydrogenation or aromatic saturation is desirable. Typically, an input feed for an aromatic saturation process can be generated as a product or side-product from a previous type of hydroprocessing, such as hydrocracking for fuels or lubricant base stock production. A wide range of petroleum and chemical feedstocks can be hydroprocessed. Such feedstreams can include hydrocarbon fluids, diesel, kerosene, lubricating oil feedstreams, heavy coker gasoil (HKGO), de-asphalted oil (DAO), FCC main column bottom (MCB), steam cracker tar. Such feedstreams can also include other distillate feedstreams such as light to heavy distillates including raw virgin distillates, wax-containing feedstreams such as feeds derived from crude oils, shale oils and tar sands. Synthetic feeds such as those derived from the Fischer-Tropsch process can also be aromatically saturated using the hydrogenation catalyst described herein. Typical wax-containing feedstocks for the preparation of lubricating base oils have initial boiling points of about 315° C. or higher, and include feeds such as whole and reduced petroleum crudes, hydrocrackates, raffinates, hydrotreated oils, gas oils (such as atmospheric gas oils, vacuum gas oils, and coker gas oils), atmospheric and vacuum residues, deasphalted oils/residua (e.g., propane deasphalted residua, brightstock, cycle oil), dewaxed oils, slack waxes and Fischer-Tropsch wax, and mixtures of these materials. Such feeds may be derived from distillation towers (atmospheric and vacuum), hydrocrackers, hydrotreaters and solvent extraction units, and may have wax contents of up to 50% or more. Exemplary lubricating oil boiling range feedstreams include feedstreams which boil in the range of 650-1100° F. Diesel boiling range feedstreams can include feedstreams which boil in the range of 480-660° F. Kerosene boiling range feedstreams can include feedstreams which boil in the range of 350-617° F.

Hydrocarbon feedstreams suitable for use herein also contain aromatics and nitrogen- and sulfur-contaminants. Feedstreams containing up to 0.2 wt. % of nitrogen, based on the feedstream, up to 3.0 wt. % of sulfur, and up to 50 wt. % aromatics can be used in the present process In various embodiments, the sulfur content of the feedstreams can be below about 500 wppm, or below about 300 wppm, or below about 200 wppm, or below about 100 wppm, or below about 50 wppm, or below about 15 wppm. The pressure used during an aromatic hydrogenation process can be modified based on the expected sulfur content in a feedstream. Feeds having a high wax content typically have high viscosity indexes of up to 200 or more. Sulfur and nitrogen contents may be measured by standard ASTM methods D2622 (sulfur), and D5453 and/or D4629 (nitrogen), respectively.

Effective hydrogenation conditions may be considered to be those conditions under which at least a portion of the aromatics present in the hydrocarbon feedstream are saturated, preferably at least about 50 wt. % of the aromatics are saturated, more preferably greater than about 75 wt. %. Effective hydrogenation conditions can include temperatures of from 150° C. to 400° C., a hydrogen partial pressure of from 100 to 3000 psig (700 to 20100 kPag), a liquid hourly space velocity (LHSV) of from 0.1 to 10 hr$^{-1}$, and a hydrogen to feed ratio of from 500 to 10000 scf/B (85 to 1700 Nm$^3$/m$^3$).

Additionally or alternatively, effective hydrogenation conditions may be conditions effective at removing at least a portion of the nitrogen and organically bound sulfur contaminants and hydrogenating at least a portion of said aromatics, thus producing at least a liquid lube boiling range product having a lower concentration of aromatics and nitrogen and organically bound sulfur contaminants than the lube boiling range feedstream.

Additionally or alternatively, effective hydrogenation conditions may be conditions effective at removing at least a portion of the nitrogen and organically bound sulfur contaminants and hydrogenating at least a portion of said aromatics, thus producing at least a liquid diesel boiling range product having a lower concentration of aromatics and nitrogen and organically bound sulfur contaminants than the diesel boiling range feedstream.

As stated above, in some instances, the hydrocarbon feedstream (e.g., lube oil boiling range) may be hydrotreated to reduce the sulfur contaminants to below about 500 wppm, particularly below about 300 wppm, particularly below about 200 wppm or particularly below about 100 wppm. In such an embodiment, the process may comprise at least two reaction stages, the first reaction state containing a hydrotreating catalyst operated under effective hydrotreating conditions, and the second containing a hydrogenation catalyst has described herein operated under effective hydrogenation conditions as described above. Therefore, in such an embodiment, the hydrocarbon feedstream can be first contacted with a hydrotreating catalyst in the presence of a hydrogen-containing treat gas in a first reaction stage operated under effective hydrotreating conditions in order to reduce the sulfur content of the feedstream to within the above-described range. Thus, the term "hydrotreating" as used herein refers to processes wherein a hydrogen-containing treat gas is used in the presence of a suitable catalyst that is active for the removal of heteroatoms, such as sulfur, and nitrogen. Suitable hydrotreating catalysts for use in the present invention are any conventional hydrotreating catalyst and includes those which are comprised of at least one Group 8 metal, preferably Fe, Co and Ni, more preferably Co and/or Ni, and most preferably Ni; and at least one Group 6 metal, preferably Mo and W, more preferably Mo, on a high surface area support material, preferably alumina. Additionally or alternatively, more than one type of hydrotreating catalyst can be used in the same reaction vessel. The Group 8 metal may typically be present in an amount ranging from about 2 to 20 wt %, preferably from about 4 to 12 wt %. The Group 6 metal can typically be present in an amount ranging from about 5 to 50 wt %, preferably from about 10 to 40 wt %, and more preferably from about 20 to 30 wt %. All metals weight percents are "on support" as described above.

Effective hydrotreating conditions may be considered to be those conditions that can effectively reduce the sulfur content of the feedstream (e.g., lube oil boiling range) to within the above-described ranges. Typical effective hydrotreating conditions can include temperatures ranging from about 150° C. to about 425° C., preferably about 200° C. to about 370° C., more preferably about 230° C. to about 350° C. Typical weight hourly space velocities ("WHSV") may range from about 0.1 to about 20 hr$^{-1}$, preferably from about 0.5 to about 5 hr$^{-1}$. Any effective pressure can be utilized, and pressures can typically range from about 410 to about 7100 kPag (about 4 to about 70 atmospheres), such as about 1000 to about 4100 kPag (about 10 to about 40 atmospheres). In a particular embodiment, said effective hydrotreating conditions may be conditions effective at removing at least a portion of said organically bound sulfur contaminants and hydrogenating at least a portion of said aromatics, thus producing at least a reaction product (e.g., liquid lube oil boiling range product) having a lower concentration of aromatics and organically bound sulfur contaminants than the lube oil boiling range feedstream.

The contacting of the hydrocarbon feedstream with the hydrotreating catalyst may produce a reaction product comprising at least a vapor product and a liquid product. The vapor product may typically comprise gaseous reaction products, such as $H_2S$, and the liquid reaction product may typically comprise a liquid hydrocarbon having a reduced level of nitrogen and sulfur contaminants. The total reaction product can be passed directly into the second reaction stage, but it may be preferred that the gaseous and liquid reaction products be separated, and the liquid reaction product conducted to the second reaction stage. Thus, in one embodiment, the vapor product and the liquid product may be separated, and the liquid product may be conducted to the second reaction stage. The method of separating the vapor product from the liquid product can be accomplished by any means known to be effective at separating gaseous and liquid reaction products. For example, a stripping tower or reaction zone can be used to separate the vapor product from the liquid product (e.g., liquid lube oil boiling range product). The liquid product thus conducted to the second reaction stage can have a sulfur concentration within the range of about 500 wppm, particularly below about 300 wppm, or particularly below about 200 wppm or particularly below about 100 wppm.

In still other embodiments, the hydrogenation catalysts described herein can be used in integrated hydroprocessing methods. In addition to the hydrofinishing and/or aromatic hydrogenation/saturation processes involving the hydrogenation catalyst described herein, an integrated hydroprocessing method can also include various combinations of hydrotreating, hydrocracking, catalytic dewaxing (such as hydrodewaxing), and/or solvent dewaxing. The scheme of hydrotreating followed by hydrofinishing described above represents one type of integrated process flow. Another integrated processing example is to have a dewaxing step, either catalytic dewaxing or solvent dewaxing, followed by hydroprocessing with the hydrogenation catalysts described herein. Still another example is a process scheme involving hydrotreating, dewaxing (catalytic or solvent), and then hydroprocessing with the hydrogenation catalysts described herein. Yet another example is hydroprocessing with the hydrogenation catalysts described herein followed by dewaxing (catalytic or solvent). Alternatively, multiple hydrofinishing and/or aromatic hydrogenation steps can be employed with hydrotreatment, hydrocracking, or dewaxing steps. An example of such a process flow is hydrofinishing, dewaxing (catalytic or solvent), and then hydrofinishing again, where at least one of the hydrofinishing steps may use a hydrogenation catalysts described herein. For processes involving catalytic dewaxing, effective catalytic dewaxing conditions can include temperatures of from 150° C. to 400° C., preferably 250° C. to 350° C., pressures of from 100 to 3000 psig (700 to 21000 kPag), such as from 200 to 2500 psig (from 1400 to 17500 kPag), liquid hourly space velocities of from 0.1 to 10 hr$^{-1}$, such as 0.1 to 5 hr$^{-1}$; and hydrogen treat gas rates from 250 to 10000 scf/B (from 40 to 1700 Nm$^3$/m$^3$), such as from 500 to 5000 scf/B (from 85 to 850 Nm$^3$/m$^3$). Any suitable dewaxing catalyst may be used.

In embodiments where the product of an aromatic saturation process will be a lubricant base oil, the input feed should also have suitable lubricant base oil properties. For example, an input feed intended for use as a Group I or Group II base oil can have a viscosity index (VI) of at least about 80, preferably at least about 90 or at least about 95. An input feed intended for use as a Group I+ base oil can have a VI of at least about 100, while an input feed intended for use as a Group II+ base oil can have a VI of at least 110. The viscosity of the input feed can be at least 2 cSt at 100° C., or at least 4 cSt at 100° C., or at least 6 cSt at 100° C.

V. Further Embodiments

The invention can additionally or alternately include one or more of the following embodiments.

Embodiment 1. A method of producing an organosilica material comprising: (a) providing an aqueous mixture that contains essentially no structure directing agent and/or porogen; (b) adding into the aqueous mixture to form a solution at least one compound of: (i) Formula (I), $[Z^{15}Z^{16}SiCH_2]_3$, wherein each $Z^{15}$ can be a $C_1$-$C_4$ alkoxy group and each $Z^{16}$ can be a $C_1$-$C_4$ alkoxy group or a $C_1$-$C_4$ alkyl group; and/or (ii) a cyclic polyurea monomer of formula (IV),

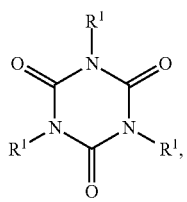

wherein each $R^1$ independently is a $X^5OX^6X^7SiX^8$ group, wherein each $X^5$ represents a $C_1$-$C_4$ alkyl group; $X^6$ and $X^7$ each independently represent a $C_1$-$C_4$ alkyl group or a $C_1$-$C_4$ alkoxy group; and each $X^8$ represents a $C_1$-$C_8$ alkylene group bonded to a nitrogen atom of the cyclic polyurea; and (iii) an additional comonomer comprising a source of silica that is reactive to polymerize with the at least one compound of Formula (I) and/or Formula (IV); (c) aging the solution to produce a pre-product; and (d) drying the pre-product to obtain an organosilica material which is a polymer comprising at least one independent monomer of Formula (I) and/or Formula (IV) as described herein that are linked to the silica through at least one silyl ether bond.

Embodiment 2. The method of embodiment 1, wherein at least one compound of Formula (I) is added to the aqueous mixture, and one or more of the following is satisfied: each $Z^{15}$ represents a $C_1$-$C_2$ alkoxy group; each $Z^{16}$ represents a $C_1$-$C_4$ alkoxy group; each $Z^{16}$ represents a $C_1$-$C_2$ alkoxy group; the at least one compound of Formula (I) is 1,1,3,3,5,5-hexaethoxy-1,3,5-trisilacyclohexane; each $Z^{15}$ represents a hydroxyl group, a $C_1$-$C_2$ alkoxy group, or an oxygen atom bonded to a silicon atom of another monomer and each $Z^{16}$ represent a hydroxyl group, a $C_1$-$C_2$ alkyl group, a $C_1$-$C_2$ alkoxy group, or an oxygen atom bonded to a silicon atom of another monomer; and each $Z^{15}$ represents a hydroxyl group, ethoxy, or an oxygen atom bonded to a silicon atom of another monomer and each $Z^{16}$ represent a hydroxyl group, ethoxy, or an oxygen atom bonded to a silicon atom of another monomer.

Embodiment 3. The method of embodiment 1 or embodiment 2, wherein at least one compound of Formula (IV) is added to the aqueous mixture, and wherein one or more of the following is satisfied: each $X^5$ represents a $C_1$-$C_2$ alkyl group, $X^6$ and $X^7$ each independently represent a $C_1$-$C_2$ alkyl group or a $C_1$-$C_2$ alkoxy group, and each $X^8$ represents a $C_1$-$C_4$ alkylene group bonded to a nitrogen atom of the cyclic polyurea monomer; and the at least one compound of Formula (IV) is tris(3-trimethoxysilyl-propyl)isocyanurate; each $X^5$ represents a hydrogen atom, a $C_1$-$C_2$ alkyl group or a bond to a silicon atom of another monomer, $X^6$ and $X^7$ each independently represent a hydroxyl group, a $C_1$-$C_2$ alkyl group, a $C_1$-$C_2$ alkoxy group or an oxygen atom bonded to a silicon atom of another monomer, and $X^8$ represents a $C_1$-$C_4$ alkylene group bonded to a nitrogen atom of the cyclic polyurea monomer; each $X^5$ represents a hydrogen atom, methyl or a bond to a silicon atom of another monomer unit, $X^6$ and $X^7$ each independently represent a hydroxyl group, methoxy or an oxygen atom bonded to a silicon atom of another monomer unit and $X^8$ represents —CH$_2$CH$_2$CH$_2$— bonded to a nitrogen atom of the cyclic polyurea monomer.

Embodiment 4. The method of any one of the previous embodiments, wherein the source of silica comprises a particulate silica having an average particle size up to about 150 nm (e.g., from about 3 nm to about 50 nm) and/or having a particle size distributions such that a d95 is up to about 250 nm (e.g., from about 5 nm to about 60 nm).

Embodiment 5. The method of any one of the previous embodiments, wherein the source of silica comprises a colloidal silica.

Embodiment 6. The method of any one of the previous embodiments, further comprising adding to the aqueous mixture at least one compound selected from the group consisting of: (i) a further compound of Formula (I); (ii) a further compound of Formula (IV); (iii) a compound of Formula (II) $Z^5OZ^6Z^7Z^8Si$, wherein each $Z^5$ can be a hydrogen atom, a $C_1$-$C_4$ alkyl group or a bond to a silicon atom of another monomer; and $Z^6$, $Z^7$ and $Z^8$ each independently can be selected from the group consisting of a hydroxyl group, a $C_1$-$C_4$ alkyl group, a $C_1$-$C_4$ alkoxy group, a nitrogen-containing $C_1$-$C_{10}$ alkyl group, a nitrogen-containing heteroaralkyl group, and a nitrogen-containing optionally substituted heterocycloalkyl group, and an oxygen atom bonded to a silicon atom of another monomer; (iv) a compound of of Formula (III), $Z^9Z^{10}Z^{11}Si$—R—$SiZ^9Z^{10}Z^{11}$, wherein each $Z^9$ independently can be a hydroxyl group, a $C_1$-$C_4$ alkoxy group, or an oxygen atom bonded to a silicon atom of another monomer; $Z^{10}$ and $Z^{11}$ each independently can a hydroxyl group, a $C_1$-$C_4$ alkoxy group, a $C_1$-$C_4$ alkyl group, or an oxygen atom bonded to a silicon atom of another monomer, and each R can be selected from the group consisting a $C_1$-$C_8$ alkylene group, a $C_2$-$C_8$ alkenylene group, a $C_2$-$C_8$ alkynylene group, a nitrogen-containing $C_1$-$C_{10}$ alkylene group, an optionally substituted $C_6$-$C_{20}$ aralkyl, and an optionally substituted $C_4$-$C_{20}$ heterocycloalkyl group; (v) a compound of Formula (V), $M^1(OZ^{12})_3$, wherein $M^1$ represents a Group 13 metal and each $Z^{12}$ independently represents a hydrogen atom, a $C_1$-$C_6$ alkyl, or a bond to a silicon atom of another monomer; (vi) a compound of Formula (VI), $(Z^{13}O)_2M^2$-O—Si$(OZ^{14})_3$, wherein $M^2$ represents a Group 13 metal and $Z^{13}$ and $Z^{14}$ each independently represent a hydrogen atom, a $C_1$-$C_6$ alkyl group or a bond to a silicon atom of another monomer; and (vii) a combination thereof.

Embodiment 7. The method of any one of the previous embodiments, wherein the aqueous mixture comprises a base (e.g., ammonium hydroxide, a metal hydroxide, or a metal hydrogen carbonate) and has a pH from about 8 to about 14.

Embodiment 8. The method of any one of the previous embodiments, wherein the aqueous mixture comprises an acid (e.g., an inorganic acid) and has a pH from about 0.01 to about 6.0.

Embodiment 9. An organosilica material made according to the method of any one of the previous embodiments.

Embodiment 10. An organosilica material comprising a polymer of at least one independent monomer comprising: (i) a monomer of formula (I), $[Z^{15}Z^{16}SiCH_2]_3$, wherein each $Z^{15}$ can individually be a $C_1$-$C_4$ alkyl group, a $C_1$-$C_4$ alkoxy group, a hydroxyl group, or an oxygen atom bonded to a silicon atom of another monomer, and each $Z^{16}$ can individually be a $C_1$-$C_4$ alkyl group, a $C_1$-$C_4$ alkoxy group, a hydroxyl group, or an oxygen atom bonded to a silicon atom of another monomer; and/or (ii) a cyclic polyurea monomer of formula (IV),

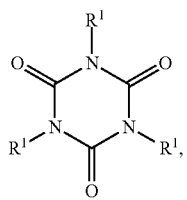

wherein each $R^1$ independently is a $X^5OX^6X^7SiX^8$ group, wherein each $X^5$ represents a hydrogen atom, a $C_1$-$C_4$ alkyl group, or a bond to a silicon atom of another monomer unit; $X^6$ and $X^7$ each independently represent a hydroxyl group, a $C_1$-$C_4$ alkyl group, a $C_1$-$C_4$ alkoxy group, or an oxygen atom bonded to a silicon atom of another monomer unit; and each $X^8$ represents a $C_1$-$C_8$ alkylene group bonded to a nitrogen atom of the cyclic polyurea; and (iii) an additional monomer comprising a source of silica that is reactive to polymerize with the at least one independent monomer.

Embodiment 11. The organosilica material of embodiment 10, wherein at least one monomer of Formula (I) is present, and wherein each $Z^{15}$ represents a hydroxyl group, a $C_1$-$C_2$ alkoxy group (e.g., ethoxy), or an oxygen atom bonded to a silicon atom of another monomer and each $Z^{16}$ represent a hydroxyl group, a $C_1$-$C_2$ alkyl group, a $C_1$-$C_2$ alkoxy group (e.g., ethoxy), or an oxygen atom bonded to a silicon atom of another monomer.

Embodiment 12. The organosilica material of embodiment 10 or embodiment 11, wherein at least one monomer of Formula (IV) is present, and wherein: each $X^5$ represents a hydrogen atom, a $C_1$-$C_2$ alkyl group (e.g., methyl) or a bond to a silicon atom of another monomer; $X^6$ and $X^7$ each independently represent a hydroxyl group, a $C_1$-$C_2$ alkyl group, a $C_1$-$C_2$ alkoxy group (e.g., methoxy) or an oxygen atom bonded to a silicon atom of another monomer; and $X^8$ represents a $C_1$-$C_4$ alkylene group (e.g., —$CH_2CH_2CH_2$—) bonded to a nitrogen atom of the cyclic polyurea monomer.

Embodiment 13. The organosilica material of any one of embodiments 10-12, wherein the source of silica comprises a particulate silica having an average particle size up to about 150 nm (e.g., from about 3 nm to about 50 nm) and/or having a particle size distributions such that a d95 is up to about 250 nm (e.g., from about 5 nm to about 60 nm).

Embodiment 14. The organosilica material of any one of embodiments 10-13, wherein the source of silica comprises a colloidal silica.

Embodiment 15. The organosilica material of any one of embodiments 10-14, further comprising at least one compound selected from the group consisting of: (i) a further compound of Formula (I); (ii) a further compound of Formula (IV); (iii) a compound of Formula (II) $Z^5OZ^6Z^7Z^8Si$, wherein each $Z^5$ can be a hydrogen atom, a $C_1$-$C_4$ alkyl group or a bond to a silicon atom of another monomer; and $Z^6$, $Z^7$ and $Z^8$ each independently can be selected from the group consisting of a hydroxyl group, a $C_1$-$C_4$ alkyl group, a $C_1$-$C_4$ alkoxy group, a nitrogen-containing $C_1$-$C_{10}$ alkyl group, a nitrogen-containing heteroaralkyl group, and a nitrogen-containing optionally substituted heterocycloalkyl group, and an oxygen atom bonded to a silicon atom of another monomer; (iv) a compound of of Formula (III), $Z^9Z^{10}Z^{11}Si$—R—$SiZ^9Z^{10}Z^{11}$, wherein each $Z^9$ independently can be a hydroxyl group, a $C_1$-$C_4$ alkoxy group, or an oxygen atom bonded to a silicon atom of another monomer; $Z^{10}$ and $Z^{11}$ each independently can a hydroxyl group, a $C_1$-$C_4$ alkoxy group, a $C_1$-$C_4$ alkyl group, or an oxygen atom bonded to a silicon atom of another monomer, and each R can be selected from the group consisting a $C_1$-$C_8$ alkylene group, a $C_2$-$C_8$ alkenylene group, a $C_2$-$C_8$ alkynylene group, a nitrogen-containing $C_1$-$C_{10}$ alkylene group, an optionally substituted $C_6$-$C_{20}$ aralkyl, and an optionally substituted $C_4$-$C_{20}$ heterocycloalkyl group; (v) a compound of Formula (V), $M^1(OZ^{12})_3$, wherein $M^1$ represents a Group 13 metal and each $Z^{12}$ independently represents a hydrogen atom, a $C_1$-$C_6$ alkyl, or a bond to a silicon atom of another monomer; (vi) a compound of Formula (VI), $(Z^{13}O)_2M^2$-O—Si$(OZ^{14})_3$, wherein $M^2$ represents a Group 13 metal and $Z^{13}$ and $Z^{14}$ each independently represent a hydrogen atom, a $C_1$-$C_6$ alkyl group or a bond to a silicon atom of another monomer; and (vii) a combination thereof.

Embodiment 16. The organosilica material of any one of embodiments 10-15, wherein the respective monomers are connected to each other through at least one silyl ether bond, thereby forming the polymer.

Embodiment 17. The method or organosilica material of any one of the previous embodiments, wherein the organosilica material has or exhibits one or more (e.g., one, two, three, or all) of the following: an average pore diameter of about 3.0 nm to about 13 nm; a total surface area of about 300 m²/g to about 1300 m²/g; a powder X-ray diffraction pattern with one peak between about 1 and about 4 degrees 2θ and/or substantially no peaks in the range of about 4 to about 30 degrees 2θ; and a silanol content of about 30% to about 60%.

EXAMPLES

The following examples are merely illustrative, and are not intended to unduly limit this disclosure.

Comparative Example 1

A solution was formed with ~31.0 g of ~30% $NH_4OH$ and ~39.9 g of deionized (DI) water. The pH of the solution was ~12.6. To the solution ~20.0 g of 1,1,3,3,5,5-hexaethoxy-1,3,5-trisilacyclohexane ($[(EtO)_2SiCH_2]_3$) was added, producing a mixture having the approximate molar composition:

~4.0$[(EtO)_2SiCH_2]_3$:~21OH:~270$H_2O$

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 2

A solution was formed with ~6.0 g of ~30% NH$_4$OH, ~3.0 g deionized (DI) water, and ~3.0 g colloidal silica (LUDOX™ AS-40). The pH of the solution was ~12.2. This produced a mixture having the approximate molar composition:

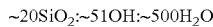

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used. Scanning electron microscopy (SEM) images of the product of Example 2 can be seen in FIGS. 3A, 3B, 3C, and 3D.

Example 3

A solution was formed with ~6.0 g of ~30% NH$_4$OH, ~3.0 g deionized (DI) water, and ~3.0 g colloidal silica (LUDOX™ AS-40). The pH of the solution was ~12.2. To the solution ~0.88 g of 1,1,3,3,5,5-hexaethoxy-1,3,5-trisilacyclohexane ([(EtO)$_2$SiCH$_2$]$_3$) was added, producing a mixture having the approximate molar composition:

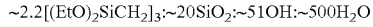

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 4

A solution was formed with ~6.0 g of ~30% NH$_4$OH, ~3.0 g deionized (DI) water, and ~3.0 g colloidal silica (LUDOX™ AS-40). The pH of the solution was ~12.2. To the solution ~0.08 g of 1,1,3,3,5,5-hexaethoxy-1,3,5-trisilacyclohexane ([(EtO)$_2$SiCH$_2$]$_3$) was added, producing a mixture having the approximate molar composition:

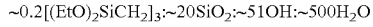

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used. Scanning electron microscopy (SEM) images of the product of Example 4 can be seen in FIGS. 4A, 4B, 4C, and 4D.

Example 5

A solution was formed with ~6.0 g of ~30% NH$_4$OH, ~3.0 g deionized (DI) water, and ~3.0 g colloidal silica (LUDOX™ AS-40). The pH of the solution was ~12.2. To the solution ~2.0 g of 1,1,3,3,5,5-hexaethoxy-1,3,5-trisilacyclohexane ([(EtO)$_2$SiCH$_2$]$_3$) was added, producing a mixture having the approximate molar composition:

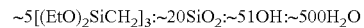

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 6

A solution was formed with ~12.0 g of ~30% NH$_4$OH, ~9.0 g deionized (DI) water, and ~3.0 g colloidal silica (LUDOX™ AS-40). The pH of the solution was ~12.2. To the solution ~5.33 g of 1,1,3,3,5,5-hexaethoxy-1,3,5-trisilacyclohexane ([(EtO)$_2$SiCH$_2$]$_3$) was added, producing a mixture having the approximate molar composition:

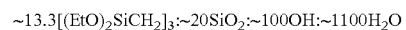

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 7

A solution was formed with ~26.0 g of ~30% NH$_4$OH, ~23.0 g deionized (DI) water, and ~3.0 g colloidal silica (LUDOX™ AS-40). The pH of the solution was ~12.2. To the solution ~8 g of 1,1,3,3,5,5-hexaethoxy-1,3,5-trisilacyclohexane ([(EtO)$_2$SiCH$_2$]$_3$) was added, producing a mixture having the approximate molar composition:

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 8

A solution was formed with ~33.0 g of ~30% NH$_4$OH, ~33.0 g deionized (DI) water, and ~3.0 g colloidal silica (LUDOX™ AS-40). The pH of the solution was ~12.2. To the solution ~12 g of 1,1,3,3,5,5-hexaethoxy-1,3,5-trisilacyclohexane ([(EtO)$_2$SiCH$_2$]$_3$) was added, producing a mixture having the approximate molar composition:

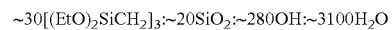

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 9

A solution was formed with ~6.0 g of ~30% NH$_4$OH, ~3.0 g deionized (DI) water, and ~3.0 g colloidal silica (LU- DOX™ AS-40). The pH of the solution was ~12.4. This produced a mixture having the approximate molar composition:

~20SiO$_2$:~51OH:~500H$_2$O

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 10

A solution was formed with ~6.0 g of ~30% NH$_4$OH, ~3.0 g deionized (DI) water, and ~3.0 g colloidal silica (LUDOX™ AS-40). The pH of the solution was ~12.4. To the solution ~0.88 g of 1,1,3,3,5,5-hexaethoxy-1,3,5-trisilacyclohexane ([(EtO)$_2$SiCH$_2$]$_3$) was added, producing a mixture having the approximate molar composition:

~2.2[(EtO)$_2$SiCH$_2$]$_3$:~20SiO$_2$:~51OH:~500H$_2$O

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 11

A solution was formed with ~6.0 g of ~30% NH$_4$OH, ~3.0 g deionized (DI) water, and ~3.0 g colloidal silica (LUDOX™ AS-40). The pH of the solution was ~12.4. To the solution ~2.0 g of 1,1,3,3,5,5-hexaethoxy-1,3,5-trisilacyclohexane ([(EtO)$_2$SiCH$_2$]$_3$) was added, producing a mixture having the approximate molar composition:

~5[(EtO)$_2$SiCH$_2$]$_3$:~20SiO$_2$:~51OH:~500H$_2$O

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 12

A solution was formed with ~12.0 g of ~30% NH$_4$OH, ~9.0 g deionized (DI) water, and ~3.0 g colloidal silica (LUDOX™ AS-40). The pH of the solution was ~12.4. To the solution ~5.33 g of 1,1,3,3,5,5-hexaethoxy-1,3,5-trisilacyclohexane ([(EtO)$_2$SiCH$_2$]$_3$) was added, producing a mixture having the approximate molar composition:

~13.3[(EtO)$_2$SiCH$_2$]$_3$:~20SiO$_2$:~100OH:~1100H$_2$O

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

Example 13

A solution was formed with ~33.0 g of ~30% NH$_4$OH, ~30.0 g deionized (DI) water, and ~3.0 g colloidal silica (LUDOX™ AS-40). The pH of the solution was ~12.4. To the solution ~12 g of 1,1,3,3,5,5-hexaethoxy-1,3,5-trisilacyclohexane ([(EtO)$_2$SiCH$_2$]$_3$) was added, producing a mixture having the approximate molar composition:

~30[(EtO)$_2$SiCH$_2$]$_3$:~20SiO$_2$:~280OH:~3100H$_2$O

The mixture was stirred for ~1 day at room temperature (~20-25° C.), transferred to an autoclave, and aged at ~90° C. for ~1 day to produce a gel. The gel was dried at ~120° C. under vacuum for ~1 day. This produced a solidified gel, which was ground to a white powder. Neither surface directing agent nor porogen were used.

TABLE 1

Physical properties of polymers made from 1,1,3,3,5,5-hexaethoxy-1,3,5-trisilacyclohexane ([(EtO)$_2$SiCH$_2$]$_3$) and/or colloidal silica

| Ex. | LUDOX* (grams) | HETSCH (grams) | SiO$_2$ (grams) | HETSCH (wt %) | BET (m$^2$/g) | SA (m$^2$/g, micro) | Pore vol. (cc/g) | Avg Pore diam. (nm) |
|---|---|---|---|---|---|---|---|---|
| 1-Comp | 0 | ~20 | 0 | 100 | ~1320 | ~55 | ~1.04 | ~3.2 |
| 2 | ~3 | ~0 | ~1.2 | 0 | ~126 | 0 | ~0.22 | ~7.0 |
| 3 | ~3 | ~0.88 | ~1.2 | ~42 | ~493 | 0 | ~0.81 | ~6.6 |
| 4 | ~3 | ~0.08 | ~1.2 | ~6 | ~186 | 0 | ~0.53 | ~11.4 |
| 5 | ~3 | ~2 | ~1.2 | ~63 | ~703 | 0 | ~0.98 | ~5.6 |
| 6 | ~3 | ~5.33 | ~1.2 | ~82 | ~896 | 0 | ~1.04 | ~4.6 |
| 7 | ~3 | ~8 | ~1.2 | ~87 | ~982 | 0 | ~1.01 | ~4.1 |
| 8 | ~3 | ~12 | ~1.2 | ~91 | ~1023 | 0 | ~1.08 | ~4.2 |
| 9 | ~3 | ~0 | ~1.2 | 0 | ~159 | ~2 | ~0.28 | ~7.0 |
| 10 | ~3 | ~0.88 | ~1.2 | ~42 | ~477 | 0 | ~0.86 | ~7.2 |
| 11 | ~3 | ~2 | ~1.2 | ~63 | ~633 | 0 | ~0.88 | ~5.5 |
| 12 | ~3 | ~5.33 | ~1.2 | ~82 | ~869 | 0 | ~0.98 | ~4.5 |
| 13 | ~3 | ~12 | ~1.2 | ~91 | ~1030 | 0 | ~0.91 | ~3.6 |

*Examples 1-8 contain LUDOX ® AS-40; Examples 9-13 contain LUDOX ® HS-40; both contain ~40% silica by weight.

The data in Table 1 above appears to show increasing BET surface area and pore volume, and decreasing average pore diameter with increasing content of Formula (I) monomer and/or with decreasing content of colloidal silica. A homopolymer organosilica containing only Formula (I) monomers is provided for comparison, as is a homopolymer containing only colloidal silica monomer.

Figure 2:
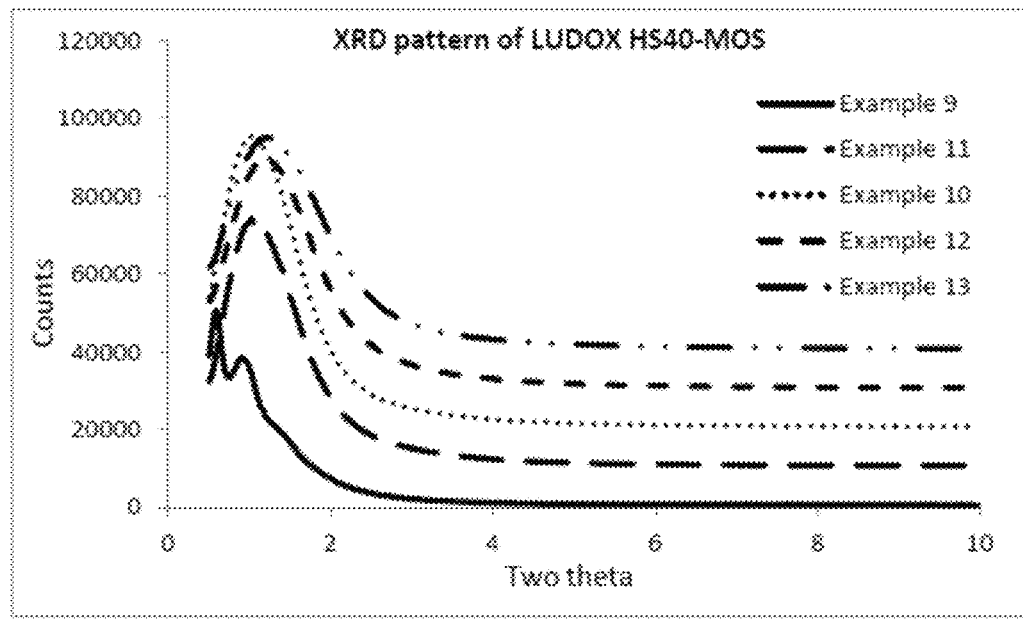
FIG. 2 illustrates x-ray diffraction (XRD) spectra for organosilica materials made according to Examples 9-13, using LUDOX® HS-40 colloidal silica.
Figure 3A:
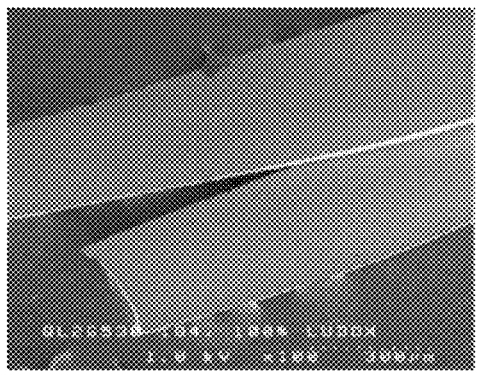
FIGS. 3A, 3B, 3C, and 3D illustrate scanning electron microscopy (SEM) images of organosilica materials made according to Example 2, using LUDOX® AS-40 colloidal silica.
Figure 3B:
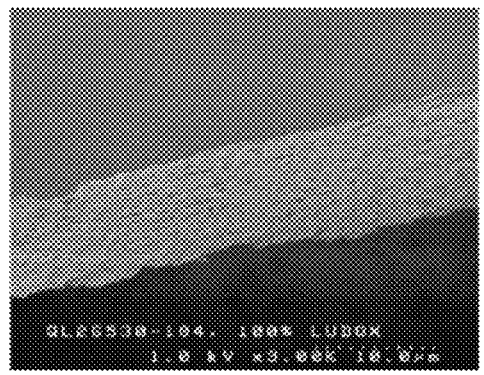
Figure 3C:
Figure 3D:
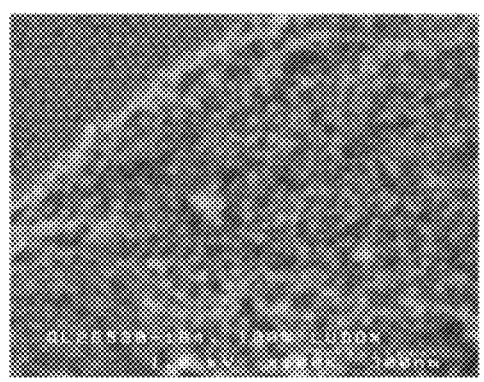
Figure 4A:
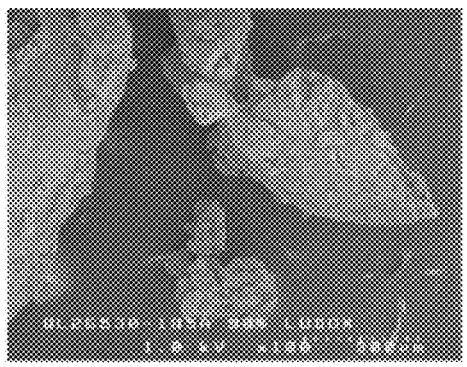
FIGS. 4A, 4B, 4C, and 4D illustrate scanning electron microscopy (SEM) images of organosilica materials made according to Example 4, using LUDOX® AS-40 colloidal silica and 1,1,3,3,5,5-hexaethoxy-1,3,5-trisilacyclohexane (HETSCH).
Figure 4B:
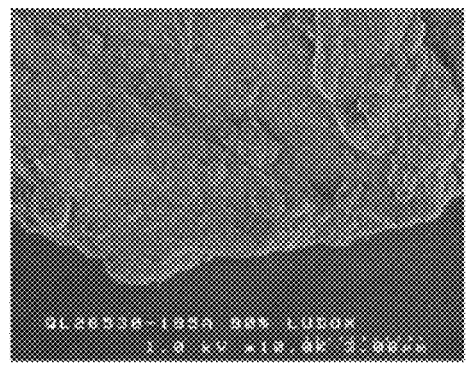
Figure 4C:
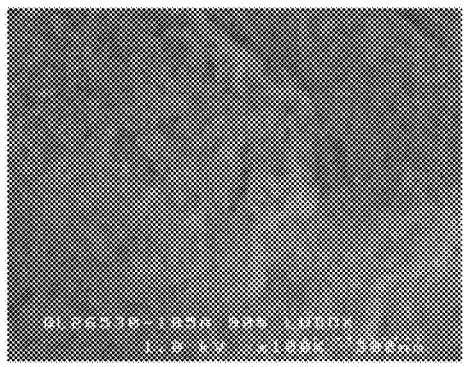
Figure 4D:
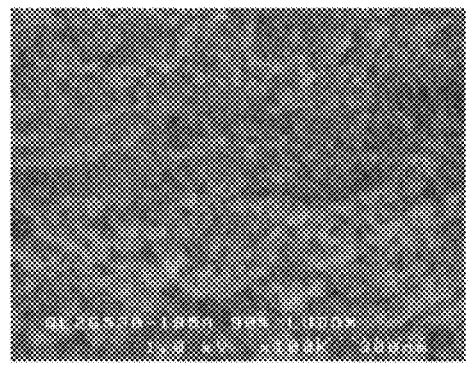

FIG. 1 shows XRD spectra for Examples 2-8, using LUDOX® AS-40 colloidal silica, and FIG. 2 shows XRD spectra for Examples 9-13, using LUDOX® HS-40 colloidal silica. These XRD results appeared to show enhanced low angle peak intensity and a shift to higher diffraction angle at higher contents of Formula (I) monomer and/or at lower contents of colloidal silica.

What is claimed is:

1. A method of producing an organosilica material comprising:
   (a) providing an aqueous mixture that contains no added structure directing agent, no added porogen, and no organic solvent;
   (b) adding into the aqueous mixture to form a solution at least one compound of: (i) Formula (I), wherein Formula (I) is 1,1,3,3,5,5-hexaethoxy-1,3,5-trisilacyclohexane; (ii) a cyclic polyurea monomer of formula (IV),

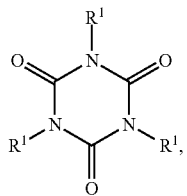

wherein each $R^1$ independently is a $X^5OX^6X^7SiX^8$ group, wherein each $X^5$ represents a $C_1$-$C_4$ alkyl group; $X^6$ and $X^7$ each independently represent a $C_1$-$C_4$ alkyl group or a $C_1$-$C_4$ alkoxy group; and each $X^8$ represents a $C_1$-$C_8$ alkylene group bonded to a nitrogen atom of the cyclic polyurea; and (iii) an additional comonomer comprising a source of silica that is reactive to polymerize with the at least one compound of Formula (I) and/or Formula (IV);
   (c) aging the solution to produce a pre-product gel; and
   (d) drying the pre-product gel to obtain an organosilica material which is a polymer comprising at least one independent monomer of Formula (I) and/or Formula (IV) as described herein that are linked to the silica through at least one silyl ether bond, wherein the organosilica material has an average pore diameter of about 2.0 nm to about 50 nm.

2. The method of claim 1, wherein at least one compound of Formula (IV) is added to the aqueous mixture, and wherein: each $X^5$ represents a $C_1$-$C_2$ alkyl group; $X^6$ and $X^7$ each independently represent a $C_1$-$C_2$ alkyl group or a $C_1$-$C_2$ alkoxy group; and each $X^8$ represents a $C_1$-$C_4$ alkylene group bonded to a nitrogen atom of the cyclic polyurea monomer.

3. The method of claim 1, wherein at least one compound of Formula (IV) is added to the aqueous mixture, and the at least one compound of Formula (IV) is tris(3-trimethoxysilylpropyl)isocyanurate.

4. The method of claim 1, wherein the source of silica comprises a particulate silica having an average particle size up to about 150 nm and/or having a particle size distributions such that a d95 is up to about 250 nm.

5. The method of claim 4, wherein the source of silica comprises a particulate silica having an average particle size from about 3 nm to about 50 nm and/or having a particle size distributions such that a d95 is from about 5 nm to about 60 nm.

6. The method of claim 4, wherein the source of silica comprises a colloidal silica.

7. The method of claim 1, further comprising adding to the aqueous mixture at least one compound selected from the group consisting of:
   (i) a further compound of Formula (I);
   (ii) a further compound of Formula (IV);
   (iii) a compound of Formula (II) $Z^5OZ^6Z^7Z^8Si$, wherein each $Z^5$ can be a hydrogen atom, a $C_1$-$C_4$ alkyl group or a bond to a silicon atom of another monomer; and $Z^6$, $Z^7$ and $Z^8$ each independently can be selected from the group consisting of a hydroxyl group, a $C_1$-$C_4$ alkyl group, a $C_1$-$C_4$ alkoxy group, a nitrogen-containing $C_1$-$C_{10}$ alkyl group, a nitrogen-containing heteroaralkyl group, and a nitrogen-containing optionally substituted heterocycloalkyl group, and an oxygen atom bonded to a silicon atom of another monomer;
   (iv) a compound of of Formula (III), $Z^9Z^{10}Z^{11}Si$—R—$SiZ^9Z^{10}Z^{11}$ wherein each $Z^9$ independently can be a hydroxyl group, a $C_1$-$C_4$ alkoxy group, or an oxygen atom bonded to a silicon atom of another monomer; $Z^{10}$ and $Z^{11}$ each independently can a hydroxyl group, a $C_1$-$C_4$ alkoxy group, a $C_1$-$C_4$ alkyl group, or an oxygen atom bonded to a silicon atom of another monomer, and each R can be selected from the group consisting a $C_1$-$C_8$ alkylene group, a $C_2$-$C_8$ alkenylene group, a $C_2$-$C_8$ alkynylene group, a nitrogen-containing $C_1$-$C_{10}$ alkylene group, an optionally substituted $C_6$-$C_{20}$ aralkyl, and an optionally substituted $C_4$-$C_{20}$ heterocycloalkyl group;
   (v) a compound of Formula (V), $M^1(OZ^{12})_3$, wherein $M^1$ represents a Group 13 metal and each $Z^{12}$ independently represents a hydrogen atom, a $C_1$-$C_6$ alkyl, or a bond to a silicon atom of another monomer;
   (vi) a compound of Formula (VI), $(Z^{13}O)_2M^2$-O—Si$(OZ^{14})_3$, wherein $M^2$ represents a Group 13 metal and $Z^{13}$ and $Z^{14}$ each independently represent a hydrogen atom, a $C_1$-$C_6$ alkyl group or a bond to a silicon atom of another monomer; and
   (vii) a combination thereof.

8. The method of claim 1, wherein the aqueous mixture comprises a base and has a pH from about 8 to about 14.

9. The method of claim 8, wherein the base is ammonium hydroxide, a metal hydroxide, or a metal hydrogen carbonate.

10. The method of claim 1, wherein the aqueous mixture comprises an acid and has a pH from about 0.01 to about 6.0.

11. The method of claim 10, wherein the acid is an inorganic acid.

12. An organosilica material made according to the method of claim 1.

* * * * *